(12) United States Patent
Arakawa et al.

(10) Patent No.: US 7,149,530 B1
(45) Date of Patent: Dec. 12, 2006

(54) DEVICE FOR PRESENTING INFORMATION TO MOBILE

(75) Inventors: Shuji Arakawa, Hiratsuka (JP); Seiichi Mizui, Odawara (JP); Seiji Kamada, Chigasaki (JP); Yoshio Asayama, Chigasaki (JP); Noriaki Abe, Kawasaki (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/936,712

(22) PCT Filed: Mar. 17, 2000

(86) PCT No.: PCT/JP00/01658

§ 371 (c)(1), (2), (4) Date: Feb. 7, 2002

(87) PCT Pub. No.: WO00/55828

PCT Pub. Date: Sep. 21, 2000

(30) Foreign Application Priority Data

Mar. 17, 1999 (JP) .................................. 11-072700
Mar. 17, 1999 (JP) .................................. 11-072721

(51) Int. Cl.
*H04Q 7/20* (2006.01)

(52) U.S. Cl. .............................. 455/456.1; 455/414.1; 455/414.2; 455/456.3; 455/456.5; 455/456.6; 455/457; 455/518; 455/507; 455/526; 370/346; 370/349; 340/315; 340/989; 701/35; 701/117

(58) Field of Classification Search ............. 455/412.1, 455/412.2, 414.1, 414.2, 418, 456.1–457, 455/518–521, 526, 507–508; 370/349, 346; 340/315, 989–996; 701/117, 35
See application file for complete search history.

(56) References Cited

U.S. PATENT DOCUMENTS

| | | | | |
|---|---|---|---|---|
| 5,548,273 A | * | 8/1996 | Nicol et al. ............... | 340/439 |
| 5,594,953 A | * | 1/1997 | Ross et al. ............... | 455/575.7 |
| 5,601,058 A | * | 2/1997 | Dyches et al. ........... | 123/179.2 |
| 5,670,830 A | * | 9/1997 | Koga et al. ............... | 307/10.1 |
| 5,721,550 A | * | 2/1998 | Lopez ...................... | 341/176 |
| 5,789,877 A | * | 8/1998 | Yamada et al. ........... | 318/9 |
| 5,857,159 A | * | 1/1999 | Dickrell et al. ........... | 701/35 |
| 5,922,040 A | * | 7/1999 | Prabhakaran .............. | 701/117 |
| 6,084,870 A | * | 7/2000 | Wooten et al. ............ | 370/349 |
| 6,260,486 B1 | * | 7/2001 | Boos et al. ................ | 108/42 |

(Continued)

FOREIGN PATENT DOCUMENTS

JP 6057497 4/1985

(Continued)

*Primary Examiner*—Steve M. D'Agosta
(74) *Attorney, Agent, or Firm*—Posz Law Group, PLC; R. Eugene Varndell, Jr.

(57) ABSTRACT

A device for presenting information on a mobile includes mobiles and terminals interconnected intercommunicably through communication means, wherein a terminal transmits, to the mobile concerned, mobile identification data on a mobile to which a request for mobile information is to be made, request content identification data representing the contents of mobile information to be requested, and terminal identification data on the terminal being the presentee to which the requested contents is to be presented. The mobile acquires mobile information requested by the terminal and sends it to the terminal being the presentee. The stored contents in storage means is updated each time operation of input for requesting information from a mobile is made through the terminal and the mobile acquires new mobile information. The updated stored contents is transmitted to the terminal being the requester when the terminal requests the updated stored contents.

20 Claims, 38 Drawing Sheets

U.S. PATENT DOCUMENTS 6,430,496 B1 * 8/2002 Smith et al. ................ 701/117

FOREIGN PATENT DOCUMENTS

| | | |
|---|---|---|
| JP | 4203933 | 7/1992 |
| JP | 8240653 | 9/1996 |
| JP | 974394 | 3/1997 |
| JP | 9244745 | 9/1997 |
| JP | 9247730 | 9/1997 |
| JP | 10104336 | 4/1998 |
| JP | 10117391 | 5/1998 |
| JP | 10222227 | 8/1998 |
| JP | 10241095 | 9/1998 |
| JP | 10312500 | 11/1998 |
| JP | 117599 | 1/1999 |

* cited by examiner

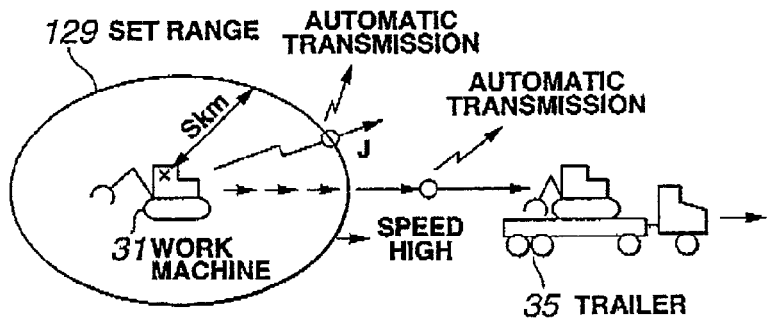
FIG.10
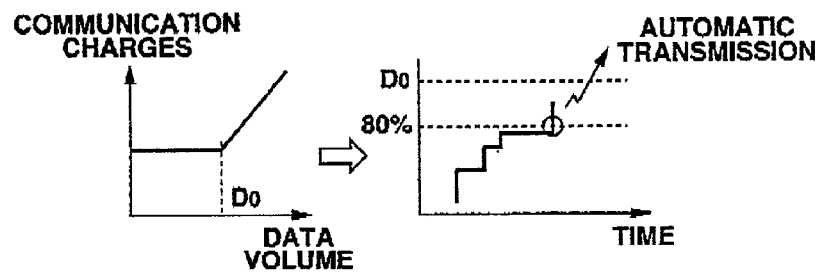
FIG.11(a)  FIG.11(b)
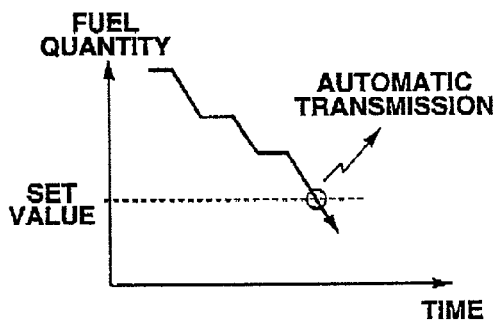
FIG.12(a)
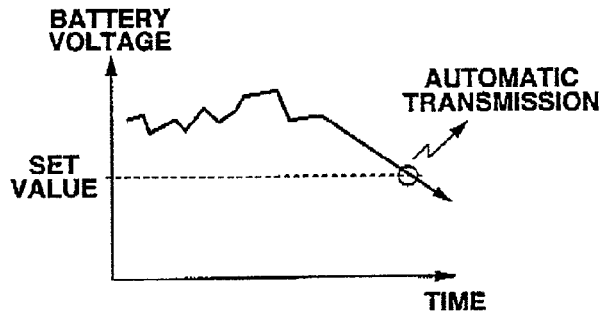
FIG.12(b)

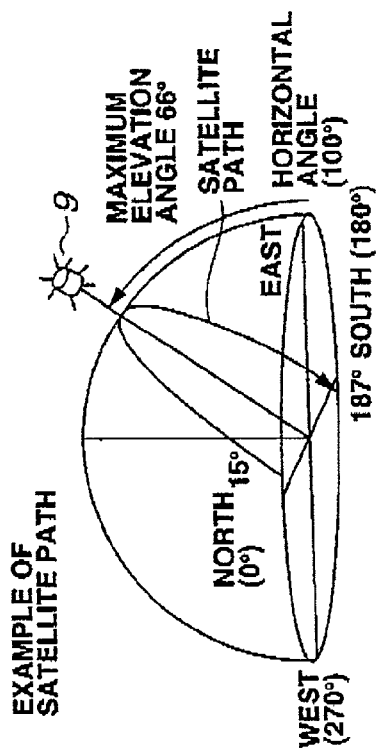
FIG.13(c)
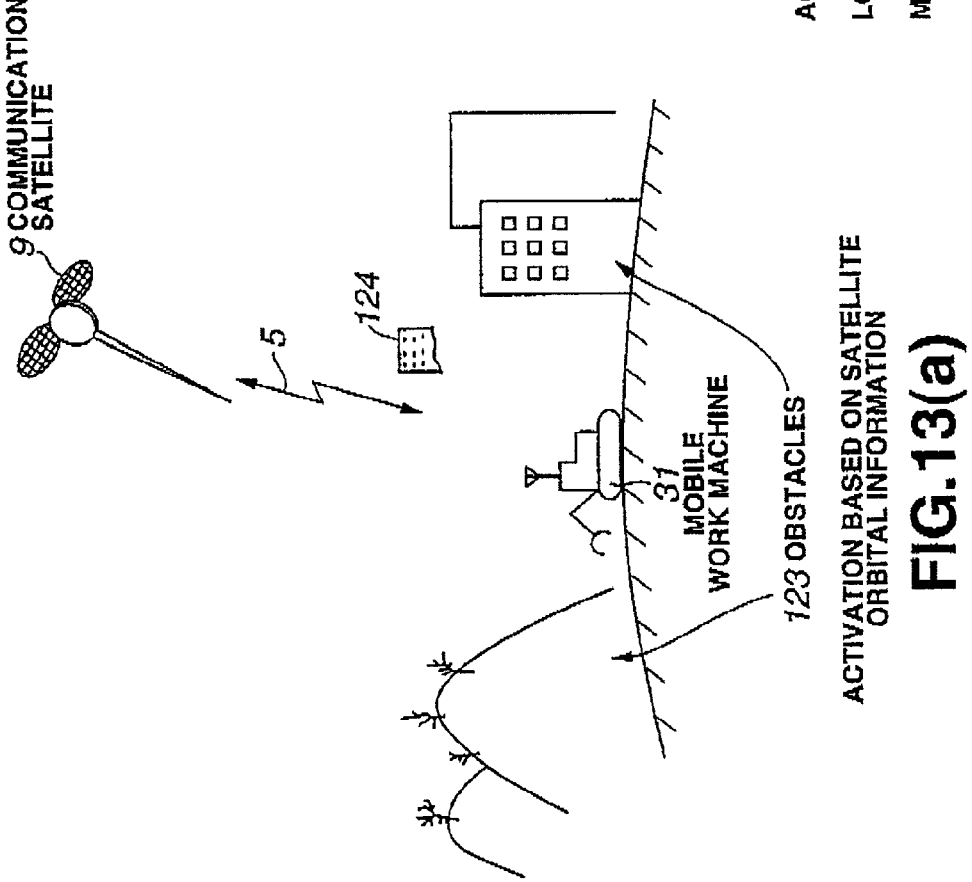
FIG.13(b)
AOS TIME AND AZIMUTH AT WHICH SATELLITE APPEARS ON HORIZON
LOS TIME AND AZIMUTH AT WHICH SATELLITE DISAPPEARS BELOW HORIZON
MEL TIME AND AZIMUTH AT MAXIMUM ELEVATION ANGLE
FIG.13(a)

T1 > T2 > T3 > T4

DATA BY VEHICLE MODEL : LATEST DATA [RETURN]

POSITION DATA : HISTORY

| DATE | LATITUDE | LONGITUDE |
|---|---|---|
| 98/10/19 3:58:30 P.M. | H35.19.15.240 | E139.17.54.210 |

SERVICE METER | 98/10/19 3:58:30 P.M. | [GRAPH]

SPECIFIC DATA

| | | | |
|---|---|---|---|
| FUEL QUANTITY | 98/09/10 5:06:38 P.M. | 90 | % | GRAPH |
| ENGINE SPEED | 98/09/10 5:06:38 P.M. | 1340 | RPM | GRAPH |
| BATTERY VOLTAGE | 98/09/10 5:06:38 P.M. | 26 | V | GRAPH |
| PUMP PRESSURE | 98/09/10 5:06:38 P.M. | 35 | kg/cm² | GRAPH |
| WORK MODE | 98/09/10 5:06:38 P.M. | | | |

IMAGE CAPTURED BY CAMERA — 116

[RUNNING MAP] [GRAPH]

FIG. 28

MOBILE LIST DISPLAY

| NO. | PURCHASING USER | UTILIZING USER | Car ID | MANU-FACTURER | CONSTRUCTION MACHINE TYPE |
|---|---|---|---|---|---|
| 0 | ASAYAMA KENSETSU | ASAYAMA KENSETSU | 2 | | CRANE |
| 1 | SUZUKI JUKI | SUZUKI JUK | 28 | | WHEEL LOADER |
| 2 | ABE RENTAL | MIZUI DOBOKU | 26 | | SPECIAL |
| 3 | ABE RENTAL | MIZUI DOBOKU | 25 | | CRANE |
| 4 | SUZUKI JUKI | SUZUKI JUKI | 30 | | BULLDOZER |
| 5 | HIRAKI SAISEKI | HIRAKI SAISEKI | 29 | | WHEEL LOADER |
| 6 | HQS | BREWERY | 20 | | |

Status column (leftmost): PROCESSING DONE; REQUEST IN PROGRESS; REQUEST IN PROGRESS; REQUEST IN PROGRESS; NORMAL; NORMAL; NORMAL

CLEAR SELECTIONS

REQUEST EXECUTION

| REQUEST EXECUTION | CANCEL |

NUMBER OF BYTES CHARGED FOR THIS MONTH [1105]
TRANSMISSION BYTES [6] RECEPTION BYTES [6] CURRENT BYTE COUNT [1089]

SELECTION OF RECIPIENT OF VEHICLE DATA SENT BACK

| | REPLY RECIPIENT TERMINAL |
|---|---|
| | ADMINISTRATOR A |
| | ADMINISTRATOR B |
| | SERVICE CAR |
| | TRAILER |

BASIC DATA

☐ VEHICLE POSITION  ☐ SERVICE METER

☐ SPECIFIC SINGLE METER

| ALL ON | ALL OFF |

☐ FUEL QUANTITY
☐ WORK MODE
☐ VEHICLE BODY ALARM 1
☐ VEHICLE BODY ALARM 2
☐ BATTERY VOLTAGE
☐ ENGINE WATER TEMPERATURE
☐ ENGINE SPEED
☐ PUMP PRESSURE

EXAMPLE OF SCREEN FOR MAKING INFORMATION REQUEST TO MOBILES

FIG.32

NOTIFICATION SCREEN

There were 7 noticed as of 10:21:31 a.m. on 00/01/31. No.1 to no.7 are displayed.
Previous 20 notices   Next 20 notices   Page : 1

| WATCH | TIME | MANU-FACTURER | MODEL | MODEL NUMBER | MACHINE NUMBER | ID1 | ID2 | CONTENT |
|---|---|---|---|---|---|---|---|---|
| ☐ | 2000/01/31 08:38 | X COMPANY | PC60 | 7 | 0251 | K623 | | The lock was set by remote. |
| ☐ | 2000/01/30 21:14 | X COMPANY | PC200 | 6E | 1338 | K005 | | Vehicle engine started outside regular hours. |
| ☑ | 2000/01/30 03:20 | X COMPANY | PC75UU | 3 | 3007 | K108 | | No confirmation of locking received from vehicle. |
| ☐ | 2000/01/29 20:28 | X COMPANY | PC75UU | 3 | 0011 | K008 | | The battery voltage is low. |
| ☐ | 2000/01/29 09:57 | X COMPANY | PC75UU | 3 | 7789 | K315 | | The vehicle is out of range. |
| ☐ | 2000/01/29 05:25 | X COMPANY | PC200 | 6E | 7633 | K311 | | Vehicle engine started outside regular hours. |
| ☑ | 2000/01/28 21:54 | X COMPANY | PC75UU | 3 | 5422 | K116 | | No communication with vehicle for 36 hours or more. |

SET VEHICLE TO WATCH

ORGANIZE NOTICES

※This screen is automatically updated at a certain time interval.

FIG.34

SCREEN OF ENTRY AND LEAVING

LATEST ITEMS FROM NO.1 TO NO.10 DISPLAYED.
PREVIOUS 20 ITEMS   NEXT 20 ITEMS   PAGE : 1

| TIME | PARTICULARS OF ENTRY AND LEAVING |
|---|---|
| 1999/11/15  16:19:00 | LEFT SOUTH TOKYO OFFICE. |
| 1999/11/15  15:37:00 | ENTERED SHIRAKAWA BRANCH OFFICE. |
| 1999/11/15  13:53:00 | LEFT WEST TOKYO OFFICE. |
| 1999/11/12  14:37:00 | LOCATED AT WEST TOKYO OFFICE. |
| 1999/11/12  14:17:00 | ENTERED WEST TOKYO OFFICE. |

DAILY WORK REPORT SCREEN

ABC DOBOKU (KK)　　SITE : IROHA ROCK QUARRY

| MANUFACTURER | COMPANY A |
|---|---|
| MODEL | PC2000 |
| MODEL NUMBER | 6E |
| MACHINE NUMBER | 18322 |
| IDENTIFICATION ID1 | K274 |
| IDENTIFICATION ID2 | |
| VEHICLE TYPE | POWER SHOVEL |
| UTILIZATION USER | |
| CLASSIFICATION 1 | UNCLASSIFIED |
| CLASSIFICATION 2 | UNCLASSIFIED |
| DATE OF RECEIPT OF LATEST MAIL | 2000/01/30 23:00:00 |
| COMMUNICATION STATUS | REPLY SENT |

| DATE | RUNNING MAP | RUNNING TIME | NAME OF WORKER | REMARKS |
|---|---|---|---|---|
| 2000/01/30 | 0:00 — 24:00 | 0 HOUR 0 MINUTE | | |
| 2000/01/29 | 0:00 — 24:00 | 8 HOURS 18 MINUTES | SATOH | LUBE |
| 2000/01/28 | 0:00 — 24:00 | 8 HOURS 24 MINUTES | SATOH | |
| 2000/01/27 | 0:00 — 24:00 | 8 HOURS 36 MINUTES | SATOH | |
| 2000/01/26 | 0:00 — 24:00 | 9 HOURS 12 MINUTES | SUZUKI | |
| 2000/01/25 | 0:00 — 24:00 | 0 HOUR 54 MINUTES | SUZUKI | |
| 2000/01/24 | 0:00 — 24:00 | 3 HOURS 12 MINUTES | KATOH | |
| 2000/01/23 | 0:00 — 24:00 | 0 HOUR 0 MINUTE | | |
| 2000/01/22 | 0:00 — 24:00 | 2 HOURS 54 MINUTES | SATOH | FUEL 200ℓ |
| 2000/01/21 | 0:00 — 24:00 | 5 HOURS 36 MINUTES | SATOH | |

CHARGES : XXXXXXX YEN (TOTAL 49 HOURS 6 MINUTES)

DEVICE FOR PRESENTING INFORMATION TO MOBILE

CROSS-REFERENCE TO RELATED APPLICATIONS

This application is a U.S. national phase application of International Application No. PCT/JP00/01658 filed Mar. 17, 2000.

TECHNICAL FIELD

This invention relates to an apparatus for presenting information on mobile bodies, which, in response to a request from a terminal device for information relating to a mobile body such as a construction machine, or in response to a transmission made from a mobile body itself, presents information having the requested content to the terminal device.

BACKGROUND ART

Data on the current position, service meter, fuel quantity, and engine r.p.m. and the like for mobile bodies, particularly construction machines, constitute necessary information for managing vehicles.

In terms of methods for acquiring information relating to these construction machines, conventionally, maintenance personnel have made visits to the construction machine and made visual confirmation, or, alternatively, historical data written to a memory inside the construction machine has been downloaded by connecting a personal computer to the construction machine. Then, by storing the data collected from a plurality of construction machines in the memory of a computer at a managing station, pluralities of construction machines have been managed.

However, because the collection of information is done by hand, the greater the number of construction machines involved and the more remote the work site becomes, the more complex and troublesome the collection of information becomes and information collection operations are severely hampered.

Thereupon, as may be seen in Japanese Patent Application Laid-Open No. 6-330539 (published), and elsewhere, attempts have been made to automatically acquire information on construction machines, using communication means, without depending on human intervention.

The invention described in the publication cited above is one wherewith a managing unit and construction machines are connected between by communication means so as to facilitate bidirectional communications, whereupon data requests are transmitted from the managing unit and, at the construction machines, data are extracted and sent back to the managing unit.

Thus information on the construction machines are merely collected in the requesting managing unit, wherefore information on the construction machines can only be obtained by a managing unit.

However, the humans concerned with the construction machines are not limited to a manager in a managing unit, but also include maintenance personnel (service persons), sales personnel, and various other people, and the information required by them, respectively, differs. Furthermore, these maintenance personnel and the like will often be at locations at some distance from the managing unit.

Therefore, in order to pass required information from the managing unit to maintenance personnel and the like, it is necessary to extract the information needed by each person, process it, and then pass it to the person by separate communication means or human intervention. Hence work efficiency associated with the transmission of information suffers greatly.

In the publication cited above, an invention is described wherewith, in cases where a service person is at a location removed some distance from the managing unit, a data request is transmitted using a customer's computer at the place being visited, and data are extracted at the construction machine and sent back to that customer's computer.

Accordingly, in this case, service personnel removed some distance from the managing unit can themselves acquire needed information.

However, when managing construction machines, there will often be situations where the service personnel or the like are unable themselves to effect an input operation to request information. An example of such a situation would be one where the service person is performing some other job or the like and is unable to perform an input operation. Another example of such a situation would be one wherein, although there is a terminal device capable of requesting information located in a vehicle, the transport operator who is driving that vehicle cannot himself or herself effect an input operation.

When managing construction machines, moreover, the information request originator and the information provider will often be different. An example of such a case would be where a service person, after making a maintenance inspection (such as replenishing the oil, for example), makes a request to the construction machine for data on the oil level, and wishes to make the presentation recipient for that information also a terminal device available to a manager at a site which is remote from the service person. Another example would be a case where, conversely, a manager makes a request to a construction machine for its current position and data relating to malfunctions or other anomalies, and wishes to make the presentation recipient for that information a terminal device available to a service person at a site which is remote from the manager.

Yet another example would be a case where a manger makes a request to a construction machine for data on its current position, and wishes to make the presentation recipient for that information also a terminal device available to a transportation operator who is driving a transport vehicle to transport that construction machine.

Cases like this where the person who wishes to obtain information is unable to effect an input operation, and cases where the information request originator and information presentation recipient are different, cannot be coped with by the invention described in Japanese Patent Application Laid-Open No. 6-330539 published) cited above.

An object of a first invention of the present invention, which was devised in view of the situation described in the foregoing, is to make it possible, even in cases where the person wishing to obtain information is unable to effect an input operation, and in cases where the information request originator and information presentation recipient are different, to efficiently send the information required by that presentation recipient person, from the request originator to the presentation recipient.

Based on the invention described in Japanese Patent Application Laid-Open No. 6-330539 (published), cited above, moreover, information on a construction machine requested from a managing unit is merely collected at that managing unit. Information on a construction machine requested by a customer's computer or by another managing unit is also merely collected in that customer's computer or other managing unit.

Accordingly, with the prior art, it is not possible, using any desired terminal device, to acquire various kinds of information on a plurality of construction machines requested from a plurality of request originators.

There is now a demand to be able to manage, in a unified manner, all information on a plurality of construction machines by any desired terminal device. Based on the invention described in the publication cited above, however, that demand cannot be met.

An object of a second invention of the present invention, which was devised in view of the situation described in the foregoing, is to make it possible to manage information on a plurality of mobile bodies by any desired terminal device.

Meanwhile, the internet has come into wide use in recent years, and the sending and receiving of data using an electronic mail service on the internet is conceivable. In such a case, the server terminal that is the mail server checks for the presence of electronic mail in a mail box at a regular period. For this reason there is a certain delay from the time electronic mail is sent by a terminal in a managing unit until the time that mail is actually received by a construction machine at the mail address location.

It is also conceivable to send and receive data by satellite radio communications via a communication satellite. With satellite radio communications, a communication link cannot be secured when the communications environment between the transmitter and receiver is poor, wherefore processing is performed to try to effect communications some number of times. For that reason, there are delays caused by the communications environment from the time a data request signal is transmitted from a communication satellite and the time it is actually received by the construction machine.

Thus, in communication systems that employ the internet or satellite radio communications, time differences of a number of minutes, for example, occur between the time a data request signal is transmitted by a request originator terminal and the time that signal is received by the request recipient construction machine and responded to. In a communication system exhibiting such poor real time performance as this, there is a danger that the operator of the request originator terminal will suffer from anxiety due to the uncertainty of communication status, and that work efficiency will be affected. There is also a danger that data request signals of duplicate content will be retransmitted, due to the uncertainty of communication status, affecting communication costs.

Accordingly, it is desirable that the conditions of communication with the construction machines be displayed on a display screen of a terminal so as to avoid both deterioration in work efficiency caused by communication condition uncertainties and increases in communication costs.

Furthermore, in cases where data request signals are sent from a plurality of terminals to one construction machine, how recent the information relating to the construction machine currently captured on the display screen of some terminal is (i.e. when and from which terminal it was requested) cannot be determined from the display screen of that one terminal alone.

Accordingly, it is desirable that a display be made on the terminal display screen as to how much time has elapsed since the last request was made to the construction machine, and that the operator be informed of construction machine managing information as to how recent the information currently captured is.

Thereupon, an object of a fourth invention is to prevent declines in work efficiency and increases in communication costs arising from communication condition uncertainty. Another object is to make provision so that management information as to how recent mobile body information on mobile bodies is can be obtained from a display screen.

Now, when the number of construction machines to be managed increases, the amount of information displayed on the display screen of a terminal becomes enormous. When critical information contained in that enormous amount of information is not noticed, or the discovery thereof is delayed, the manager at his or her end can no longer promptly make decisions or take corrective action when an abnormal situation arises. That being so, an object of a seventh invention is to inform the manager at his or her end only of critical information out of the enormous amount of information, and enable the manager at his or her end to promptly make decisions and take corrective action when an abnormal situation occurs.

DISCLOSURE OF THE INVENTION

A first invention of the present invention, thereupon, is an apparatus for presenting information on mobile bodies, in which a plurality of mobile bodies and a plurality of terminal devices are connected by communication means so that they can reciprocally transmit and receive, and mobile body information relating to a mobile body is presented to a terminal device in response to information request input operation of said terminal device, characterized in that:

input means is deployed in said terminal devices, for inputting mobile body identification data for indicating a mobile body to which a request for said mobile body information is to be made, request content identification data for indicating content in said mobile body information that is to be requested, and terminal device identification data for identifying a presentation recipient terminal device to which said requested content is to be presented;

when there has been a data input operation by said input means of one of said terminal devices, said terminal device transmits said request content identification data and said terminal device identification data, via said communication means, to a mobile body corresponding to said mobile body identification data;

said mobile body that has received said data acquires mobile body information corresponding to said request content identification data, and transmits said acquired mobile body information, via said communication means, to a presentation recipient terminal device corresponding to said terminal device identification data; and said presentation recipient terminal device that received said mobile body information presents that mobile body information by presentation means deployed in said presentation recipient terminal device.

The first invention is now described with reference to FIGS. 1, 2, 28, 31, 32, and 33.

As diagrammed in FIG. 1, a plurality of mobile bodies 31, 32, 33, 34, and 35 and a plurality of terminal devices 11, 12, 21, and 22 are connected by communication means 1 (internet 2, network control station 7, dedicated line 3, satellite ground station 8, feeder line 4, communication satellite 9, radio communications 5) so that they can mutually transmit and receive.

In the terminal device 11, by effecting an input operation (mouse click operation, key operation, or the like) to set setting means (an icon (pictograph) or the like on the browser screen on the terminal device 11) as diagrammed in FIGS. 31 and 32, input is made of mobile body identification data D2 indicating the mobile body 31 to which mobile body information is to be requested (the "mobile work machine 31 icon indicated in FIG. 31), request content identification data D3 indicating the content within the mobile body information that is to be requested (such check boxes as "vehicle position," "service meter," and "fuel quantity" diagrammed in FIG. 31), and terminal device identification data D4 indicating the presentation recipient terminal device 12 to which that request content is to be presented.

When a data setting input operation is effected by the setting means, as diagrammed in the sequence diagram in FIG. 33, a request is made to transmit mobile body information corresponding to the request content identification data D3 to the mobile body 31 corresponding to the mobile body identification data D2 input.

Thereupon, the mobile body 31 that received the request acquires mobile body information D3' corresponding to the request content identification data D3 (by the sensor group 62 diagrammed in FIG. 2).

Thereupon, the acquired mobile body information D3', together with D1, D2, D3, and D4, is transmitted to the presentation recipient terminal device 12 corresponding to the terminal device identification data D4.

Thereupon, as diagrammed in FIG. 28, that acquired mobile body information D3' (such latest data as "vehicle position," "service meter," and "fuel quantity") is presented to that presentation recipient terminal device 12.

Based on the first invention, as noted in the foregoing, a benefit is gained in that, even in a case where a person wishing to obtain information is unable to effect an input operation at the terminal device 12 end, or a case where the information request originator 11 and the information presentation recipient 12 are different, the information D3' required by the presentation recipient 12 person, and that information alone, can be efficiently sent to that presentation recipient 12 from the request originator 11. Hence, when applied in a system for managing a plurality of mobile work machines (construction machines and the like), maintenance inspection jobs and transporting jobs and the like can be performed with extremely good work efficiency.

A second invention of the present invention, moreover, is an apparatus for presenting information on mobile bodies, in which a plurality of mobile bodies, a plurality of terminal devices, and a server apparatus are connected by communication means so that they can reciprocally transmit and receive, and in response to an input operation performed by a terminal device for requesting mobile body information relating to a mobile body, said mobile body information is acquired by said mobile body, and said acquired mobile body information is presented to said terminal device, characterized in that:

said server apparatus is provided with memory means for storing said mobile body information; and updating means for updating memory content of said memory means each time new mobile body information is input;

in response to an input operation performed by a terminal device for requesting mobile body information, content of that request is transmitted via said communication means to a corresponding mobile body;

mobile body that has received request content acquires mobile body information corresponding to said request content, and transmits said acquired mobile body information via said communication means to said server apparatus;

said server apparatus that has received said mobile body information stores that mobile body information in said memory means, and transmits that mobile body information via said communication means to terminal device that performed input operation requesting said mobile body information;

said server apparatus updates memory content of said memory means by said updating means each time new mobile body information is received;

in response to an input operation requesting updated memory content of said memory means having been made by a terminal device, that request content is transmitted via said communication means to said server apparatus; and said server apparatus that has received said request content retrieves updated memory content corresponding to said request content from said memory means, and transmits, via said communication means, those updated memory data to said terminal device that performed input operation requesting said updated memory content.

Based on the second invention, as diagrammed in FIG. 1 and FIG. 33, mobile body information MD acquired by the plurality of mobile bodies 31 to 35 is stored in the memory means 21 (database in server terminal 21) in response to information request input operations from the plurality of terminal devices 11, 12, . . . .

The memory content MD in the memory means 21 is updated every time an information request input operation is effected by the terminal device 11 for the mobile body 31 and new mobile body information D3' is acquired by that mobile body 31.

Then, when an input operation that requests updated memory content MD in the memory means 21 is effected by the setting means in the terminal device 11 (specifically, an operation for acquiring information from a homepage via the internet 2), data indicating the updated memory content MD in the memory means 21 (a browser screen produced by an HTTP server in the server terminal 21 by processing data) are transmitted to that request originator terminal device 11.

Thereupon, as diagrammed in FIG. 27, the updated memory content MD is presented to that request originator terminal device 11 (current positions of mobile bodies 31 to 35 after updating).

Based on the second invention, as described in the foregoing, information MD relating to a plurality of mobile bodies 31 to 35 requested from a plurality of terminal devices 11, 12, . . . , is stored in memory means 21 in one operation. Also, if there is a request from the request originator terminal device 11, the latest updated content MD can be acquired by the request originator terminal device 11, and the latest information MD of the plurality of mobile bodies 31 to 35 can be managed.

When there is a database in each server terminal 21 and 22, by transferring data from one database to the other, mobile body information can be shared by another database, and the memory content of the memory means 21 and the memory means 22 can be made the same content.

A third invention is, in either the first invention or the second invention described above, characterized in that, when an input operation instructing work content to a mobile body is performed by a terminal device, said instructed work content is presented to a terminal device deployed in that instructed mobile body.

Based on this invention, as diagrammed in FIG. 1 and FIG. 3, when an input operation designating work content ("malfunction E has occurred; proceed immediately") for a mobile body 34 (service car) has been effected by the setting means for the terminal device 11 on the manager's end, the designated work content 103 ("malfunction E has occurred; proceed immediately") is presented to the terminal device 13 deployed in that designated mobile body 34. Here, the mobile body information (current position) for the mobile body 31 (mobile work machine) has been obtained by the terminal device 11 on the manager's end, wherefore, if this mobile body information is sent to the terminal device 13 together with the work instruction, an appropriate work instruction will be made to the mobile body 34 (service car), and work (traveling to the destination) will be done efficiently.

A fifth invention is an apparatus for presenting information on mobile bodies, in which a plurality of mobile bodies and a plurality of terminal devices are connected by communication means so that they can reciprocally transmit and receive, and mobile body information relating to a mobile body is presented to a terminal device in response to information request input operation of said terminal device, characterized in that:

display means are deployed for altering display mode of, and displaying, mobile body identifiers for identifying said mobile bodies, according to how communication processing is advancing between said plurality of terminal devices and those mobile bodies, or according to how much time has elapsed since last information request input operation from said plurality of terminal devices to those mobile bodies, in association with said plurality of mobile bodies, respectively.

This invention is now described with reference to FIGS. 1, 16, 18, and 31.

As diagrammed in FIG. 1, a plurality of mobile bodies 31, 32, 33, 34, and 35 and a plurality of terminal devices 11, 12, 21, and 22 are connected by communication means 1 (internet 2, network control station 7, dedicated line 3, satellite ground station 8, feeder line 4, communication satellite 9, radio communications 5) so that they can mutually transmit and receive. Also, mobile body information relating to the mobile body 31 is presented to the terminal device 11 in response to the information request input operation of the terminal device 11.

Here, as diagrammed in FIG. 31, mobile body identifiers (such as icons (pictographs), for example) associated with the plurality of mobile bodies 31 to 35, respectively, are displayed on the terminal device 11. Furthermore, as diagrammed in FIG. 16, the display mode for the mobile body identifier identifying that mobile body 31 changes (to "blue," "yellow," "green," or "red") according to the communication status ("no request," "request in progress," "return transmission made," and "no return transmission") between the mobile body 31 and the plurality of terminal devices 11, 12, . . . .

Accordingly, based on this invention, even when communication means providing poor real time performance are used, the display content changes according to the communication status, so that delays in securing a communication line and the extent of communication delays can be verified from the display screen on the terminal device 11.

As diagrammed in FIG. 18, moreover, the display mode for the mobile body identifier for identifying the mobile body 31 changes (to "no request #0," "no request #1," "no request #2", "no request #3") according to the communications conditions ("no request within 1 day," "no request for from 1 to 3 days," "no request for from 3 days to 1 week," "no request for 1 week or more") between that mobile body 31 and the plurality of terminal devices 11, 12, . . . .

Accordingly, how much time has passed since the last request to the mobile body 31 can be verified on the display screen on the terminal device 11, and management conditions for the mobile body 31 can be ascertained.

A sixth invention, moreover, is an apparatus for presenting information on mobile bodies, in which a plurality of mobile bodies and a plurality of terminal devices are connected by communication means so that they can reciprocally transmit and receive, and mobile body information relating to a mobile body is presented to a terminal device in response to information request input operation of said terminal device, or in response to a transmission from said mobile body itself, characterized in that:

display means are deployed in said terminal devices, which display mobile body identifiers for identifying said mobile bodies, while altering the display mode thereof, according to elapsed time since last mobile body information display was made from said mobile bodies, in association with said plurality of mobile bodies, respectively.

A tenth invention is an apparatus for presenting information on construction machines, in which a plurality of construction machines and a plurality of terminal devices are connected by communication means so that they can reciprocally transmit and receive, and so that construction machine information relating to a construction machine is transmitted, via said communication means, from said construction machine to a terminal device, and presented to said terminal device, characterized in that:

a specific management area or a specific beyond-management area is established for each of said plurality of construction machines; and construction machine information that a construction machine has either departed from said specific management area or entered said beyond-management area is presented on a presentation screen on a terminal device.

An 11th invention is an apparatus for presenting information on construction machines, in which a plurality of construction machines and a plurality of terminal devices are connected by communication means so that they can reciprocally transmit and receive, and so that construction machine information relating to a construction machine is transmitted, via said communication means, from said construction machine to a terminal device, and presented to said terminal device, characterized in that:

construction machine information that engine of one of said construction machines has been started in a specific time frame is presented on a presentation screen of a construction machine.

A 12th invention is an apparatus for presenting information on mobile bodies, in which a plurality of mobile bodies and a plurality of terminal devices are connected by communication means so that they can reciprocally transmit and receive, and mobile body information relating to a mobile body is transmitted from a mobile body to a terminal device, via said communication means, and presented to said terminal device, characterized in that:

said mobile bodies are mobile bodies that carry an internal power supply; and mobile body information that voltage of said power supply has fallen to or below a prescribed level is presented on a presentation screen on a terminal device.

A 13th invention is an apparatus for presenting information on mobile bodies, in which a plurality of mobile bodies and a plurality of terminal devices are connected by communication means so that they can reciprocally transmit and receive, and mobile body information relating to a mobile body is transmitted from a mobile body to a terminal device, via said communication means, and presented to said terminal device, characterized in that:

said mobile bodies are mobile bodies that are made to operate by activation of a starter;

start lock setting means for deactivating said starter and setting said mobile bodies in an operation-suspended condition and start lock release means for releasing said operation-suspended condition are provided in said mobile bodies; and mobile body information that said mobile bodies have been set in an operation-suspended condition by said start lock setting means or information that said operation-suspended condition has been released by said start lock release means is presented on a presentation screen on a terminal device.

A 14th invention is an apparatus for presenting information on mobile bodies, in which a plurality of mobile bodies and a plurality of terminal devices are connected by communication means so that they can reciprocally transmit and receive, and mobile body information relating to a mobile body is transmitted from a mobile body to a terminal device, via said communication means, and presented to said terminal device, characterized in that:

said mobile bodies are mobile bodies that are made to operate by activation of a starter;

start lock setting means for deactivating said starter and setting said mobile bodies in an operation-suspended condition and start lock release means for releasing said operation-suspended condition are provided in said mobile bodies; and mobile body information that said starter has been activated, even though said mobile bodies have been set in an operation-suspended condition by said start lock setting means, is presented on a presentation screen on a terminal device.

A 16th invention is an apparatus for presenting information on construction machines, in which a plurality of construction machines and a plurality of terminal devices are connected by communication means so that they can reciprocally transmit and receive, and construction machine information relating to a construction machine is transmitted, via said communication means, from a construction machine to a terminal device, and presented to said terminal device, characterized in that:

upper limit of travel distance is determined for each of said plurality of construction machines; and construction machine information that one of said construction machines has traveled beyond said upper limit is presented on a presentation screen on a terminal device.

A 17th invention, moreover, is, according to the tenth invention or the 11th invention or the 12th invention or the 13th invention or the 14th invention or the 16th invention or the 17th invention, characterized in that terminal device to which information is presented is a portable terminal device.

An 18th invention, moreover, is, according to the tenth invention or the 11th invention or the 12th invention or the 13th invention or the 14th invention or the 16th invention or the 17th invention, characterized in that information is presented on main presentation screen or first presentation screen at startup of said terminal device.

BRIEF DESCRIPTION OF THE DRAWINGS

FIG. 10 is a diagram for describing conditions wherein an automatic transmission is made from a mobile body;

FIGS. 11(a) and 11(b) are graphs used for describing an embodiment aspect wherein an automatic transmission is made from a mobile body;

FIGS. 12(a) and 12(b) are graphs used for describing an embodiment aspect wherein an automatic transmission is made from a mobile body;

FIGS. 13(a) to 13(c) are diagrams for describing an embodiment aspect wherein power saving operations are performed;

FIG. 28 is a diagram of a display example on a terminal display screen;

FIG. 31 is a diagram of a display example on a terminal display screen;

FIG. 32 is a diagram of a display example on a terminal display screen;

FIG. 34 is a diagram of a display example on a terminal display screen;

FIG. 36 is a diagram of a display example on a terminal display screen;

FIG. 40 is a diagram of a display example on a terminal display screen; and

BEST MODE FOR CARRYING OUT THE INVENTION

An embodiment aspect of the apparatus for presenting information on mobile bodies relating to the present invention is now described with reference to the drawings. In this embodiment aspect, a system is in view for managing work vehicles (machines that travel to do work, inclusive of such construction machines as hydraulic shovels, bulldozers, wheel loaders), mobile work machine transporters (tractor-trailers and the like for transporting mobile work machines), service cars (vehicles that travel to perform servicing such as maintenance or inspections), and vehicles in the vicinity of the mobile work machines such as specialized fuel supply or lube supply vehicles and parts supply vehicles and the like.

Figure 1:
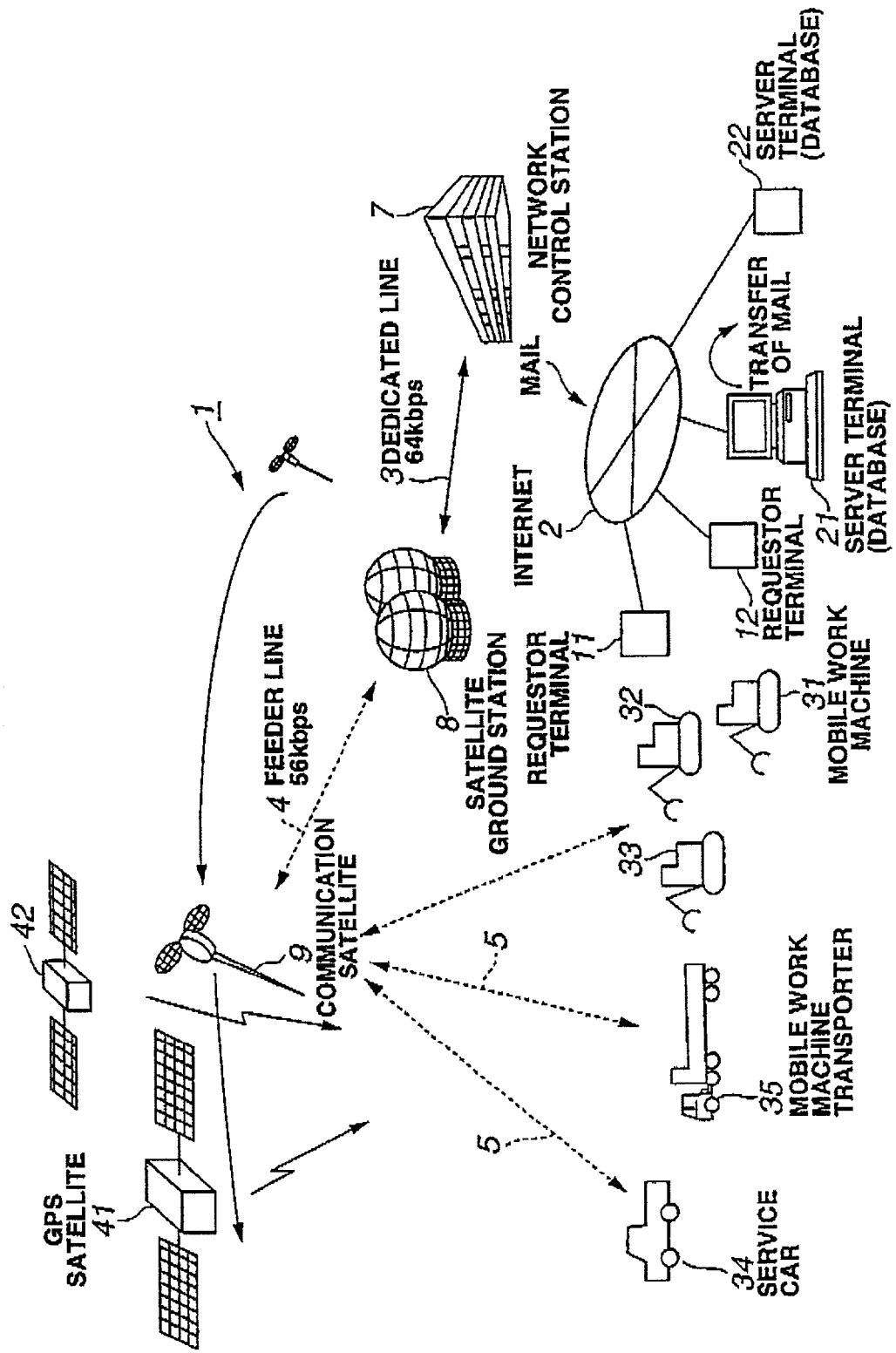
FIG. 1 is a diagram of a communication system in this embodiment aspect.

FIG. 1 represents the overall configuration of the embodiment aspect.

As diagrammed in FIG. 1, in the system in this embodiment aspect, a plurality of mobile bodies 31, 32, 33, 34, and 35 and a plurality of terminal devices 11, 12, 21, and 22 are connected by communication means 1 (internet 2, network control station 7, dedicated line 3, satellite ground station 8, feeder line 4, communication satellite 9, radio communications 5) so that they can mutually transmit and receive.

In other words, construction machines are often rented so that the site where they operate is not precisely known. Also, these machines are sometimes taken overseas. In this embodiment aspect, in order to cope with such problems as these, a communication network is employed wherewith communications can be conducted anywhere on earth. The plurality of mobile bodies 31 to 35 often form a group, moreover, wherefore those multiple mobile bodies 31 to 35 may be interconnected by prescribed communication means to facilitate free communications.

The plurality of mobile bodies 31 to 35 comprises construction machines 31, 32, and 33 such as a bulldozer, hydraulic shovel, crane, and the like, a service car 34 that provides those mobile work machines 31 to 33 with servicing such as maintenance and inspections, and a mobile work machine transporter, i.e. a tractor-trailer 35, for transporting those mobile work machines 31 to 33.

The terminals 11, 12, . . . , are terminal devices (work stations) connected to the internet 2. More specifically, computers such as personal computers are connected via telephone lines to the internet so that they can communications freely. By internet is meant the global communication network wherein multiple LAN (local area networks) are interconnected by gateways and bridges so that they can freely communicate. The internet 2 provides services such as WWW (world wide web=information retrieval system on the internet) and E-mail (electronic mail="letters" sent and received via the internet).

The terminals 11, 12, . . . are deployed in the office of a manager who manages and monitors the plurality of mobile bodies 31 to 35, inside the service car 34, inside the mobile work machine transporter 35, in the offices of users of the mobile work machines 31 to 33, and in the dealer or sales offices for the mobile work machines 31 to 33.

The terminal 21 is a server terminal provided in correspondence with the terminals 11, 12, . . . , and is connected to the internet 2. The server terminal 21 comprises a database, which is to say, memory means. Accordingly, the server terminal 21 provides content stored in the database to the terminals 11 and 12 in response to requests from the terminals 11 and 12.

The terminal 22 is a server terminal provided in correspondence with terminals other than the terminals 11, 12, . . . .

The server terminals 21 and 22 function as mail servers to provide electronic mail services, and also function as HTTP (hypertext transfer protocol) servers to provide WWW services. More specifically, a mail server performs processing to transmit data transmitted from a request originator to a recipient designated by a mail address. And an HTTP server displays homepages as files written in HTML (hypertext markup language) on the display device of the request originator terminal in response to requests from the request originator. A homepage (internet information screen) is displayed using a WWW browser which is data display software. These electronic mail data and homepage data are stored in databases in the server terminals 21 and 22.

The network control station 7 is connected to the internet 2 so that it can communicate freely.

The network control station 7 and satellite ground station 8 are connected by a dedicated land line 3 so that they can communicate freely. Data can be transferred at a communication speed of 64 kbps over that dedicated line 3.

The satellite ground station 8 and communication satellite 9 are connected by a feeder line 4 so that they can communicate freely. Data can be transferred at a communication speed of 56 kbps over this feeder line 4.

The communication satellite 9 and the plurality of mobile bodies 31 to 35 are connected by radio communication lines 5 so that they can communicate freely. The reason for using satellite communications here for the radio communications is that, since such mobile bodies as construction machines are often operated in mountainous areas, forested regions, and remote locations, it is necessary to secure communications with the mobile bodies even in such mountainous regions or the like where coverage cannot be made with ground wave communications. If satellite communications are employed, moreover, it is possible to manage and follow construction machines even when they are taken overseas.

On the internet 2, electronic mail is sent and received using a communication protocol called TCP/IP (transfer control protocol/internet protocol). Electronic mail is sent and received using a different prescribed communication protocol over the dedicated line 3, over the feeder line 4, and by the radio communications 5. Protocol conversion is performed by the network control station 7.

The positions of the mobile bodies 31 to 35 are measured by GPS (global positioning system). Items 41 and 42 are GPS satellites configuring the GPS. More specifically, radio signals sent from the GPS satellites 41 and 42 are received by receivers carried on board the mobile bodies 31 to 35, provisional distances from the GPS satellites 41 and 42 to the receiver are found, based on time differences between the transmission times at the GPS satellites 41 and 42 and the reception times at the receiver, corrections are applied thereto to compute the true distances, and the two-dimensional position of the receiver (which is to say the positions of the mobile bodies 31 to 35) on earth is measured from those true distances.

The terminals 11 and 12 and the server terminals 21 and 22 are provided both with computer input devices (mouses, track balls, keyboards, and the like.) and with display devices configured with liquid crystal displays or CRTs or the like. The display screens for these display devices are described further below.

Figure 2:
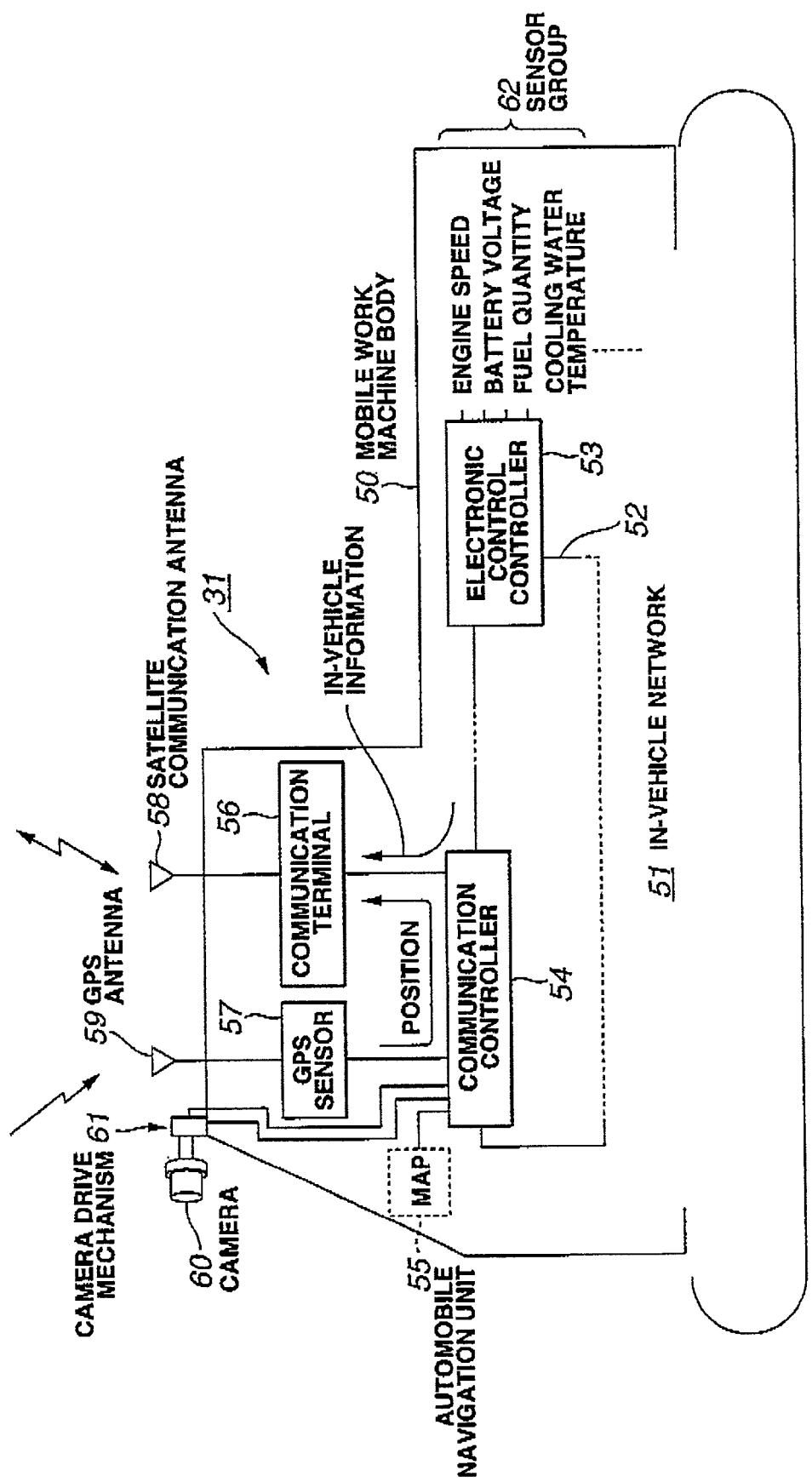
FIG. 2 is a diagram of the configuration of a mobile vehicle body in an embodiment aspect.

FIG. 2 is a block diagram of the configuration of the mobile bodies 31 to 35, wherein the mobile work machine 31 is diagrammed representatively.

Inside the vehicle body 50 of the mobile work machine 31, as diagrammed in FIG. 2, are provided a satellite communication antenna 58 for sending and receiving data relating to electronic mail between the communication satellite 9, a communication terminal 56 for performing electronic mail sending and receiving processing between the communication satellite 9, a GPS antenna 59 for receiving radio signals transmitted from the GPS satellites 41 and 42, a GPS sensor 57 for detecting the current position of the mobile work machine 31 based on the radio signals received from the GPS satellites 41 and 42, a camera 60, for capturing images of the exterior of the vehicle body 50, mounted on the top of the cabin of the vehicle body 50, a camera drive mechanism 61 for driving the camera 60 and regulating the direction of image-capture and lens zoom and the like, an automobile navigation unit 55, a communication controller 54 connected so that signals can be sent and received between the automobile navigation unit 55, and various controllers such as an electronic control controller 53 provided in each part of the vehicle body 50. By automobile navigation unit is meant a device which displays the current position of that vehicle detected by GPS sensor on a map on a display screen. The automobile navigation unit 55 is provided in the service car 34 and the mobile work machine transporter 35. In this case, the automobile navigation unit 55 functions as the terminals 13 and 14 equivalent to the terminal 11 and the terminal 12. For this reason, as will be described subsequently, the position of that vehicle is displayed on the display screen of the automobile navigation unit 55, and, together therewith, the position of the mobile work machine that is to be the work subject is displayed, and the most efficient route to that work subject is determined.

To the various controllers such as the communication controller 54 and electronic control controller 53, connection is effected in daisy chain fashion by a signal line 52 so that serial communications are made possible, configuring an in-vehicle network 51.

More specifically, frame signals of a prescribed protocol are sent over the signal line 52. When frame signals are sent to the controllers 53, 54, . . . , drive signals are output, corresponding to data coded in the frame signals, to actuators (hydraulic pumps, governors, control valves, and the like.) connected to the controllers 53, 54, . . . , whereupon those actuators are drive-controlled, detection data detected by sensors connected to the controllers 53, 54, . . . and/or data representing internal information in instruments are acquired and coded in frame signals.

To the electronic control controller 53 is connected a sensor group 62 which detects information (called mobile body information) relating to the mobile body 31 such as engine r.p.m., battery voltage, fuel quantity, cooling water temperature, and anomaly occurrence (error code) and the like. Accordingly, data relating to mobile body information detected by this sensor group 62 are coded in frame signals and sent over the signal line 52 to the communication controller 54.

To the communication controller 54 are fetched position data detected by the GPS sensor 57 as well as image data captured by the camera 60. In the communication controller 54 are also generated drive instructions for the camera drive mechanism 61. When these drive instructions are output to the camera drive mechanism 61, the camera drive mechanism 61 regulates the direction of image-capture and lens zoom of the camera 60. These data, namely the position data for the mobile body 31 detected by the GPS sensor 57 and the image data showing what is outside the vehicle body 50 acquired by the camera 60, are contained in the "mobile body information."

The communication terminal 56, after interpreting the content of the electronic mail received by the satellite communication antenna 58 from the terminals 11 and 12, performs processing to produce electronic mail containing response content corresponding to that request content and send that electronic mail back.

More specifically, the mobile body information detected by the sensor group 62 of the electronic control controller 53 and the mobile body information detected by the GPS sensor 57 and captured by the camera 60, in response to the request content of the electronic mail transmitted in, are sent from the communication controller 54 to the communication terminal 56 and incorporated into the electronic mail for return transmission.

Display data corresponding to the work instruction content of the electronic mail that has been transmitted in are sent from the communication controller 54 to the automobile navigation unit 55 and displayed on a display screen.

Now, to the terminals 11 and 12 are applied mail addresses that respectively specify those terminals 11 and 12. Similarly, to the mobile bodies 31 to 35 are applied mail addresses that respectively specify those mobile bodies 31 to 35.

In the memory means 21, the content of electronic mail sent from the terminals 11 and 12 to the mobile bodies 31 to 35 is stored in mail boxes, associated with the mail addresses of those mobile bodies 31 to 35. In the server terminal (mail server) 21, the mail boxes of the mobile bodies 31 to 35 are searched, and data requesting that the electronic mail contained in the mail boxes be retrieved are transmitted to the corresponding mobile bodies 31 to 35. At the mobile bodies 31 to 35 which receive those data, data to the effect that the electronic mail in the corresponding mail boxes will be received are transmitted to the server terminal 21.

Thereupon, electronic mail is transmitted from the server terminal 21 to the mobile bodies 31 to 35.

Similarly, the content of electronic mail sent by return transmission to the terminals 11 and 12 from the mobile bodies 31 to 35 is stored in mail boxes associated with the mail addresses of those terminals 11 and 12. At the server terminal (mail server) 21, the mail boxes for each of the terminals 11 and 12 are searched, and data requesting that the electronic mail in those mail boxes be retrieved are transmitted to the corresponding terminals 11 and 12. At the terminals 11 and 12 which have received those data, data to the effect that the electronic mail in the corresponding mail boxes will be received are transmitted to the server terminal 21. Thereupon electronic mail is transmitted from the server terminal 21 to the terminals 11 and 12.

In the server terminal 21, stored in memory, is a communication condition information extraction program for acquiring information on the outgoing-transmission conditions affecting electronic mail transmitted from the terminals 11 and 12 to the mobile bodies 31 to 35 and on the return-transmission conditions affecting electronic mail sent by return transmission from the mobile bodies 31 to 35 to the terminals 11 and 12. When this communication condition information extraction program is run, communication condition information data representing current communication condition information are generated.

In the server terminal 21, meanwhile, stored in memory, is a mobile body information extraction program which searches the mail boxes of each of the terminals 11 and 12, and extracts mobile body information from the content of the electronic mail sent by return transmission to the terminals 11 and 12. When this mobile body information extraction program is run, all mobile body information data MD representing the latest information on all of the mobile bodies are generated. By all mobile body information data MD are meant data of content wherein the latest mobile body information is associated for each of the mobile bodies 31 to 35.

Here, in the server terminal 21, a homepage for managing and monitoring the mobile bodies 31 to 35 is produced and stored in a database as data having a prescribed link structure. The display screens of the homepage are depicted in FIGS. 27 to 32. In this specification, moreover, a homepage is defined as a general term for a linked series of pages that follows a top page.

In the server terminal 21, stored in memory, is a homepage update processing program for updating data in the related display screens of the homepage in accordance with the communication condition information data and the all mobile body information data MD described earlier. When this homepage update processing program is run, mobile body information in the related display screens of the homepage is updated according to the latest all mobile body information data MD stored in memory in the server terminal 21 and the communication condition information in the related display screens of the homepage is updated according to the current communication condition information stored in memory in the server terminal 21. As to time sequence data (the fuel quantity time sequence data indicated in FIG. 29), the latest data are added and the oldest data are deleted.

The operation of this embodiment aspect is described next.

Let it be assumed that the terminal 11 is a terminal deployed at the manager's end, for example, for the mobile bodies 31 to 35.

When the WWW browser in this terminal 11 at the manager's end is opened, homepage data are read out from the server terminal 21 by the WWW browser and displayed on a display screen of the display device of the terminal 11.

Figure 27:
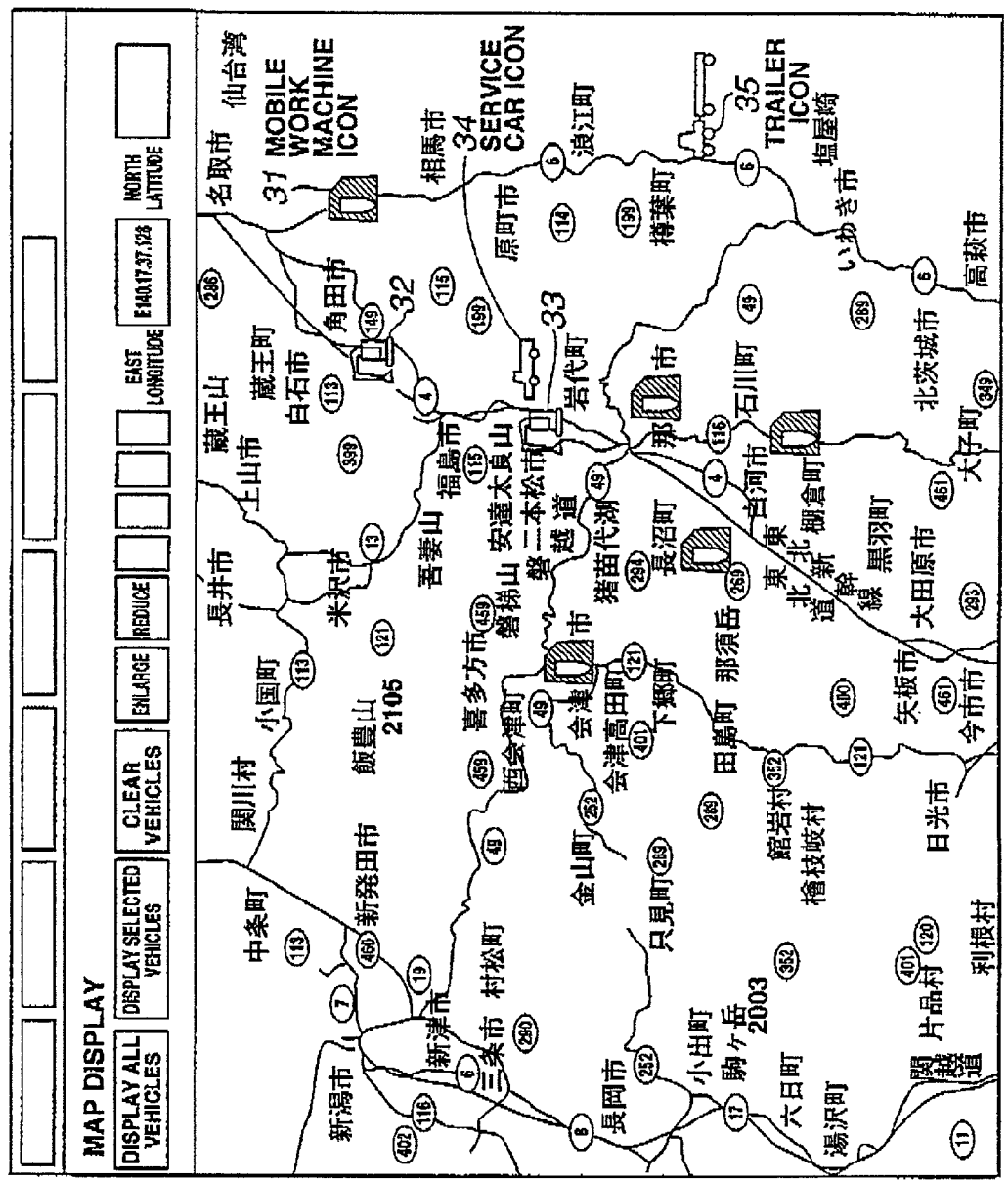
FIG. 27 is a diagram of a display example on a terminal display screen.

In FIG. 27 is represented a map display screen that is part of the homepage displayed on the display device of the terminal 11. The data for this map are stored in memory in the terminal 11 computer. As diagrammed in FIG. 27, icons (pictographs) specifying each of the mobile bodies 31 to 35 are respectively displayed superimposed on the map. Because provision is made for displaying in the form of icons, the type of the mobile bodies 31 to 35 (bulldozer, hydraulic shovel, wheel loader, tractor-trailer, service car) can readily be distinguished on the screen. The position of the icons on the map corresponds to the latest mobile body positions detected by the GPS sensor 57 in each of the mobile bodies 31 to 35 and stored in the database in the server terminal 21.

When an input operation (key operation, mouse click operation, or the like) is effected by an input device of the terminal 11 to cause the homepage display screen to sequentially switch to the next page, sequential shifts are made from the current screen to the next display screen. By effecting a mouse click input operation on the icon of the mobile body one wishes to display (say, the mobile work machine 31, for example), selected from among the icons of the mobile bodies 31 to 35 displayed on the display screen in this case, a display screen can be shifted to which represents detailed information only for that mobile work machine which one wishes to display.

FIG. 31, for example, represents a display screen that displays a list of information for all of the mobile bodies 31 to 35.

When the icon of the mobile body (the mobile work machine 31, for example) for which one wishes to display detailed information on the display screen represented here in FIG. 31 is clicked on, the display screen represented in FIG. 28 is shifted to, and the latest mobile body information relating to the specified mobile work machine 31 is displayed on the display screen. It is also possible, similarly, to shift to the display screen representing the detailed mobile body information for the specific mobile body represented in FIG. 28 from the map display screen for all of the mobile bodies 31 to 35 diagrammed in FIG. 27.

In FIG. 28 is represented a screen that displays latest data on individual machine or vehicle types.

Figure 6:
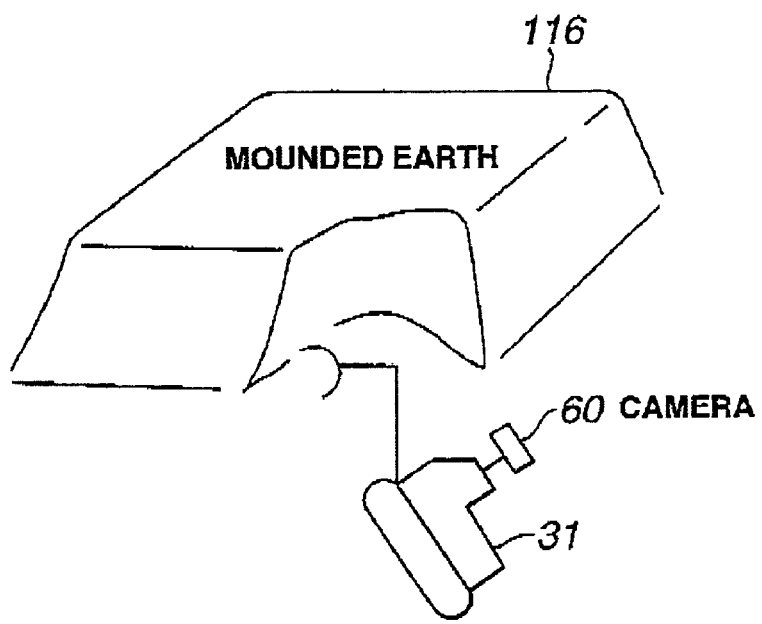
FIG. 6 is a diagram of a mobile body carrying a camera, doing work.

As represented in FIG. 28, mobile body information for a specific mobile body (mobile work machine 31, for example) is displayed, namely the current position thereof, service meter value, fuel quantity, engine r.p.m., engine cooling water temperature, battery voltage, hydraulic pump discharge pressure, oil level, abnormalities (error codes), images captured by the camera, and the like. In a case where the mobile work machine 31 is digging in a mounded up pile of earth 116, as depicted in FIG. 6, for example, how the mounded up pile of earth 116 is being dug is captured by the camera 60. As a result, on the display screen on the terminal 11, as diagrammed in FIG. 28, an image of that mounded up pile of earth 116 is displayed. For that reason, the progress of the work being done by the mobile work machine 31 at a remote site can be visually ascertained on the terminal 11.

Figure 29:
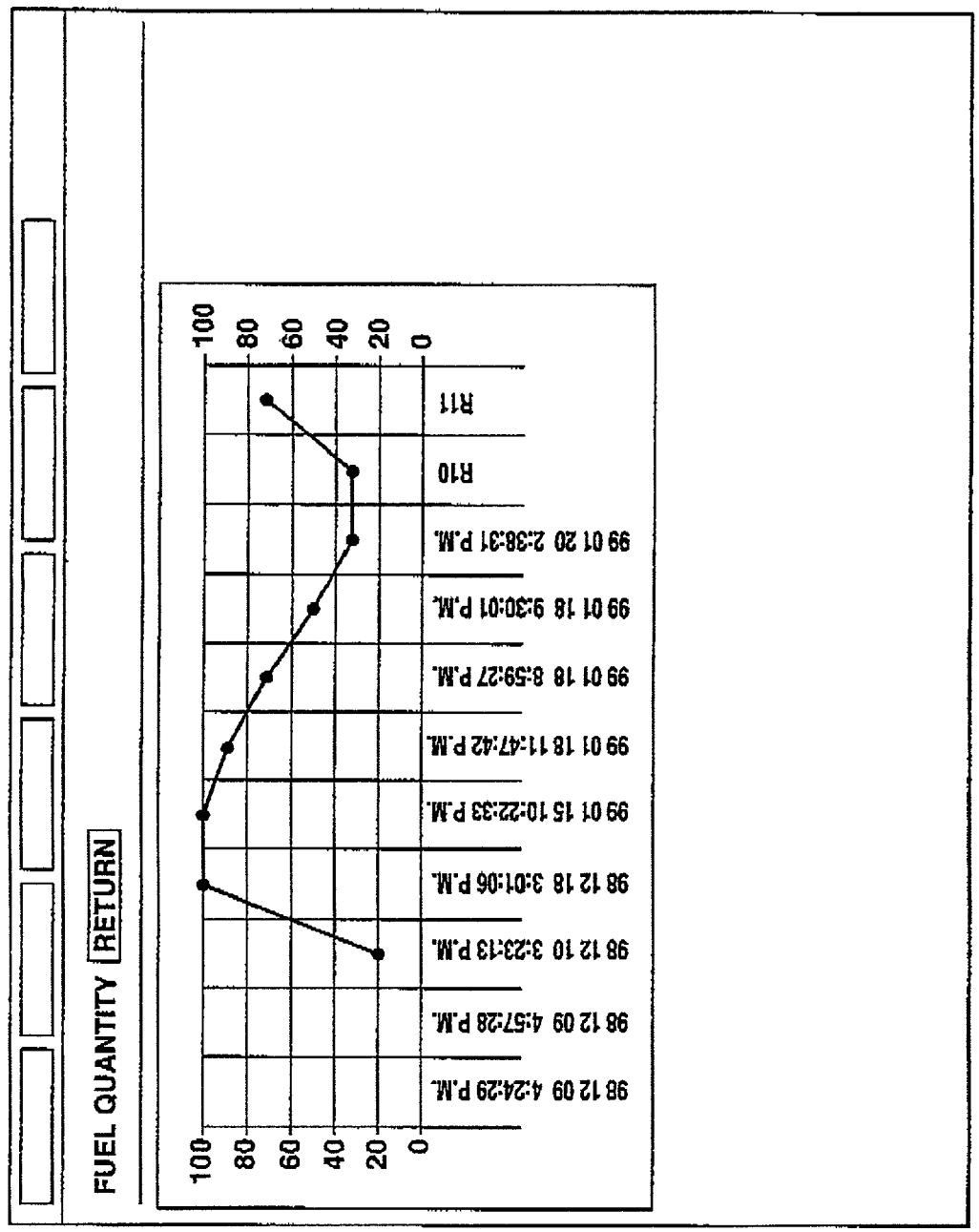
FIG. 29 is a diagram of a display example on a terminal display screen.

On the display screen represented here in FIG. 28, if a button for specific mobile body information pertaining to which one wishes to display time sequence data, such as the fuel quantity "graph" button, for example, is clicked on, the display screen diagrammed in FIG. 29 is shifted to, and a graph representing time sequence changes in the fuel quantity is displayed on the display screen.

Figure 30:
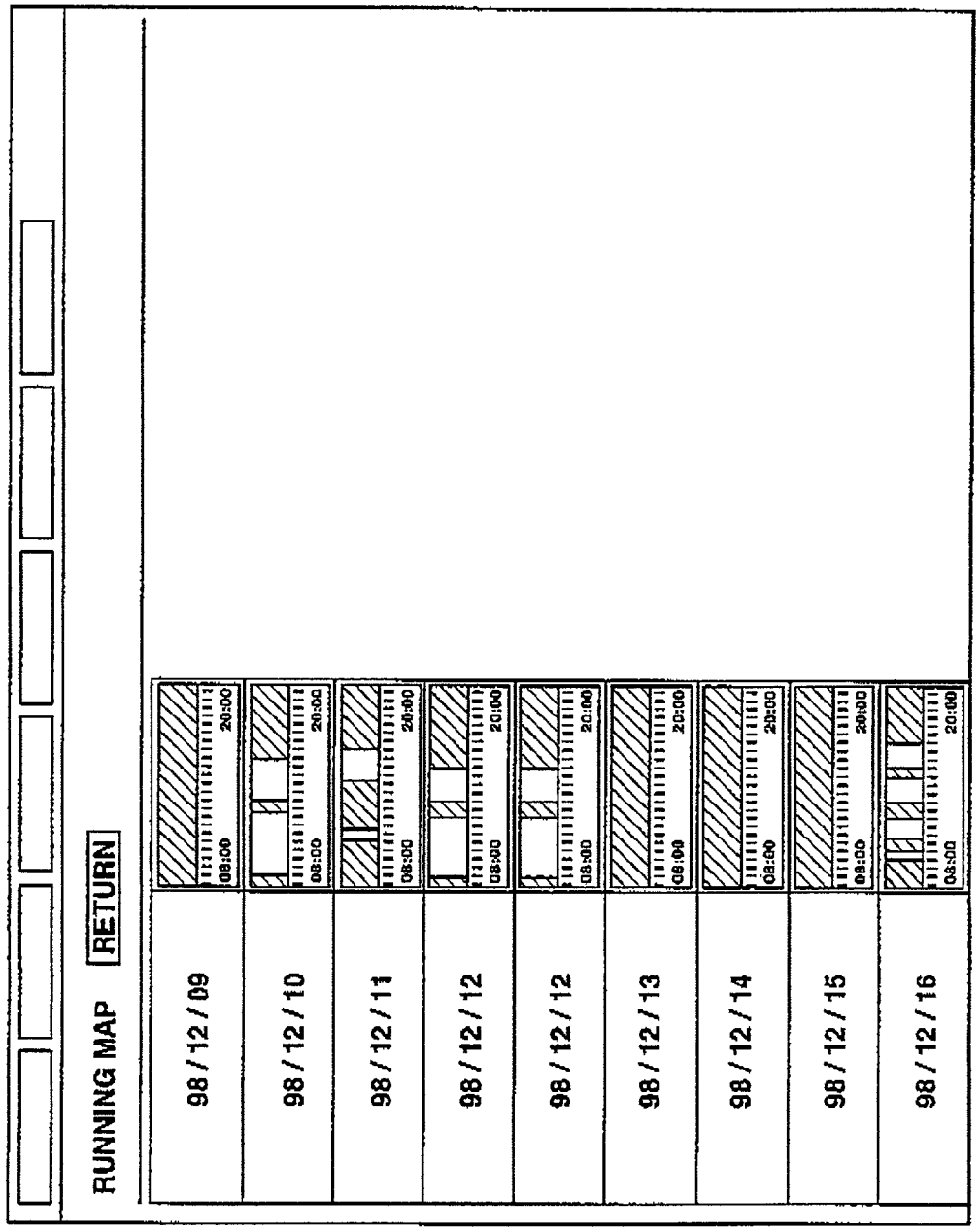
FIG. 30 is a diagram of a display example on a terminal display screen.

On the display screen diagrammed in FIG. 28, moreover, if the running map button is clicked on, the display screen diagrammed in FIG. 30 is shifted to, whereupon the running times (engine running times) of the mobile work machine 31 are represented in bar graphs by date. Thus a manager can easily ascertain the operating rate (productivity) of the specific mobile work machine 31 from the running map diagrammed in FIG. 30.

Similarly, time sequence data on the occurrence of anomalies (error codes) in the mobile work machine 31, that is, a history of anomaly occurrence, can be displayed on the display screen. Thus, judging by the history of past anomaly occurrences, appropriate measures can be taken in dealing with a new anomaly occurrence. Also, because the content of an anomaly occurrence can be unmistakably and promptly confirmed at the terminal 1, corrective measures can be taken with few personnel without dispatching a specialist technician to the site.

A description is given next of the content of processing performed when making a request for the latest mobile body information for a specific mobile body from a homepage display screen on the terminal 11.

In this case, on the display screen diagrammed in either FIG. 31 or FIG. 27, the icon of the mobile body (the mobile work machine 31, for example) for which one wishes to request the latest mobile body information, selected from among all of the mobile bodies 31 to 35, is clicked on. As a result, request recipient identification data D2 the content whereof is "mobile body 31" are generated.

Next, the display screen is shifted to the request execution display screen diagrammed in FIG. 32 by performing an input operation to shift the display screen.

Then the check box for the item to be requested, selected from among the items of mobile body information indicated in FIG. 32, namely "vehicle position," "service meter," "fuel quantity," "work mode," "vehicle body alarm 1" (error code 1), "vehicle body alarm 2" (error code 2), "battery voltage," "engine water temperature," "engine r.p.m.," "pump pressure,". . . , "oil level,". . . , "camera image," is clicked on. Thus the mobile body information (such as "vehicle position" and "fuel quantity," for example) to be requested from among all the mobile body information for the mobile work machine 31 is selected, and requested information identification data D3 the content whereof is "vehicle position" and "fuel quantity" is generated. Thus it is possible to select at will and request, through an input device of the terminal 11, not only mobile body information that is basic for management purposes, such as vehicle position and service meter values or other operating rate and the like, but also mobile body information needed for maintenance and inspection purposes, such as fuel quantity or battery voltage. It is also possible to operate and regulate the camera drive mechanism 61 by input operations at the terminal 11 that affect the direction of image-capture and lens zoom of the camera 60.

However, as the information volume of the mobile body information to be requested becomes larger, the data communication volume also rises, and communication charges increase. Thereupon, in order to have the requesting party at the terminal 11 grasp what the communication charges are and be aware of the economics involved, transmitted and received data volumes are displayed at the stage where a mobile body information item is selected. More specifically, numerical values for "transmission bytes," "reception bytes," and "bytes charged this month" are displayed together with "current byte count." Alternatively, the communication charges themselves may be displayed instead of the communication data volume.

From the check boxes diagrammed in FIG. 32 for the terminals that are return transmission recipient terminals, namely "manager A (terminal 11)," "manager B," "service car," "tractor-trailer (terminal 12),". . . , the terminal at the display recipient where the mobile body information is to be displayed is clicked on. Thus the terminal (terminal 12, for example) at the display recipient is selected from among the terminals 11, 12, . . . , and display recipient identification data D4 the content whereof is "terminal 12" are generated.

The terminal 12 is a terminal provided for the operator of the mobile work machine transporter (tractor-trailer) 35.

Figure 33:
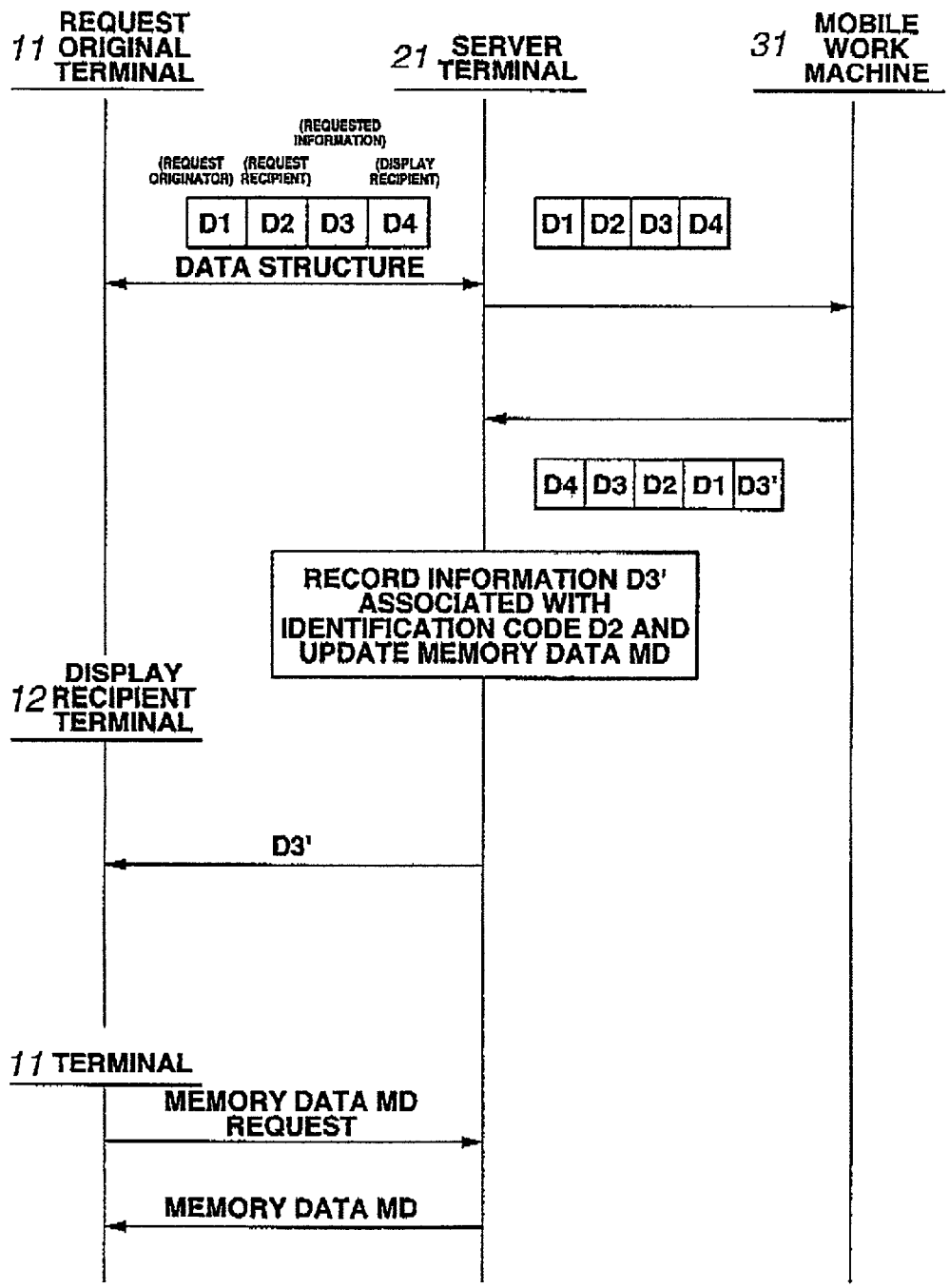
FIG. 33 is a sequence diagram representing communication control processing procedures in an embodiment aspect.

FIG. 33 represents communication control processing procedures with a sequence diagram. The description which follows makes reference to this drawing.

When an input operation is effected for the data described above on the terminal 11 of the request originator, request originator identification data D1 indicating the terminal (terminal 11) of the request originator, request recipient identification data D2 indicating the mobile body (mobile work machine 31) of the request recipient, and display recipient identification data D4 indicating the terminal (terminal 4) at the display recipient are transmitted to the server terminal 21 as electronic mail with a data structure that accords with the communication protocol in the internet 2, that is, from the terminal 11 to the server terminal 21. The request originator identification data D1 ("terminal 11") here corresponds to the mail address of the request originator terminal 11. The display recipient identification data D4 ("terminal 12") corresponds to the mail address of the display recipient terminal 12. And the request recipient identification data D2 ("mobile work machine 31") corresponds to the mail address of the mobile work machine 31.

The server terminal 21 receives transmitted electronic mail, reads in the request recipient identification data D2, and stores the content of the electronic mail in the mail box of the mobile work machine 31 corresponding to those request recipient identification data D2 ("mobile work machine 31").

The server terminal (mail server) 21 transmits data to the mobile work machine 31 requesting it to come retrieve the electronic mail in the mail box. That is, a response request signal is transmitted from the communication satellite 9 to the mobile work machine 31 over the radio communications line 5. The transmission of this response request signal from the communication satellite 9 to the mobile work machine 31 is performed continuously because it will often be unknown whether communications are possible or not with the mobile work machine 31 in an environment where the communications conditions are not good, for example. Over against that, a confirmation as to whether or not there is a response request signal will be made intermittently from the mobile work machine 31 to the communication satellite 9. The confirmation of the presence or absence of the response request signal is performed by conducting sensing for a radio signal indicating a response request signal being transmitted down from the communication satellite 9. Accordingly, the request can be definitely communicated from the communication satellite 9 to the mobile work machine 31. This confirmation of the presence or absence of a response request signal (sensing for a radio signal indicating a response request signal) is performed either when a certain event occurs or after a prescribed time interval has elapsed after a certain even has occurred.

For example, that the engine of the mobile work machine 31 has been started can be detected and that detection signal used as a trigger in performing the confirmation of the presence or absence of a response request signal. In that case, provision may be made so that a confirmation is made of the presence or absence of a response request signal only when the engine is first started in the day.

Or that an anomaly has occurred in the mobile work machine 31 can be detected and that detection signal used as a trigger in performing the confirmation of the presence or absence of a response request signal.

Or a confirmation can be made of the presence or absence of a response request signal at a point in time when a prescribed time interval has elapsed since the last transmission was made by the mobile work machine 31, and the next transmission then made.

The certain event or prescribed time interval noted above can be altered at will. Provision may be made for making such alteration by an input operation using an input device of the terminal 11.

When, as a result of the confirmation of the presence or absence of the response request signal, it is found that there is a response request signal, the mobile work machine 31 transmits data to the effect that the electronic mail in its own mail box will be received, via the communication satellite 9 to the server terminal 21. As a result of that, electronic mail is transmitted from the server terminal 21 to the mobile work machine 31.

More specifically, the electronic mail is transmitted via the internet 2 to the network control station 7, and the electronic mail data are subjected to a protocol conversion. The electronic mail, after protocol conversion, is sent to the dedicated line 3. Then the electronic mail is transmitted via the satellite ground station 8, feeder line 4, communication satellite 9, and radio communications line 5 to the mobile work machine 31, and is received by the satellite communication antenna 58 of the mobile work machine 31.

The communication terminal 56 in the mobile work machine 31 reads the request information identification data D3 ("vehicle position," "fuel quantity") from the electronic mail received by the satellite communication antenna 58, and instructs the communication controller 54 to fetch the mobile body information corresponding to that request information identification data D3, that is, the vehicle position data and fuel quantity data, into that mobile work machine 31.

At the communication controller 54 that has received, the vehicle position data currently being detected by the GPS sensor 57 is sent to the communication terminal 56. Also, data to the effect that the "fuel quantity" should be acquired by the electronic control controller 53 are coded in a frame signal and sent to the signal line 52. At the electronic control controller 53, the content coded in the frame signal is read, and current fuel quantity detection data are collected from the sensor group 62 in that electronic control controller 53 and coded in a frame signal. Then that frame signal is sent over the signal line 52 to the communication controller 54. At the communication controller 54, the fuel quantity data coded in the frame signal are read out and sent to the communication terminal 56. As a result, at the communication terminal 56, the vehicle position data and fuel quantity data are incorporated as mobile body information data D3' into electronic mail for return transmission.

From the communication terminal 56, by the satellite communication antenna 58, return transmission originator identification data D2 (mobile work machine 31) indicating the return transmission originator mobile body, return transmission recipient identification data D4 (terminal 12) indicating the return transmission recipient terminal, and mobile body information data D3' indicating the mobile body information (vehicle position data and fuel quantity data) are transmitted to the communication satellite 9 as electronic mail for return transmission in a data structure that accords with the prescribed communication protocol. D1 and D3 are also transmitted. D1 can be used as a key for sorting communication charges to each charge incurring entity. Also, D3 is used for identifying the content of D3'. Here, the return transmission originator identification data D2 ("mobile work machine 31") corresponds to the mail address of the mobile work machine 31. And the return transmission recipient identification data D4 ("terminal 12") corresponds to the mail address of the display recipient terminal 12.

The electronic mail for return transmission is received by the communication satellite 9, and then transmitted via the feeder line 4, satellite ground station 8, and dedicated line 3 to the network control station 7. At that network control station 7, the data of the electronic mail for return transmission are subjected to a protocol conversion, and the electronic mail for return transmission, after protocol conversion, is sent to the internet 2.

The server terminal 21 receives the transmitted electronic mail, reads the return transmission recipient identification data D4, and stores the content of the electronic mail in the mail box of the terminal 12 corresponding to that return transmission recipient identification data D4 ("terminal 12").

Then the mobile body information extraction program is run, the mobile body information data D3' ("vehicle position data" and "fuel quantity data") and the return transmission originator identification data D2 ("mobile work machine 31") are extracted from the content of the electronic mail stored in the mail box of the terminal 12, and the latest vehicle position data and fuel quantity data are stored in memory, associated with the address of the mobile work machine 31. In this manner the content of the all mobile body information data MD is updated.

The server terminal (mail server) 21 transmits data to the terminal 12 requesting the electronic mail in the mail box to be retrieved. The terminal 12 that received that data transmits data to the server terminal 21 to the effect that the electronic mail in the mail box will be received. As a result, electronic mail is transmitted from the server terminal 21 to the terminal 12. The data transmitted can be restricted according to the security level of D4.

When electronic mail is received by the terminal 12 of the operator of the mobile work machine transporter 35, the return transmission originator identification data D2 (mobile work machine 31) and the mobile body information data D3' (vehicle position data and fuel quantity data) are read out from the electronic mail data. Thereupon, on the display screen on the terminal 12, the contents of the electronic mail, that is, the current position of the mobile work machine 31 and the fuel currently remaining therein, are displayed.

For this reason, the operator of the transporter vehicle 35, from the display screen on the terminal 12, can recognize the specific mobile work machine type 31 for which transport has been designated from the manager's end, and can recognize the current position and current fuel quantity which he or she needs to know in order to transport that mobile work machine 31. Not only so, but the operator at the terminal 12 can obtain just the information necessary for the job from the display screen on the terminal 12 without performing an information request input operation. In other words, an operator who wishes to obtain information, even when in a situation wherein he or she is unable to perform an input operation, at the terminal 12 end, can obtain information necessary for a job. Hence the work of transporting the mobile work machine 31 can be done extremely efficiently.

In the embodiment aspect described in the foregoing, furthermore, although provision is made so that information required for transportation is displayed at the terminal 12 of the operator of the transporter vehicle 35 by effecting a request input operation at the terminal 11 on the manager's end, an embodiment is also possible wherewith information required for such servicing as maintenance or inspection is displayed at the terminal 12 of a service person who drives the service car 34, by effecting a request input operation at the terminal 11 on the manager's end.

In that case, similarly, electronic mail that contains, as mobile body information, the current position data and service meter value, and anomaly data for the mobile work machine 31, is transmitted from the terminal 11 at the manager's end via the mobile work machine 31 to the terminal 12 on the service person's end.

When the electronic mail is received by the terminal 12 on the service person's end, the return transmission originator identification data D2 (mobile work machine 31) and the mobile body information data D3' (vehicle position data and anomaly data (error codes)) are read out from the electronic mail data. Thereupon, on the display screen on the terminal 12, the contents of the electronic mail, that is, the current position and the current anomaly occurrence items (error codes) for the mobile work machine 31, are displayed.

Thus a service person driving the service car 34, from the display screen on the terminal 12, can recognize the specific type of mobile work machine 31 for which servicing is instructed from the manager's end, and can also recognize the current vehicle position and current anomaly occurrence items (error codes) required for the servicing of that mobile work machine 31. In addition, as far as the service person at the terminal 12 is concerned, he or she can obtain just that information needed for the job from the display screen on the terminal 12 without performing an information request input operation. In other words, a service person who wishes to obtain information, even when in a situation wherein he or she is unable to perform an input operation, at the terminal 12 end, can obtain information necessary for a job. Hence such work as maintaining and inspecting the mobile work machine 31 can be done extremely efficiently.

A case is considered next where the terminal on the manager's end is the server terminal 21.

In this case, by effecting a request operation input at the terminal 12 of the service person who drives the service car 34, information required for managing a plurality of mobile bodies in a unified manner can be displayed on the server terminal 21 on the manager's end. In the case where a service person has replenished the oil in the mobile work machine 31, for example, that service person himself or herself has recognized on site that the oil has been thoroughly replenished, wherefore there is no need to confirm that fact again on the display screen on the terminal 12. There is a need, however, to present information to the manager's end so that the fact that the oil replenishing operation has been finished and the time the oil was replenished can be managed.

In this case also, similarly, electronic mail that contains, as mobile body information, the current oil level data for the mobile work machine 31 is transmitted from the terminal 12 at the service person's end via the mobile work machine 31 to the server terminal 21.

When the electronic mail is received by the server terminal 21, the return transmission originator identification data D2 (mobile work machine 31) and the mobile body information data D3' (oil level data) are read out from the electronic mail data. Thereupon, on the display screen of the server terminal 21, the content of the electronic mail, that is, the current oil level of the mobile work machine 31, is displayed.

Hence the manager, from the display screen of the server terminal 21, can recognize the specific type of the mobile work machine 31 for which the oil replenishment servicing has been finished, and can also recognize the current oil level which is necessary to know to manage the mobile work machine 31. In addition, as far as the manager at the server terminal 21 is concerned, just that information which is necessary for managing can be obtained from the display screen of the server terminal 21 without performing an information request input operation. In other words, a manager who wishes to obtain information, even when in a situation wherein he or she is unable to perform an input operation, at the server terminal 21, can obtain information necessary for managing a mobile body. Hence the work of managing the mobile bodies 31 to 35 in a unified manner can be done extremely efficiently.

In the embodiment aspect described in the foregoing, the terminal of the request originator and the terminal of the display recipient are made different, but the request originator terminal and display recipient terminal may be made the same.

For example, by performing a request input operation at the terminal 11 of the operator of the mobile work machine 31, information necessary for a work-start inspection can be displayed on the same terminal 11. The operator of the mobile work machine 31 performs that request input operation at the terminal 11 in the office prior to boarding the vehicle.

In this case also, similarly, electronic mail that contains, as mobile body information, the current fuel quantity data and oil level data for the mobile work machine 31, is transmitted from the terminal 11 via the mobile work machine 31 to the terminal 11.

When the electronic mail is received at the terminal 11, the return transmission originator identification data D2 (mobile work machine 31) and the mobile body information data D3' (fuel quantity data and oil level data) are read out from the electronic mail data. Thereupon, on the display screen on the terminal 11, the contents of the electronic mail, namely the current fuel quantity and oil level for the mobile work machine 31, are displayed.

Hence the operator of a mobile work machine can, from the display screen on the terminal 11, recognize the current fuel quantity and oil level needed to be known for a work-start inspection on the specific type of mobile work machine 31 that he or she is to board. In this case, as far as the operator at the terminal 11 is concerned, he or she is able to obtain beforehand, from the display screen on the terminal 11, just that information required for a work-start inspection, without actually moving to the mobile work machine 31. Thus the work-start inspection can be performed easily and efficiently, and potential problems discovered during the work-start inspection can be dealt with before they become real problems.

Similarly, by implementing a request input operation at the terminal 11 of the operator of the mobile work machine transporter 35, information necessary for a transport job can be displayed on that same terminal 11. Thus the operator of the mobile work machine transporter 35 is able, from the display screen on the terminal 11, to recognize the mobile body information (current position, current fuel quantity, and the like) needed for transporting the specific type of mobile work machine 31 that is to be transported. In this case, as far as the operator at the terminal 11 is concerned, he or she is able to obtain beforehand, from the display screen on the terminal 11, just that information required for a transport job, without actually moving to the mobile work machine 31. Thus the transport job can be performed easily and efficiently, and potential problems dealt with before they become real problems.

Similarly, by effecting a request input operation at the terminal 11 of the service person operating the service car 34, information necessary to such servicing as maintenance and inspections and the like can be displayed on that same terminal 11. Hence the service person operating the service car 34 is able, from the display screen on the terminal 11, to recognize mobile body information (current position, anomaly occurrence, service meter value) needed to service the specific type of mobile work machine 31 that is to be serviced. In this case, as far as the service person at the terminal 11 is concerned, he or she is able to obtain beforehand, from the display screen on the terminal 11, just that information required for a servicing job, without actually moving to the mobile work machine 31. Thus the servicing of the mobile work machine 31 can be performed easily and efficiently, and potential problems dealt with before they become real problems. In other words, anomalous conditions can be recognized before actually moving to the mobile work machine 31, and parts acquisition, requests for support personnel, and studies on repair methods can be accomplished efficiently.

Based on this embodiment aspect, moreover, a benefit is realized in that the latest all mobile body information data MD relating to the plurality of mobile bodies 31 to 35 updated by request input operations from the plurality of terminals 11, 12, . . . , can be displayed on any terminal (terminal 11, for example). This is now described, making reference again to FIG. 33.

That is, as described already, when electronic mail for return transmission is transmitted to the server terminal 21 from the mobile work machine 31, the mobile body information extraction program is run at the server terminal 21, the mobile body information data D3' ("vehicle position data," "fuel quantity data") and the return transmission originator identification data D2 ("mobile work machine 31") are both extracted from the content of the electronic mail stored in the mail box of the display recipient terminal 12, and the latest vehicle position data and fuel quantity data are stored in memory, associated with the address of the mobile work machine 31. Thus the content of the all mobile body information data MD is updated. At the server terminal 21, moreover, the homepage update processing program noted earlier is run, and the mobile body information on the relative display screen of the homepage is updated according to the latest all mobile body information data MD stored in memory in the server terminal 21. As to time sequence data (the fuel quantity time sequence data and the like indicated in FIG. 29), the latest data are added and the oldest data are deleted.

Thereupon, when the WWW browser is opened at terminal 11, updated homepage data are read out from the server terminal 21, by the WWW browser. As a consequence, mobile body information that has been updated by the latest all mobile body information data MD is displayed on the display screen of the display device of the terminal 11. That is, when an input operation requesting the latest all mobile body information data MD is effected from the terminal 11 to the server terminal 21, the latest all mobile body information data MD are displayed on the display screen on the terminal 11.

Let it now be assumed that the display diagrammed in FIG. 27 is made on the terminal 11.

Thereupon, the display of the icon of the mobile work machine 31 on the map represented in FIG. 27 is switched to a position on the map in response to the latest (current) vehicle position data.

When the display screen diagrammed in FIG. 28 is switched to, the displays of the numerical values of the "position data" and of the "fuel quantity" on the screen are switched, respectively, to displays of numerical values of the latest (current) vehicle position data and of the latest fuel quantity data. When the display screen diagrammed in FIG. 29 or FIG. 30 is switched to, the display of the graph of changes in the fuel quantity over time or of the running map is switched to display the latest information.

Based on this embodiment aspect, as described in the foregoing, the latest all mobile body information data MD relating to the updated plurality of mobile bodies 31 to 35 can be displayed on the display screen of any terminal 11 in response to request input operations from the plurality of terminals 11, 12 . . . . Thus benefits are realized in that the latest mobile body information for the plurality of mobile bodies 31 to 35 can be obtained at any terminal, and all the mobile bodies can be managed and monitored. In other words, the latest mobile body information relating to the plurality of mobile bodies 31 to 35 requested by a plurality of requesters can be managed in a unified manner at any terminal.

In this embodiment aspect, a database is provided for each of the server terminals 21 and 22, and the all mobile body information data MD are stored in memory separately. Thereupon, by transferring the stored data (all mobile body information data MD) in the database of one server terminal to the database in another server terminal, the information for all mobile bodies can be shared jointly by the database in the other server terminal, and the stored content (all mobile body information data MD) of the server terminals can be made the same content. Specifically, this is achieved by the method of taking the electronic mail (wherein is written mobile body information) that is sent by return transmission to one server terminal and automatically transferring it to the other server terminal.

Now, in the service car 34, as described earlier, a terminal 13 equivalent to the terminal 11 and the terminal 12 is carried, in which terminal 13 the functions of the automobile navigation unit 55 are incorporated and operated.

An embodiment aspect is described below wherein work instruction data are transmitted from the terminal 11 at the manager's end to the terminal 13 provided in the service car 34, and work instructions are given to a service person. A service person, in particular, will often be engaged in outdoor activities such as making repairs, exchanging parts, and making inspections and the like, thus having few opportunities to directly contact the manager. If the system in this embodiment aspect is utilized, there is no limitation on the time or place where work instructions are received, wherefore work instructions can be received efficiently.

From the terminal 11 at the manager's end, in like manner as described with reference to FIG. 33, the terminal 13 carried on board the service car 34 is made the display recipient terminal (display recipient identification data D4), and the mobile work machine 31 is made the request recipient mobile body (request recipient identification data D2), and electronic mail to which the data of the message "malfunction E has occurred; proceed immediately" have been added is transmitted. Here, the data of the message "malfunction E has occurred; proceed immediately" are added to the electronic mail by effecting an input operation with an input device of the terminal 11.

Figure 3:
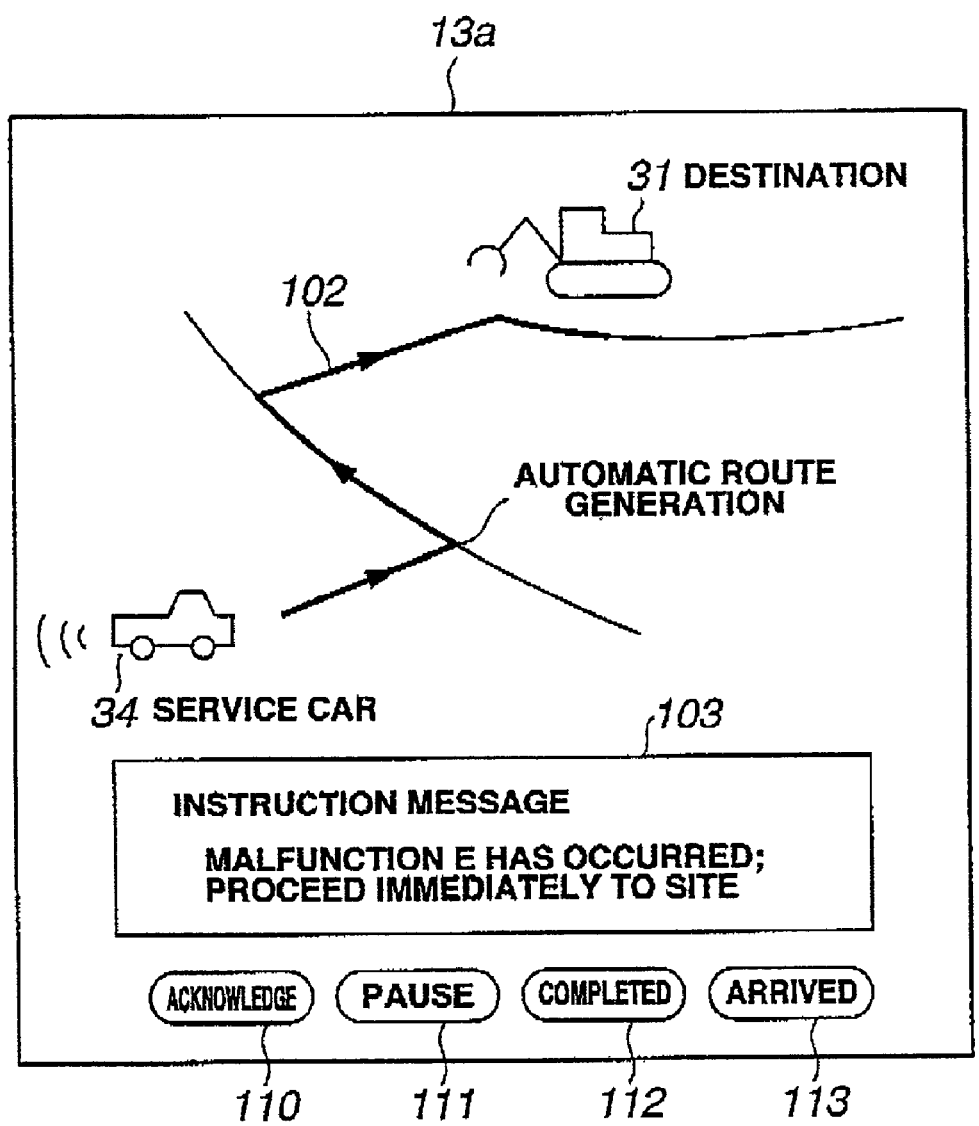
FIG. 3 is a diagram of a screen display example on a display device carried in a mobile body.

Hence, on the display screen 13a on the terminal 13 of the service car 34 that is the display recipient terminal, as diagrammed in FIG. 3, the icon of the mobile work machine 31 that is the subject of servicing is displayed at the latest (current) position on the map, and the icon of the service car 34 itself is displayed at the current position on the map. The current position of the vehicle 34 itself is detected by the GPS sensor 57 carried on board that vehicle 34, and displayed on the screen 13a. In the message section 103 on the display screen on the terminal 13, moreover, a message transmitted by electronic mail ("instruction message: malfunction E has occurred; proceed immediately") is displayed.

Thus the service person riding in the service car 34 can recognize from the display screen 13a that the next service subject (destination) is the mobile work machine 31, and where the current position is, as well as see a message relating to the work content. In the terminal 13, furthermore, an automatic route generation program is stored in memory. With this automatic route generation program, if the current position of that vehicle 34 and the destination thereof (i.e. the current position of the mobile work machine 31) are given, processing is performed to automatically generate the shortest travel route on the map. Hence, when this automatic route generation program is run, on the display screen 13a on the terminal 13, the shortest travel route 102 from the current position of that vehicle 34 to the current position of the mobile work machine 31 that is the destination is displayed.

Accordingly, as far as the service person is concerned, he or she can drive the service car 34 to the destination, following the display screen 13a on the terminal 13, and do the work.

If it is possible to perform work exactly according to the content of the work instructions, the button 110 indicating "acknowledge" on the display screen 13a is clicked on. When the service car 34 reaches the destination and the service person begins working, the button 113 indicating "arrived" on the display screen 13a is clicked on. And when the servicing work at the mobile work machine 31 has been completed, the button 112 indicating "completed" on the display screen 13a is clicked on. In the event that, for some reason or other, the service person cannot accept the work as described in the work instruction, the button 111 indicating "pause" on the display screen 13a is clicked on. The content of these input operations effected by mouse click operations at the terminal 13 are transmitted to the terminal 11 at the manager's end from the terminal 13 by electronic mail. At the terminal 11, the work progress being made by the service car 34 can be ascertained by receiving such electronic mail. In addition to being effected by such touching operations as mouse clicking, keyboard entry, and panel touching operations, the input operations may be effected by voice.

Thus servicing such as maintenance and inspections is performed extremely efficiently. Based on this embodiment aspect, in particular, because the latest position of the mobile work machine 31 is displayed on the screen 13a, one can operate one's own vehicle 34 definitely without losing sight of the objective, even when the service subject 31 is moving within the work site.

In the embodiment aspect described in the foregoing, provision is made so that electronic mail making the display recipient terminal the terminal 13 of the service car 34 is transmitted from the terminal 11 at the manager's end and the content diagrammed in FIG. 3 is displayed on the terminal 13. However, it is possible to display the content diagrammed in FIG. 3 on the terminal 13 by the procedures outlined below.

1) From the terminal 11 at the manager's end, electronic mail making that terminal 11 the display recipient terminal (display recipient identification data D4) and making the mobile work machine 31 the request recipient mobile body (request recipient identification data D2) is transmitted. Thereby, the latest position of the mobile work machine 31 will be acquired by the terminal 11.

2) Electronic mail making the current position of the mobile work machine 31 obtained as noted above and the message "malfunction E has occurred; proceed immediately" the work instruction data is transmitted from the terminal 11 to the terminal 13.

It is also possible to cause the content diagrammed in FIG. 3 to be displayed on the terminal 13 by the following procedures.

1) Electronic mail containing the message data "malfunction E has occurred; proceed immediately" is transmitted from the terminal 11 to the terminal 13.

2) At the terminal 13, the WWW browser is opened, and updated homepage data are read out from the server terminal 21 by the WWW browser. For that reason, the latest position of the mobile work machine 31 will be displayed, as the latest all mobile body information data MD, on the display screen of the terminal 13.

The content of the work instruction data indicating both the work content and the mobile body position sent from the terminal 11 at the manager's end is discretionary. For example, the work content may designate the work content for one full day. Here, by effecting a request from the terminal 11 at the manager's end to the server terminal 21 for a running map (cf. FIG. 30) for the service car 34, the operating rate for that service car 34 for one day can be ascertained. Accordingly, by comparing that operating rate for one day against the work content for one full day instructed from the manager's end to the service car 34, it is possible to produce a daily work report automatically and accurately.

Provision may also be made so that, instead of simply transmitting the position of the service subject (i.e. the position of the mobile work machine 31) from the terminal 11 at the manager's end to the terminal 13 of the service car 34, that is sent together with the position of another service car 34'. By so doing, the position of the other service car 34' will be displayed on the display screen 13a of the terminal 13 in the service car 34, thus making it easy to move to or communicate with that service car 34', so that service work can be performed even more efficiently. That is, it will become possible to borrow tools or replacement parts or the like from other service persons, or to request their assistance. If the service person is highly experienced, moreover, he or she can provide advice.

In the embodiment aspect described in the foregoing, moreover, data on the position of one mobile work machine 31 are transmitted from the terminal 11 at the manager's end to the terminal 13 in the service car 34, but an implementation is also possible wherewith provision is made for transmitting the positions of a plurality of mobile work machines 31A, 31B, 31C, and 31D, and efficiently conducting a service patrol to that plurality of mobile work machines 31A to 31D.

In that case, to the terminal 13 of the service car 34 are transmitted work instruction data the content whereof includes the current positions of the plurality of mobile work machines 31A to 31D and the values of service meter increase for each of those mobile work machines 31A to 31D from the previous patrol until the present ("3 H," "678 H," "10 H," "500 H").

Figure 5:
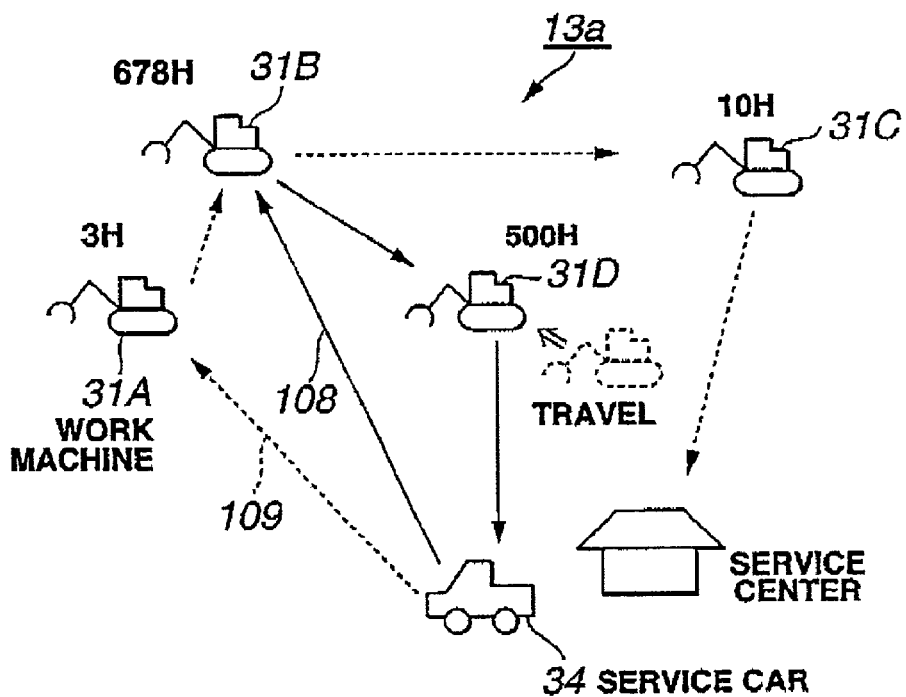
FIG. 5 is a diagram of a screen display example on a display device carried in a mobile body.

In response thereto, on the display screen 13a on the terminal 13 in the service car 34, as diagrammed in FIG. 5, the icons of the mobile work machines 31A to 31D are displayed in their current positions on the map and the values of service meter increase for each of those mobile work machines 31A to 31D are also displayed. Here, even if the mobile work machine 31D, for example, has moved relative to its previous position (depicted by broken lines), the current position (depicted by solid lines) will be displayed on the map on the screen 13a.

In the terminal 13, moreover, an automatic patrol route generation program is stored in memory. With that automatic patrol route generation program, when the current position of that vehicle 34 and a plurality of candidate patrol sites (the mobile work machines 31A to 31D) are given, only those candidate patrol sites having a service meter increase value larger than a set value are selected, and processing is performed to automatically generate the most efficient patrol travel route passing through those selected candidate patrol sites. Accordingly, when this automatic route generation program is run, on the display screen 13a on the terminal 13, a patrol travel route 108 is displayed as a solid line that originates at the current position of that vehicle 34, passes through the mobile work machines 31B and 31D having large service meter increase values ("678H" and "500H"), and returns back to that vehicle 34.

Accordingly, as far as a service person is concerned, by driving the service car 34 along the patrol travel route 108 indicated by the solid line, following the display screen 13a on the terminal 13, and performing work at the patrol sites, he or she can perform the service patrol extremely efficiently. That is, conventionally, provision was made so that, when a certain time period had elapsed since the previous service patrol, a patrol path 109 passing through all of the mobile work machines 31A to 31D was established uniformly, as indicated by the solid lines in FIG. 5, and the work was performed on all of those vehicles. In contrast therewith, based on this embodiment aspect, work is done following the patrol travel route 108 that avoids the mobile work machines 31A and 31C for which the operating time has not advanced since the previous service patrol (having service meter increase values of "3 H" and "10 H"), wherefore needless work can be avoided.

The patrol travel route 108 indicated by the solid lines in FIG. 5 may also be established according to the judgment of a service person instead of being generated automatically.

Although in this the embodiment aspect, described in the foregoing, work instruction data are transmitted from the terminal 11 at the manager's end to the terminal 13 carried on board the service car 34, an implementation is also possible wherewith work instruction data are transmitted from the terminal 11 at the manager's end to the terminal 14 carried on board the mobile work machine transporter 35 in order to have transport loading operations performed efficiently.

In that case, to the terminal 14 of the mobile work machine transporter 35, electronic mail is transmitted which contains, as data, the current position of the mobile work machine 31 that is the loading site, the position of the offloading site 106 where the loaded vehicle will be offloaded, and the message "return upon completion."

Figure 4:
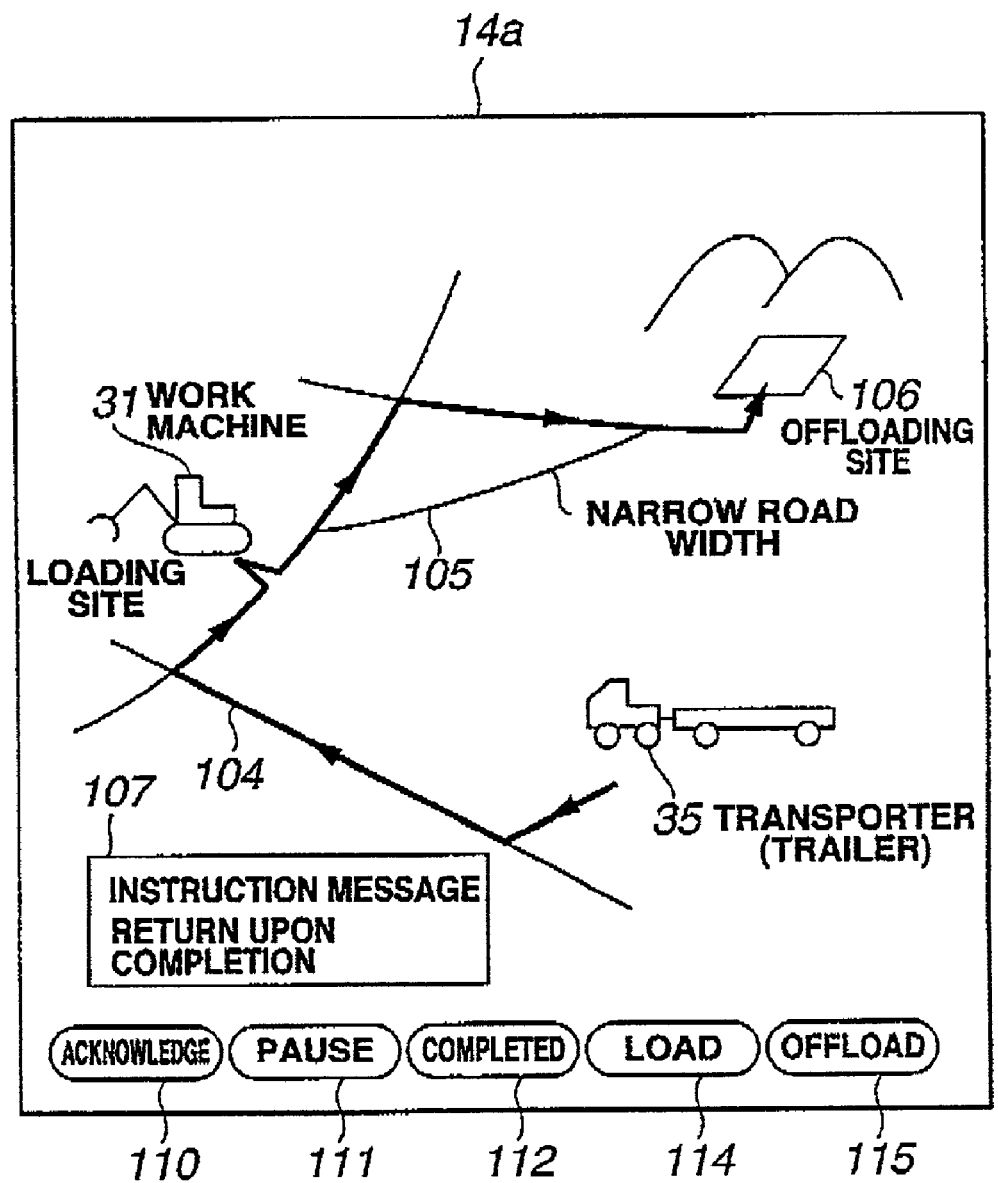
FIG. 4 is a diagram of a screen display example on a display device carried in a mobile body.

In response thereto, on the display screen 14a on the terminal 14 of the transport vehicle 35, as diagrammed in FIG. 4, the icon for the mobile work machine 31 is displayed at the current position on the map, and the icon for the offloading site 106 is displayed on the map in a corresponding position. The current position of that vehicle 35 is detected by the GPS sensor 57 carried on board that vehicle 35, and displayed on the display screen 14a. In the message area 107 on the display screen on the terminal 14, the message transmitted with the electronic mail ("instruction message: return upon completion") is displayed. Thereby, the operator riding in the transport vehicle 35 is able, from what is on the display screen 14a, to learn that the next transport subject is the mobile work machine 31, the current position thereof, the site where that vehicle is to be offloaded, and other specific work content.

In the terminal 14 is stored in memory an automatic transport route generation program. With that automatic transport route generation program, processing is performed to automatically generate the shortest transport travel route that begins at the current position of that vehicle 35, passes through the loading site 31, and arrives at the offloading site 106, with only roads selected that are wide enough for that vehicle 35 to pass over. Accordingly, when the automatic transport route generation program is run, on the display screen 14a on the terminal 14 is displayed the shortest transport travel route 104 from that vehicle 35, through the position of the mobile work machine 31, to the offloading site 106, which avoids the narrow road 105 over which that vehicle 35 cannot pass.

If it is possible to perform work exactly according to the content of the work instructions, the button 110 indicating "acknowledged" on the display screen 14a is clicked on. When the transport vehicle 35 arrives at the mobile work machine 31 and begins the loading operation, the button 114 indicating "loading" on the display screen 14a is clicked on. When the transport vehicle 35 arrives at the offloading site 106 and begins to offload the vehicle, the button 115 indicating "offloading vehicle" on the display screen 14a is clicked on. And when the job of loading and transporting (and offloading) the transport vehicle 35 is finished, the button 112 indicating "completed" on the display screen 14a is clicked on. In the event that, for some reason or other, the operator cannot accept the work as described in the work instruction, the button 111 indicating "pause" on the display screen 14a is clicked on. The contents of these input operations effected by mouse click operations at the terminal 14 are transmitted to the terminal 11 at the manager's end from the terminal 14 by electronic mail. At the terminal 11, the work progress being made by the transport vehicle 35 can be ascertained by receiving such electronic mail. In addition to being effected by such touching operations as mouse clicking, keyboard entry, and panel touching operations, the input operations may be effected by voice.

Thus the operator, by driving the transport vehicle 35 along the transport travel route 104 and performing work in accordance with the display screen 14a on the terminal 14, can perform loading and transporting (and offloading) operations extremely efficiently. It is also possible to use the return route of the transport vehicle 35 after the offloading (when running empty) for transporting another of the mobile work machines 31 to 33 and thus achieve even higher efficiency.

An implementation is also possible wherein work instruction data are transmitted from the terminal 11 at the manager's end to the terminal carried on board a mobile work machine 31 such as a hydraulic shovel, and excavation work or the like is made to be performed efficiently.

For example, by transmitting, to the terminal of the mobile work machine 31, data indicating the target excavation volume for that day, the time of terminating the work, and the current position of a dump truck at a loading point, those data can be displayed on the display screen of the terminal, the operator can be made to operate the work machine in accordance with the display screen, and a series of operations including digging earth and loading it in a dump truck can be performed efficiently.

It should be noted that, in this embodiment aspect, data are sent and received using electronic mail services on the internet 2. When that is the case, the server terminal 21 functioning as the mail server confirms the presence or absence of electronic mail in the mail boxes at regular periods. Hence a certain delay arises from the transmission of electronic mail at a terminal (the terminal 11, for example) until it is actually received by the mobile body (the mobile work machine 31, for example) at a given mail address.

In this embodiment aspect, data sending and receiving are performed by satellite radio communications through the communication satellite 9. With satellite radio communications, in cases where the communications environment between the transmitter and receiver is not good, as when the maximum elevation angle of the satellite is small so that it cannot be viewed by the mobile body, the radio communications line 5 cannot be secured, wherefore processing is performed to attempt communications some number of times. For that reason, delays also occur from the transmission of data from the communication satellite 9 until such data are actually received by a mobile body (the mobile work machine 31, for example) which are due to the communication environment.

Thus, in the communication system of this embodiment aspect, a time difference of a number of minutes, for example, develops between the time electronic mail is transmitted from a request originator terminal until the time it is received by the request recipient mobile body. In a communication system exhibiting such poor real time performance as this, there is a danger that the operator of the request originator terminal will suffer from anxiety due to the uncertainty of communication status, and that work efficiency will be affected. There is also a danger that electronic mail of duplicate content will be retransmitted, due to the uncertainty of communication status, affecting communication costs.

Accordingly, it is desirable that the condition of communications with the mobile bodies be displayed on a display screen of a terminal so as to avoid both deterioration in work efficiency caused by communication condition uncertainties and increases in communication costs.

Furthermore, in this embodiment aspect, mobile body information requests are sent from a plurality of terminals to a single mobile body. Accordingly, how recent the mobile body information currently in hand is (when the mobile body information request was effected) cannot be determined by one terminal alone.

Accordingly, it is desirable that a display be made on the terminal display screen as to how much time has elapsed since the last request was made to the mobile body, and that the operator be informed of mobile body management information as to how recent the mobile body information currently in hand is.

Such demands are met by the embodiment aspect described below.

On the terminal 11, as diagrammed in FIG. 31, icons (a picture of a hydraulic shovel, a picture of a service car, a picture of a tractor-trailer, and the like) as mobile body identifiers are displayed, associated respectively with the plurality of mobile bodies 31 to 35. When electronic mail is transmitted requesting mobile body information from a request originator terminal 11 to a request recipient mobile work machine 31, a change occurs in the display content of the icon for that mobile work machine 31 with the modes indicated in FIG. 16(a), according to the communication status.

Figures 16A, 16B, 16C, 16D:
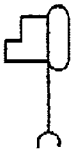
FIGS. 16(a) to 16(d) are diagrams for describing how the display mode of a mobile body icon changes according to the communication status.

That is, the color of the icon for that mobile work machine 31 changes between "blue," "yellow," "green," and "red" according to how the communication status between the terminal 11 and the mobile work machine 31, that is, the communication procedures, change between "no request," "request in progress," "return transmission made," and "no return transmission," as indicated in FIG. 16(a).

This is described with reference to the flowchart given in FIG. 15.

Figure 15:
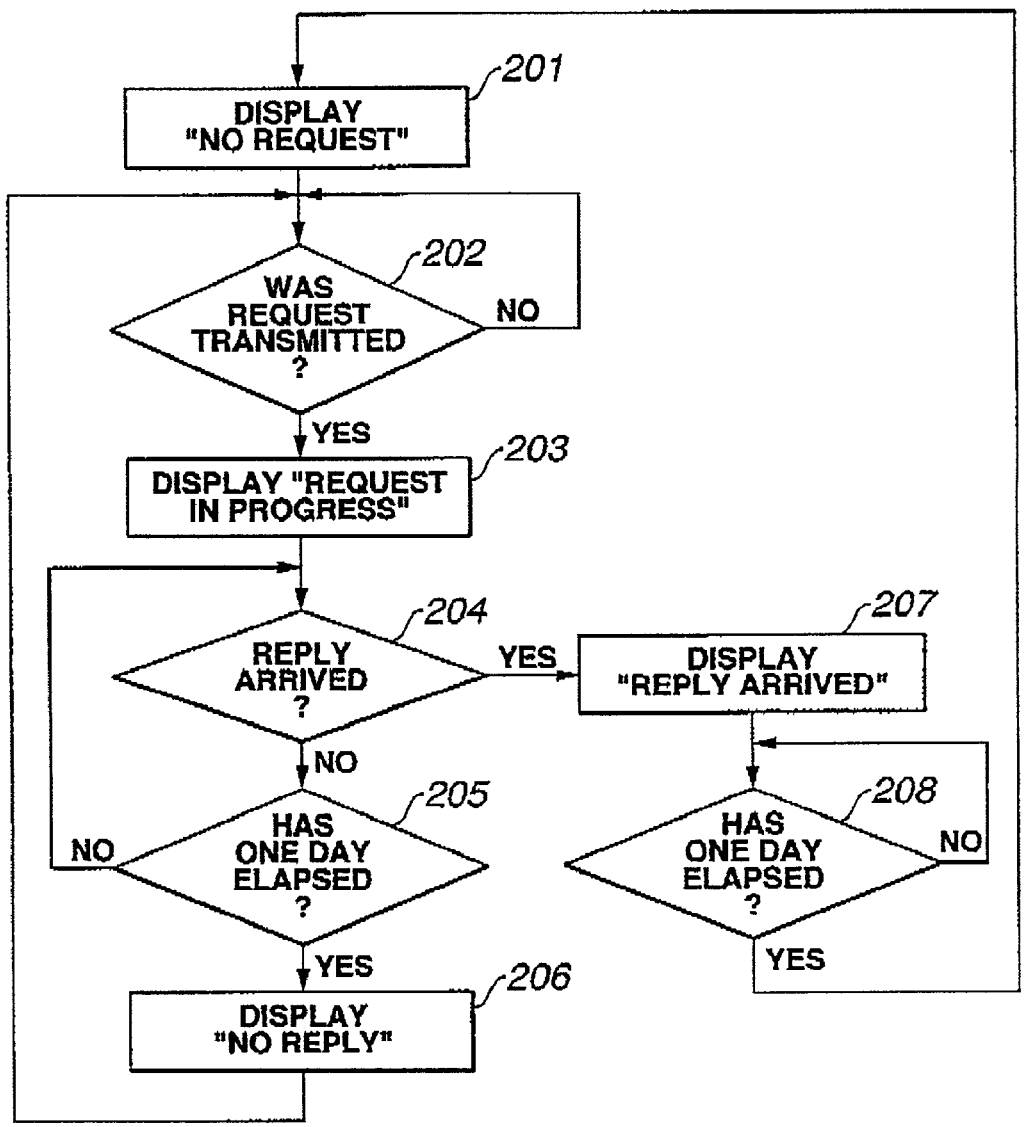
FIG. 15 is a flowchart of processing procedures for a display that transitions according to the communication status.

In FIG. 15 are represented processing procedures for causing displays to transition according to the communication procedures. This processing is performed by the server terminal 21, and the results of that processing are displayed on the display screen on the terminal 11.

First, in the initial condition, the icon for the mobile work machine 31 is displayed in a "blue" color corresponding to "no request" (step 201).

Here, when electronic mail requesting mobile body information is transmitted from the request originator terminal 11 to the request recipient mobile work machine 31, and that electronic mail is stored in a mail box addressed to the mobile work machine 31 (decision YES in step 202), the icon for the mobile work machine 31 transitions to a "yellow" color display corresponding to "request in progress" (step 203).

Now, when electronic mail sent by return transmission from the request originator mobile work machine 31 is stored in the mail box (decision YES in step 204), the icon for the mobile work machine 31 transitions to a "green" color display corresponding to "return transmission made" (step 207). When one day elapses after the transition to the "return transmission made" condition (decision YES in step 208), the icon for the mobile work machine 31 returns to the "blue" color display corresponding to "no request" (step 201). In that case, at the point in time where the mobile body information sent by return transmission is transmitted to and displayed on a display recipient terminal (terminal 12, for example), the processing may be jumped from step 207 to step 201 so as to return to the "blue" color display corresponding to "no request."

When, on the other hand, electronic mail that is supposed to be sent back from the request recipient mobile work machine 31 is not stored in the mail box (decision NO in step 204 and decision YES in step 205), it is judged that it will be difficult to secure the radio communications line 5, and the icon for the mobile work machine 31 transitions to a "red" color display corresponding to "no return transmission" (step 206).

In the foregoing description, the case is assumed of a request being made for mobile body information from the terminal 11 to the mobile work machine 31.

However, in cases also where mobile body information requests are made from the terminals 11, 12, . . . to the mobile bodies 31, 32, 33, 34, and 35, in like manner, the icons for the request originator mobile bodies change, at the request originator terminals, according to the communication status.

Based on this embodiment aspect, as described in the foregoing, even when communication means exhibiting poor real time performance are used, the display content changes according to those communication status, and the "extent of communication delays" can be verified from the display screen on the terminal device 11. Making a duplicate request with another terminal is also eliminated. Hence declines in work efficiency caused by communication condition uncertainty, and rises in communication costs, can be avoided.

An embodiment aspect is described next wherewith the time which has elapsed since there was last a request to a mobile body is displayed, on the display screen on the terminal 11, and an operator can be informed of the mobile body managing information of how recent the mobile body information currently in hand is.

Figure 18:
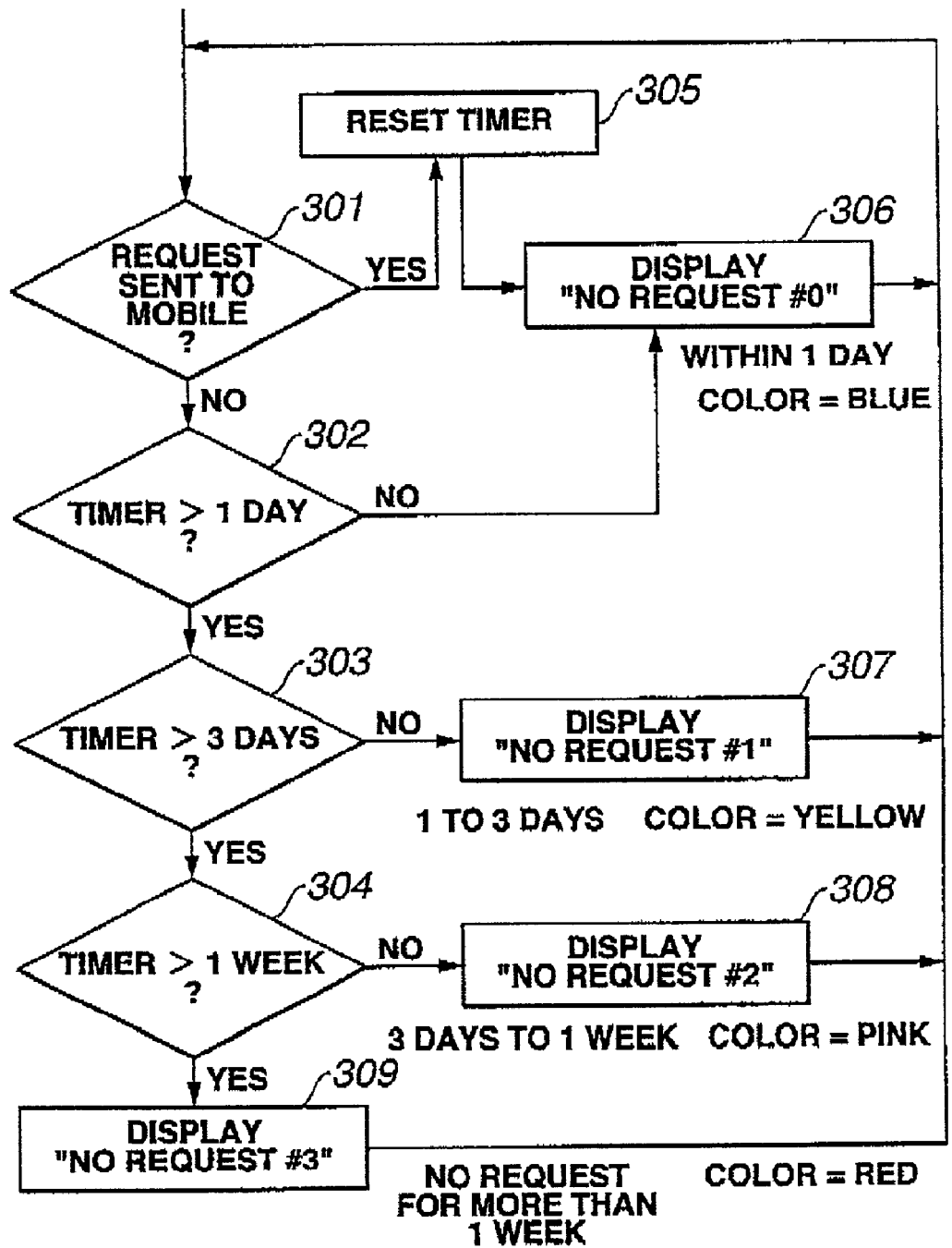
FIG. 18 is a flowchart of processing procedures for a display that transitions according to the communication status.

Specifically, as diagrammed in FIG. 18, in response to changes in the elapsed time since the last request to the mobile work machine 31 from the terminals 11, 12, . . . , namely "no request within 1 day," "no request for from 1 to 3 days," "no request for from 3 days to 1 week," and "no request for 1 week or more," the color of the icon for that mobile work machine 31 changes from "blue" ("no request #0"), to "yellow" ("no request #1), to "pink" ("no request #2"), to "red" ("no request #3").

As diagrammed in FIG. 18, when electronic mail requesting mobile body information is transmitted to the request recipient mobile work machine 31 from the terminals 11, 12, . . . , and that electronic mail is stored in the mail box addressed to the mobile work machine 31 (decision YES in step 301), a timer is reset (step 305), and the icon for the mobile work machine 31 transitions to a "blue" color display corresponding to "no request #0" (step 306).

When the time elapsed since the timer was reset is 1 day or less (decision NO in step 302), the icon for the mobile work machine 31 is maintained as the "blue" color display corresponding to "no request #0" (step 306).

When the time elapsed since the timer was reset exceeds 1 day but does not exceed 3 days (decision YES in step 302 and decision NO in step 303), the icon for the mobile work machine 31 transitions to the "blue" color display corresponding to " no request #1" (step 307).

When the time elapsed since the timer was reset exceeds 3 days but does not exceed 1 week (decision YES in step 303 and decision NO in step 304), the icon for the mobile work machine 31 transitions to the "pink" color display corresponding to "no request #2" (step 308).

And when the time elapsed since the timer was reset exceeds 1 week (decision YES in step 304), the icon for the mobile work machine 31 transitions to the "red" color display corresponding to "no request #3" (step 309).

When, while time is being measured by the timer, electronic mail requesting mobile body information is transmitted to the request recipient mobile work machine 31 from the terminals 11, 12, . . . , and that electronic mail is stored in the mailbox addressed to the mobile work machine 31 (decision YES in step 301), the timer is reset (step 305), and the icon for the mobile work machine 31 transitions to the "blue" color display corresponding to "no request #0" (step 306).

Furthermore, although in the foregoing description a case is assumed where, on the terminal 11, the time elapsed since the last request to the mobile work machine 31 is displayed, displays are also made similarly for the other mobile bodies 32 to 35.

The time elapsed since the last request to the mobile bodies 31, 32, 33, 34, and 35 is also displayed on the other terminals 12 . . . .

Based on this embodiment aspect, as described in the foregoing, how much time has elapsed since the last request to the mobile bodies 31 to 35 can be seen on the display screen on the terminal, and the management information of how new the mobile body information currently in hand is for the mobile bodies 31 to 35 can be learned.

The embodiment aspect described in the foregoing can be modified in various ways, as is now described with reference to FIGS. 16(*b*) to 16(*d*), 17, 19, and 20.

An embodiment aspect is described next wherein, on the display screen of the terminal 11, the time elapsed since the last electronic mail indicating mobile body information from a mobile body is displayed, and the operator is informed of the mobile body managing information of how new the mobile body information currently in hand is. The term "incoming signal" as used here includes both cases where electronic mail indicating mobile body information is sent by return transmission from a mobile body and cases where, as will be described subsequently, electronic mail indicating mobile body information is automatically transmitted from a mobile body without being requested.

Figure 19:
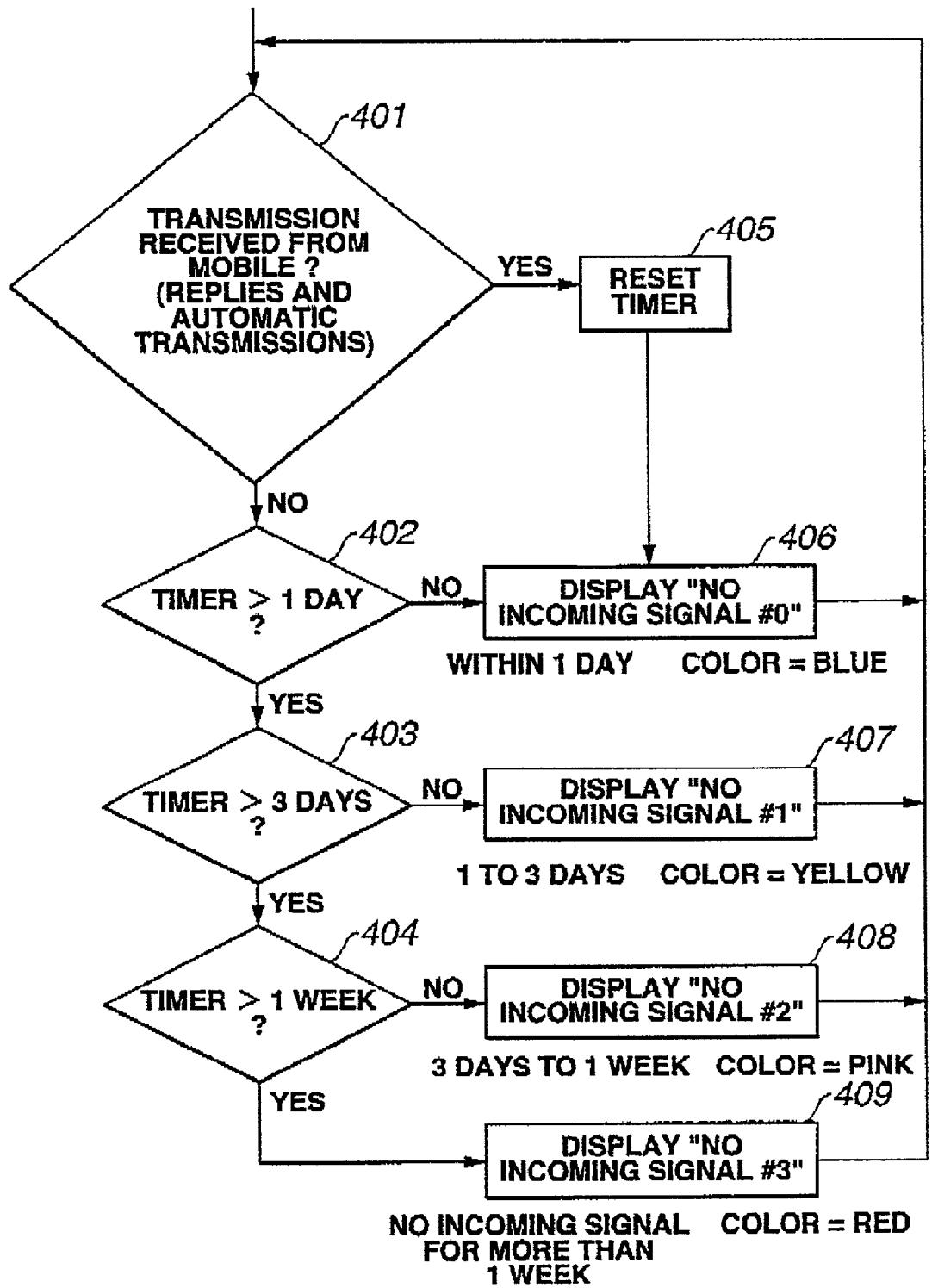
FIG. 19 is a flowchart of processing procedures for a display that transitions according to the communication status.

More specifically, as diagrammed in FIG. 19, in response to changes in the communication status with a mobile work machine 31, that is, in the elapsed time since the last incoming signal (return transmission or automatic transmission) from that mobile work machine 31 to server terminal 21, namely "no incoming signal within 1 day," "no incoming signal for from 1 to 3 days," "no incoming signal for from 3 days to 1 week," and "no incoming signal for 1 week or more," the color of the icon for that mobile work machine 31 changes from "blue" ("no incoming signal #0"), to "yellow" ("no incoming signal #1), to "pink" ("no incoming signal #2"), to "red" ("no incoming signal #3").

As diagrammed in FIG. 19, when electronic mail sent by return transmission from the mobile work machine 31 or automatically transmitted from the mobile work machine 31 is stored in a mail box at the server terminal 21 (decision YES in step 401), the timer is reset (step 405), and the icon for the mobile work machine 31 transitions to the "blue" color display corresponding to "no incoming signal #0" (step 406).

When the time elapsed since the timer was reset is 1 day or less (decision NO in step 402), the icon for the mobile work machine 31 is maintained as the "blue" color display corresponding to "no incoming signal #0" (step 406).

When the time elapsed since the timer was reset exceeds 1 day but does not exceed 3 days (decision YES in step 402 and decision NO in step 403), the icon for the mobile work machine 31 transitions to the "blue" color display corresponding to "no incoming signal #1" (step 407).

When the time elapsed since the timer was reset exceeds 3 days but does not exceed 1 week (decision YES in step 403 and decision NO in step 404), the icon for the mobile work machine 31 transitions to the "pink" color display corresponding to "no incoming signal #2" (step 408).

And when the time elapsed since the timer was reset exceeds 1 week (decision YES in step 404), the icon for the mobile work machine 31 transitions to the "red" color display corresponding to "no incoming signal #3" (step 409).

When, while time is being measured by the timer, electronic mail sent by return transmission from the mobile work machine 31 or automatically transmitted from the mobile work machine 31 is stored in a mail box in the server terminal 21 (decision YES in step 401), the timer is reset (step 405), and the icon for the mobile work machine 31 transitions to the "blue" color display corresponding to "no incoming signal #0" (step 406).

Furthermore, although in the foregoing description a case is assumed where the elapsed time since the last incoming signal from the mobile work machine 31 is displayed, displays are also made similarly for the other mobile bodies 32 to 35. The time elapsed since the last incoming signal from the mobile bodies 31, 32, 33, 34, and 35 is also displayed on the other terminals 12, . . . .

Based on this embodiment aspect, as described in the foregoing, how much time has elapsed since the last incoming signal from the mobile bodies 31 to 35 can be seen on the display screen on the terminal, and the management information of how new the mobile body information currently in hand is for the mobile bodies 31 to 35 can be learned. Also, in cases where a mobile body (the mobile body 31, for example) is automatically transmitted at a regular period, a judgment can be made on the terminal end as to whether or not some impairment to communications has occurred when the mobile body 31 made an automatic transmission, from the content of the display of the time elapsed since the last incoming signal from that mobile body 31.

An embodiment aspect is described next, with reference to FIG. 20, wherein the time elapsed from the issuance of a request to a mobile body until a response is made thereto is displayed, and a judgment is made as to whether or not communications are being conducted normally from the display screen on the terminal 11.

Figure 20:
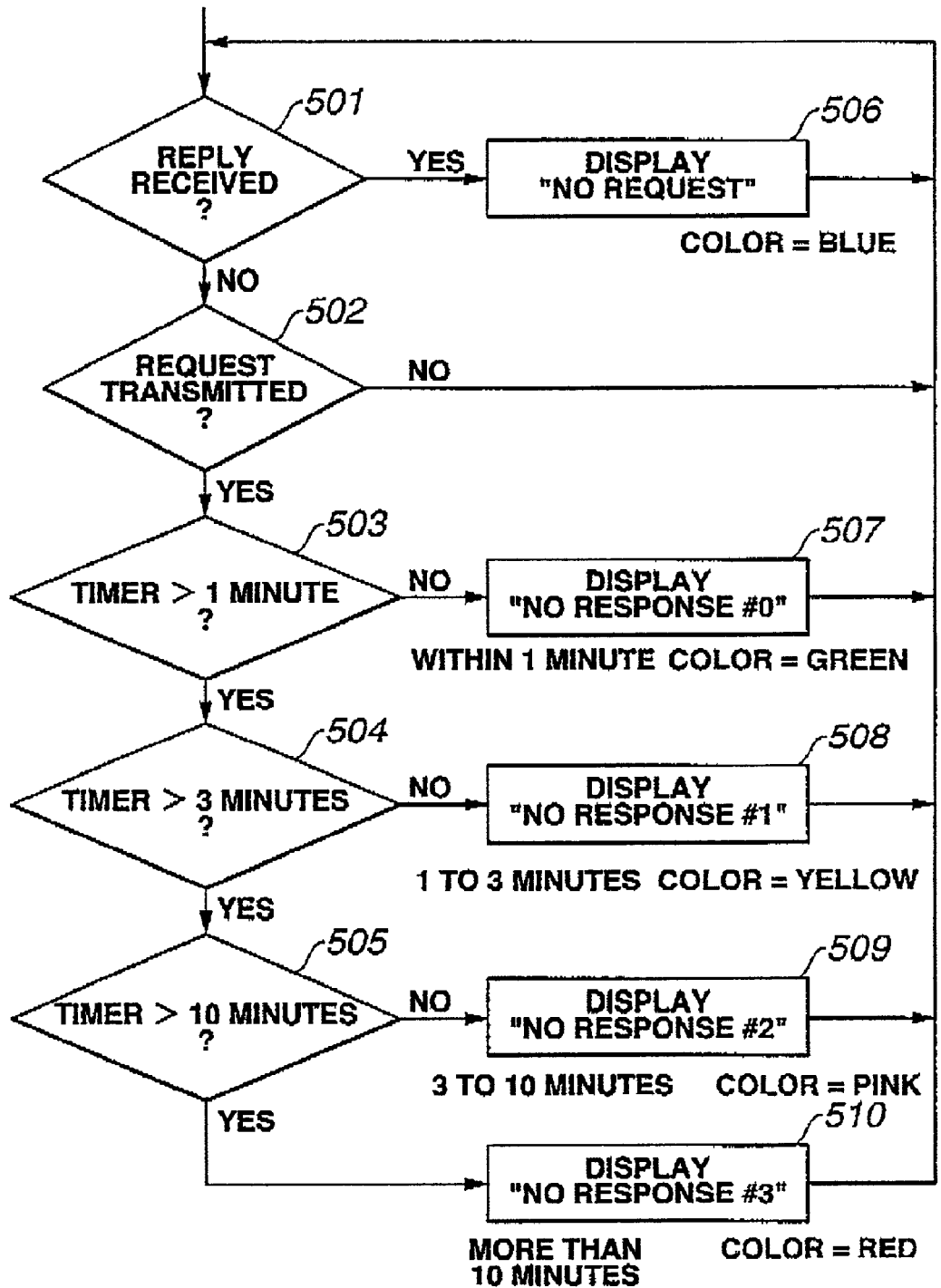
FIG. 20 is a flowchart of processing procedures for a display that transitions according to the communication status.

Specifically, as diagrammed in FIG. 20, in response to changes in the time that a condition of no response has continued since the last request to the mobile work machine 31 from the terminal 11, that is, to changes from "no response in 1 minute or less," to "no response in from 1 to 3 minutes," "no response in from 3 to 10 minutes," and "no response in 10 minutes or more," the color of the icon for that mobile work machine 31 changes from "green" ("no response #0"), to "yellow" ("no response #1), to "pink" ("no response #2"), to "red" ("no response #3"). In a condition of no request to the mobile work machine 31 from the terminals 11, 12, . . . (response made condition) moreover, the display is made "blue" ("no request").

As diagrammed in FIG. 20, when electronic mail requesting mobile body information is transmitted from the request originator terminal 11 to the request recipient mobile work machine 31, and, in response thereto, electronic mail sent by return transmission from the request recipient mobile work machine 31 is stored in the mail box (decision YES in step 501), the icon for the mobile work machine 31 transitions to the "blue" color display corresponding to "no response" (step 506).

When return electronic mail from the request recipient mobile work machine 31 is not stored in the mail box (decision NO in step 501), the next step 502 is moved to.

In step 502, a decision is made as to whether or not electronic mail requesting mobile body information has been transmitted from the request originator terminal 11 to the request recipient mobile work machine 31 and stored in the mail box addressed to that mobile work machine 31, that is, whether or not there has been a request (step 502).

When there has been a request (decision YES in step 502), the timer is reset, and, when the time elapsed since the timer was reset is 1 minute or less (decision NO in step 503), the icon for the mobile work machine 31 transitions to the "green" color display corresponding to "no response #0" (step 507).

When the time elapsed since the timer was reset exceeds 1 minute but does not exceed 3 minutes (decision YES in step 503 and decision NO in step 504), the icon for the mobile work machine 31 transitions to the "yellow" color display corresponding to "no response #1" (step 508).

When the time elapsed since the timer was reset exceeds 3 minutes but does not exceed 10 minutes (decision YES in step 504 and decision NO in step 505, the icon for the mobile work machine 31 transitions to the "pink" color display corresponding to "no response #2" (step 509).

And when the time elapsed since the timer was reset exceeds 10 minutes (decision YES in step 505), the icon for the mobile work machine 31 transitions to the "red" color display corresponding to "no response #3" (step 510).

When, while time is being measured by the timer, electronic mail sent by return transmission from the request recipient mobile work machine 31 is stored in the mail box (decision YES in step 501), the icon for the mobile work machine 31 transitions to the "blue" color corresponding to "no request" (step 506).

In the foregoing description, a case is assumed where the time elapsed from the time that a request was made to the mobile work machine 31 until the time a response was made thereto is displayed on the terminal 11, but displays are also made similarly for the other mobile bodies 32 to 35. The time elapsed since the last request to the mobile bodies 31, 32, 33, 34, and 35 is also displayed on the other terminals 12, . . . .

Based on the embodiment aspect described in the foregoing, provision is made for displaying the time elapsed from the issuance of a request to a mobile body until a response is made thereto, wherefore a judgment can easily be made, from the display screen on the terminal, whether or not communications is being conducted normally.

In the foregoing description, the overall color of the icon for a particular mobile work machine 31 is displayed in a different color according to the communication status between the terminal 11 and that mobile work machine 31, as diagrammed in FIG. 16(*a*), but the icon color combinations, color scheme, or fill-in pattern or the like may be changed, or, alternatively, some configuring element other than color may be changed.

For example, the shape of the icon for a mobile work machine 31 may be changed according to the communication status between the terminal 11 and that mobile work machine 31, as diagrammed in FIG. 16(*b*). If the icon is for a hydraulic shovel, for example, the position or roundness of a working member can be changed.

Alternatively, the size of the icon for a mobile work machine 31 may be changed according to the communication status between the terminal 11 and that mobile work machine 31, as diagrammed in FIG. 16(*c*). For example, in the case of "request in progress," as diagrammed in FIG. 16(*c*), the size of the icon for the hydraulic shovel may be changed periodically back and forth between large and medium.

Or, the movement of the icon for a mobile work machine 31 may be changed according to the communication status between the terminal 11 and that mobile work machine 31, as diagrammed in FIG. 16(*d*). For example, in the case of "no request," as diagrammed in FIG. 16(*c*), the icon for the hydraulic shovel is stationary, in the case of "request in progress," the icon for the hydraulic shovel rotates, in the case of "return transmission made," the icon for the hydraulic shovel moves linearly, and in the case of "no return transmission," the icon for the hydraulic shovel jumps.

Alternatively, the flashing pattern of the icon for a mobile work machine 31 may be displayed differently according to the communication status between the terminal 11 and that mobile work machine 31. It is conceivable that the flashing period be changed, for example.

Or, instead of changing the picture of the mobile work machine 31, provision may be made so that an identifying symbol such as text or the like identifying the mobile work machine 31 is changed. Conceivable examples include changing the color of text indicating the vehicle number or a nickname for the mobile work machine 31, or causing that to flash.

Figures 17A, 17B, 17C:
FIGS. 17(a) to 17(c) are diagrams for describing how data are rearranged according to the communication status.

As described in the foregoing, as a result of the processing diagrammed in FIG. 15, for example, on the display screen on the terminal 11, icons for the plurality of mobile work machines 31, 32, 33, 36, 37, and 38 are displayed associated with mobile body information ("vehicle number," "position," "service person"), as diagrammed in FIG. 17(a). In this case, as diagrammed in FIG. 17(a), the icons for the mobile work machines 31, 32, 33, 36, 37, and 38 can be displayed on the screen in a predetermined order.

Alternatively, as diagrammed in FIG. 17(b), the mobile work machines 31, 32, 33, 36, 37, and 38 can be rearranged according to the communication status, displaying icons for the mobile work machines 31 and 32 corresponding to "request in progress" higher and the icons for the mobile work machines 33, 36, and 37 corresponding to "no request" lower.

Or, as diagrammed in FIG. 17(c), of the icons for the mobile work machines 31, 32, 33, 36, 37, and 38, only the icons for the mobile work machines 31 and 32 corresponding to "request in progress" may be extracted and displayed.

Based on this embodiment aspect, as described in the foregoing, provision is made for changing the content of the terminal display in response to changes in the communication status, wherefore declines in work efficiency and increases in communication costs arising from communication condition uncertainty can be prevented. Also, management information (whether maintenance or inspections were performed recently and the like) on how recent the mobile body information on the mobile bodies is can be obtained from the display screen.

The embodiment aspect wherein the terminal display content is changed in response to changes in the communication status is not limited to the communication system diagrammed in FIG. 1, but can be applied to any communication system. Such application is possible in any communication system that comprises a minimum of two communication stations and conducts communications between those two communication stations.

An embodiment aspect is described next wherein wasteful power consumption in communicating is suppressed by having the mobile bodies 31 to 35 turn their electric power off themselves.

With mobile work machines such as construction machines, the time periods wherein the engine is not operating (that is, the time periods when the electric power is turned off) are long.

Figure 21:
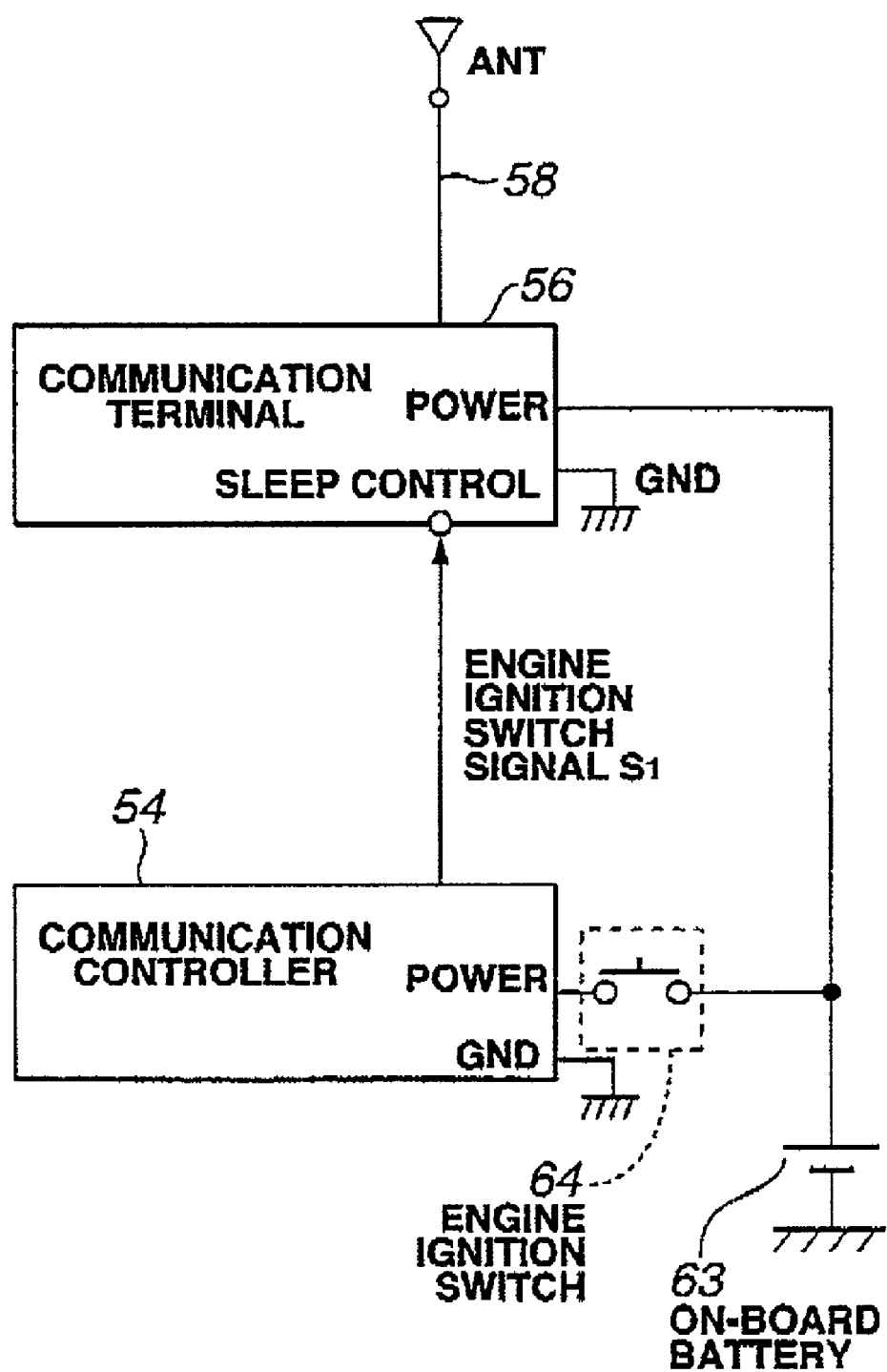
FIG. 21 is a diagram representing a connection mode between a communication terminal in a vehicle and another piece of equipment.

In FIG. 21, if a battery 63 (with a rated voltage of 24 V) that is the power supply is always left electrically connected to the communication terminal 56 even when the engine is off, the battery 63 will not be charged by the generator (alternator) because the engine is not running. For that reason the discharging of the battery 63 will proceed rapidly. If, however, on the other hand, the electrical connection between the battery 63 and the communication terminal 56 is always left off when the engine is turned off, communications between the plurality of terminals 11, 12, . . . become impossible. For that reason, when the engine is turned off, if there are requests for mobile body information from the terminals 11, 12, . . . , those requests cannot be responded to.

That being so, in the embodiment aspect described below, provision is made so that, even with mobile bodies 31 to 35, such as constructions machines, wherein the times the engine is not running are long, communications between the plurality of terminals 11, 12, . . . are made possible while the engine is turned off, so that requests from the terminals 11, 12, . . . can be responded to, and so that wasteful electric power consumption can be suppressed.

The configuration of this embodiment aspect is diagrammed in FIG. 21.

As was described with reference to FIG. 2, the communication terminal 56 is deployed inside the body of the mobile work machine 31, and the power terminal of that communication terminal 56 is electrically connected to the battery 63. A main power supply circuit is provided inside the communication terminal 56, and power is consumed when the power of the batter 63 is supplied to that main power supply circuit. Inside the communication terminal 56, either an internal program (software timer) is stored, or an internal power supply circuit (hardware timer) is incorporated, whereby the drive of the main power supply circuit is turned on and off intermittently, operating so that power saving measures are periodically taken in the main power supply circuit.

The level of an engine ignition switch signal S1 input to a sleep control terminal of the communication terminal 56 is monitored by the software and, when there is an ON signal and the main power supply circuit of the communication terminal 56 is turned off, processing is performed to forcibly drive the main power supply circuit. Alternatively, the configuration may be made so that the main power supply circuit is driven by hardware resources.

Specifically, when an OFF signal (signal at a logic "0" level) is being input as the engine ignition switch signal S1 to the sleep control terminal of the communication terminal 56, the electrical connection between the battery 63 and the main power supply circuit in the communication terminal 56 is turned on and off with a prescribed duty ratio, the drive of the main power supply circuit is turned on and off, the powering up of the communication terminal 56 is turned on and off, and communication processing is performed with a certain period (the sleep function of the communication terminal 56 is turned on).

In response to the input of an ON signal (signal at a logic "1" level) as the engine ignition switch signal S1 to the sleep control terminal of the communication terminal 56, the main power supply circuit inside the communication terminal 56 and the battery 63 are electrically connected, the main power supply circuit is driven, the communication terminal 56 is powered up, and communication processing is performed (the sleep function of the communication terminal 56 is turned off (forcible cancellation)). Accordingly, while the engine is turned off, the communication terminal 56 is always in a state of being powered up.

Meanwhile, the power terminal of the communication controller 54 is electrically connected to the battery 63 via the engine ignition switch 64. In response to the engine ignition switch 64 being turned off, the electrical connection between the communication controller 54 and the battery 63 is interrupted and the engine of the mobile work machine 31 stops running.

In response to the engine ignition switch 64 being turned on, an ON signal (signal at a logic "1" level) is output as the engine ignition switch signal S1 to the sleep control terminal of the communication terminal 56 from the communication controller 54.

Figure 7:
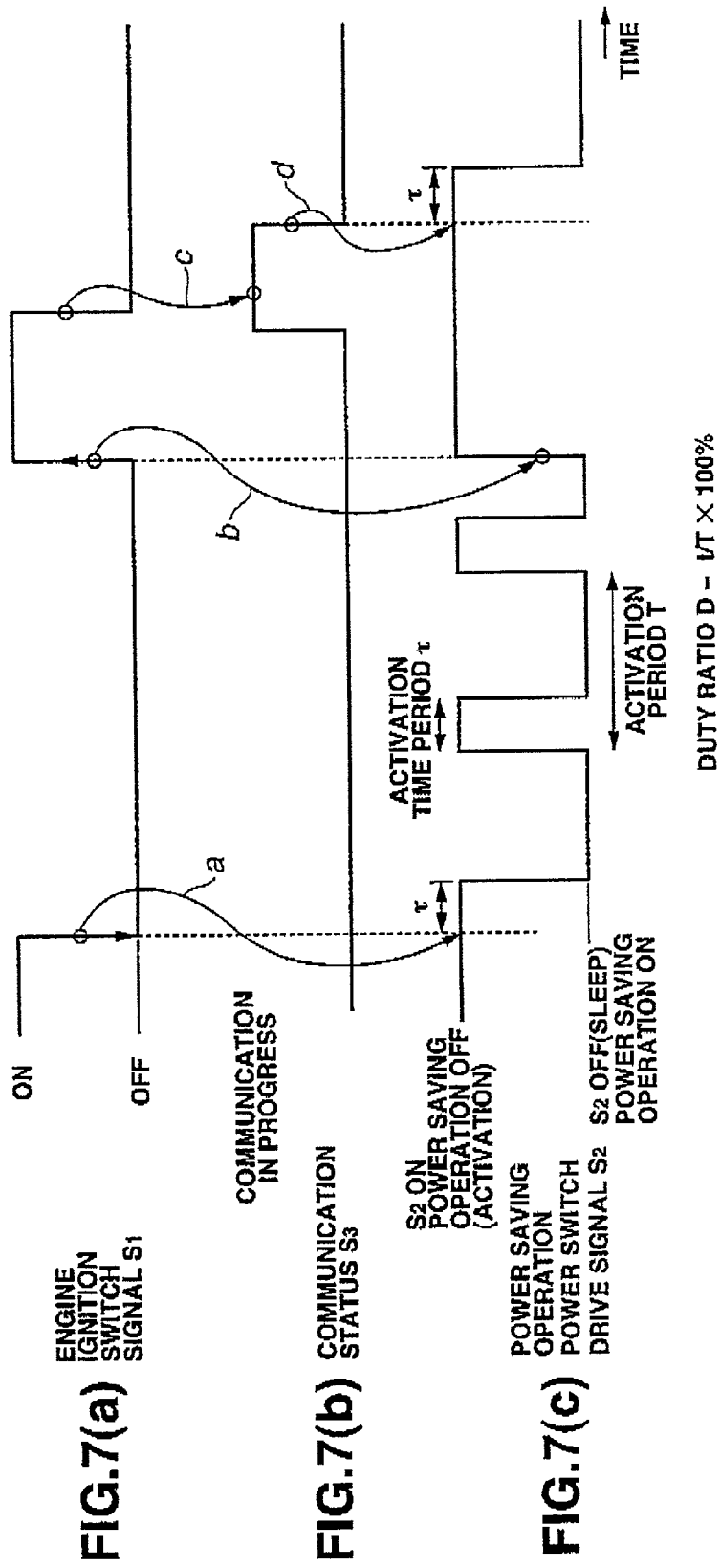
FIGS. 7(a) to 7(c) are timing charts for describing power saving actions performed by a mobile body.

Next, the processing performed in the communication terminal 56 is described using the timing chart diagrammed in FIGS. 7(a) to 7(c).

In FIG. 7(a) is represented the engine ignition switch 64 operating signal S1, while in FIG. 7(b) is represented the communication status between the communication terminal 56 and the communication satellite 9. Communication in progress is indicated by a logic "1" level. In FIG. 7(c) is represented the power-up status of the communication terminal 56. The logic "1" level corresponds to a powered-up status (with the power saving operation off), while a logic "0" level corresponds to a power-up off (sleeping) status (with the power saving operation on). The powering up of the communication terminal 56 is turned on and off intermittently with a duty ratio D (=(IT)×100%). With the timing wherewith the power saving operation turns off and the communication terminal 56 is powered up, as necessary, signals indicating such mobile body information as current position, service meter value, fuel quantity, battery voltage, and vehicle body error code are transmitted from the communication terminal 56 to the communication satellite 9.

As diagrammed in the same FIGS. 7(a) to 7(c), when the condition of the engine ignition switch signal S1 being ON is maintained, the communication terminal 56 will always be powered up.

When the engine ignition switch signal S1 is switched from ON to OFF, as indicated by the arrow a, the powering up of the communication terminal 56 will be turned on and off intermittently with the duty ratio D (=(τ/T)×100%) (sleep function turned on).

Figure 8:
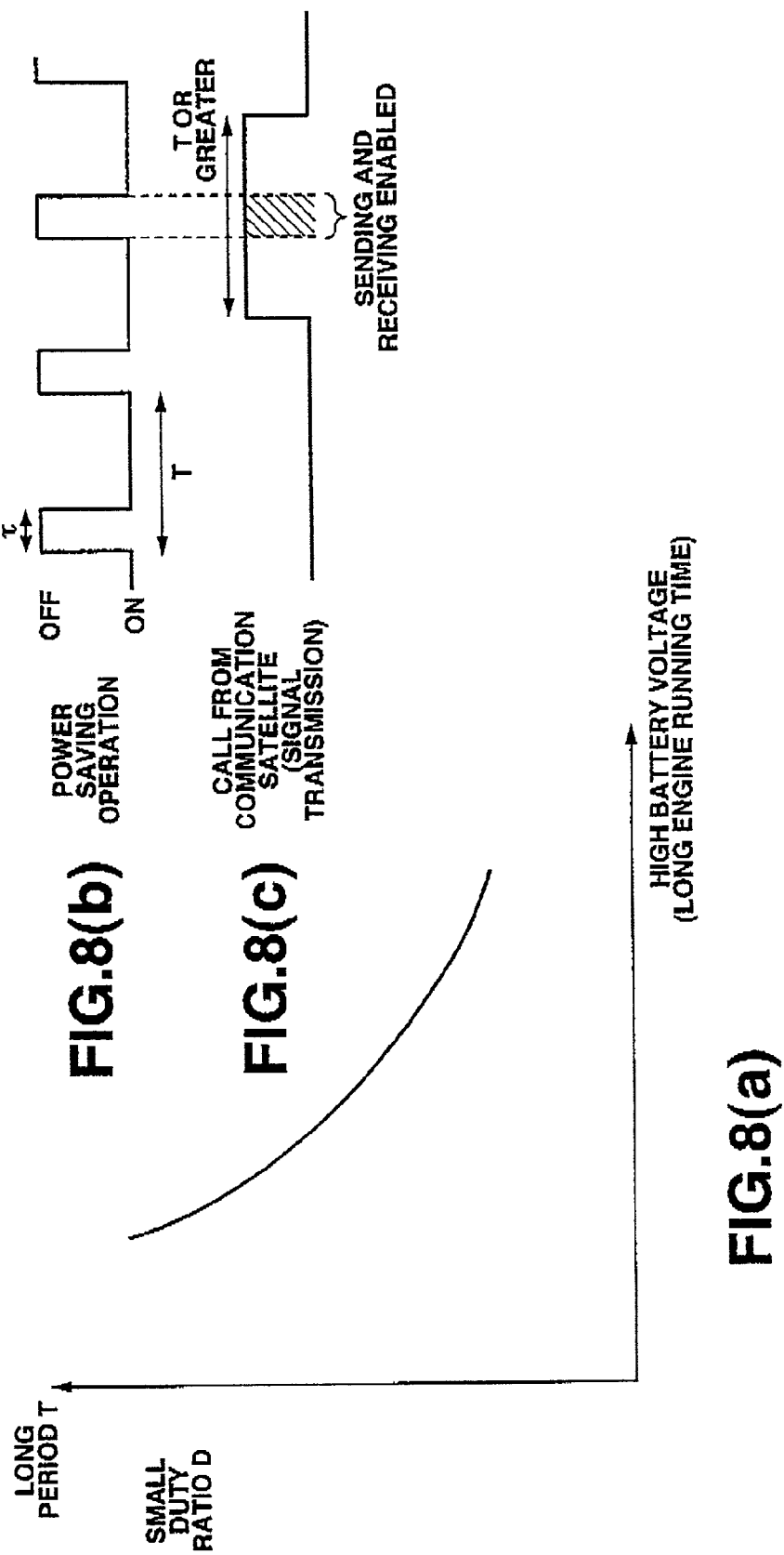
FIGS. 8(a) to 8(c) are diagrams used in describing an embodiment aspect wherein power saving operations are performed.

More specifically, FIG. 8(b) is a timing chart indicating when the power saving operation is turned on and off, corresponding to FIG. 7(c). FIG. 8(c) diagrams the condition for transmitting an interrogation signal from the communication satellite 9 to the communication terminal 56. A logic "1" level indicates transmission in progress.

As diagrammed in these drawings, in a certain time interval (power-up period) T there will always exist a powered-up time interval τ, that is, a time period wherein sending and receiving can be done with the communication satellite 9 (cf. hatched area in FIG. 8(c)). The expected value for the communication response time interval is T/2 (average=T/2). Also, electric power consumption can be suppressed to τ/T. In order to make it possible for sending and receiving between the communication satellite 9 and the communication terminal 56 that is performing power saving operations in the power-up period T, it is necessary that a signal be continuously transmitted from the communication satellite 9 to the communication terminal 56 for a time period of T or greater (cf. FIGS. 8(b) and 8(c)). The power-up period T is determined according to the urgency of the communication and a safety factor relating to the continuous time period that the signal is transmitted from the communication satellite 9.

For the power-up time period τ, it is necessary to secure at least the time required for the sending and receiving procedures. However, the smaller that power-up time period τ is, the greater will be the power saving effect.

By powering up the communication terminal 56 regularly with a period that is T, as described in the foregoing, the expected value for the communication response time period can be verified, and electric power consumption can be suppressed.

As diagrammed in FIGS. 7(a) to 7(c), however, even when the engine ignition switch signal S1 is switched from ON to OFF, if the communications are in progress between the communication terminal 56 and the communication satellite 9, as indicated by the arrow c, the sleep function will be turned on at the point in time when the communications end, as indicated by the arrow d.

When the engine ignition switch signal S1 is turned from OFF to ON, the sleep function is forcibly cancelled, as indicated by the arrow b.

Based on this embodiment aspect, as described in the foregoing, provision is made so that, if the engine is running, a sleep function is forcibly cancelled, and the communication terminal 56 is always powered up while the engine is running. Therefor, safety can be secured in that mobile body information such as that a sudden vehicle anomaly has occurred while the engine is running can be transmitted. Provision is also made so that, if communications are in progress, the communication terminal 56 is kept powered up until those communications are ended, even if engine operation has been stopped, wherefore communications can be accomplished definitely.

The duty ratio D noted above can be varied according to the voltage on the terminals of the battery 63.

The voltage from the battery 63 is input to a battery voltage input circuit and the duty ratio D is varied according to the characteristic diagrammed in FIG. 8(a).

That is, as the voltage of the battery 63 becomes lower, the duty ratio D becomes smaller and the power-up period T becomes longer, thus suppressing further decline in the voltage of the battery 63.

Alternatively, provision may be made so that, with the same characteristic as that plotted in FIG. 8(a), by having the duty ratio D become smaller and the power-up period T become longer as the engine running time becomes shorter, further decline in the voltage of the battery 63 is suppressed. The engine running time is found from the value of the increase in the service meter. The continuous engine running time up until the sleep function is turned on (until the intermittent power saving operation is started) is found from the value of the increase in the service meter, and the duty ratio D is varied according to that continuous running time. In this case, there will be no need to install a battery voltage input circuit.

Based on the configuration diagrammed in FIG. 21, as described in the foregoing, power saving operation is effected by processing done internally in the communication terminal 56, wherefore an advantage is realized in that no influence is sustained from other equipment or wiring anomalies. Instead of the configuration diagrammed in FIG. 21, the configuration diagrammed in FIG. 22 may be adopted. More specifically, the power saving operation control function, when the engine ignition switch 64 is turned off, may be entrusted to another piece of equipment separate from the communication terminal 56, such as to the communication controller 54, and the intermittent on and off control of the electrical connection between the communication terminal 56 and the battery 63 effected by that communication controller 54.

Figure 22:
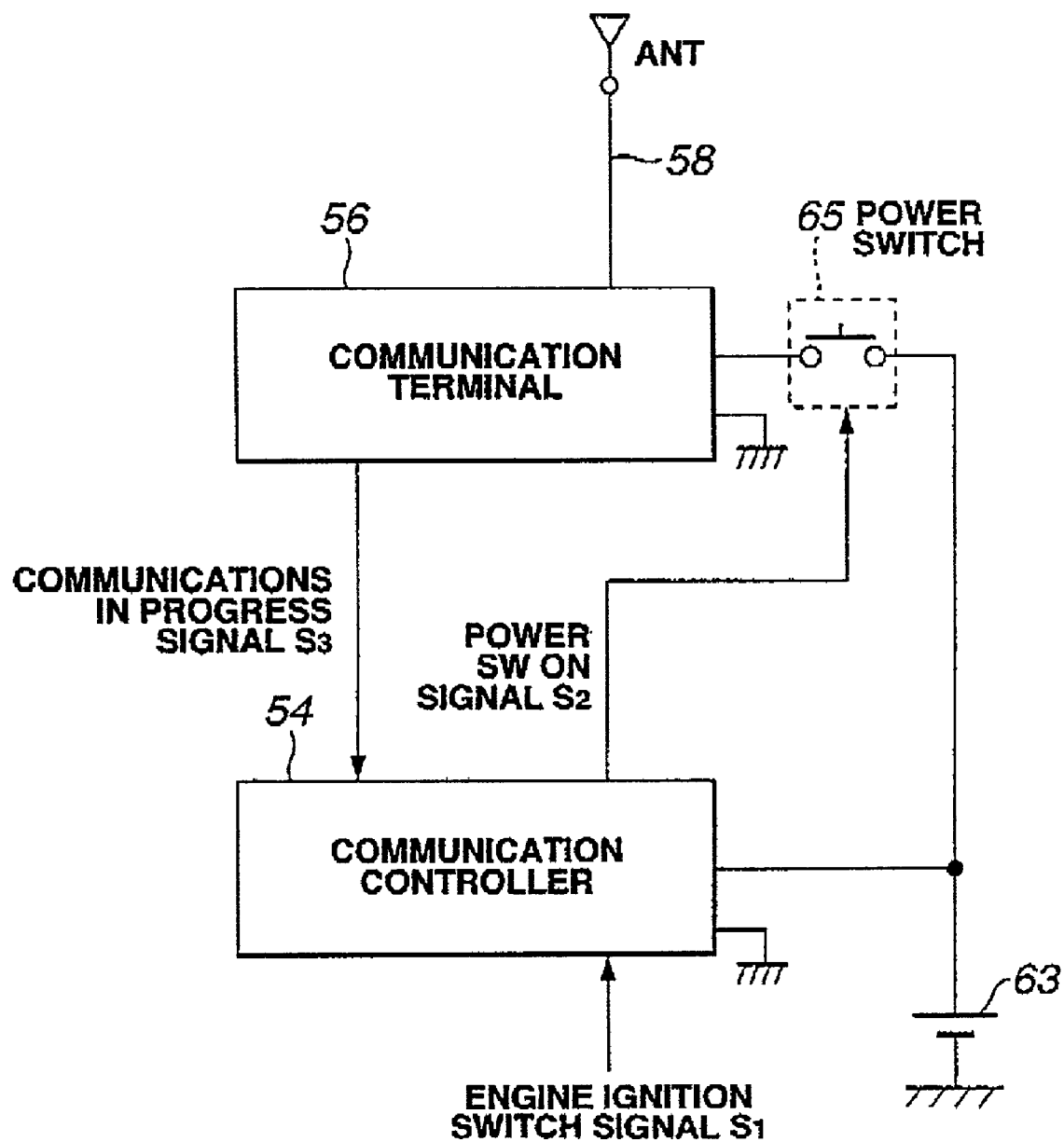
FIG. 22 is a diagram representing a connection mode between a communication terminal in a vehicle and another piece of equipment.

That is, as diagrammed in FIG. 22, the power terminal of the communication terminal 56 is electrically connected to the battery 63 through a power switch 65. In response to the power switch 65 being turned off, the electrical connection between the communication terminal 56 and the battery 63 is interrupted.

Meanwhile, the power terminal of the communication controller 54 is electrically connected to the battery 63. Also, the engine ignition switch operating signal S1 is input to the communication controller 54. Also, a signal S3 indicating the communication status is input to the communication controller 54 from the communication terminal 56. If communications are in progress between the communication terminal 56 and the communication satellite 9, the communication condition signal S3 goes to the logic "1" level.

Inside the communication controller 54, either a software timer is stored or a hardware timer is incorporated, and a power switch drive signal S2 is output to the power switch 65.

In the communication controller 54, the same processing as was described with reference to FIGS. 7(a) to 7(c) is executed.

In FIG. 7(a) is represented the engine ignition switch 64 operating signal S1, while in FIG. 7(b) is represented the communication condition signal S3 input to the communication controller 54 from the communication terminal 56, and in FIG. 7(c) is represented the power switch drive signal S2 output to the power switch 65 from the communication controller 54.

Accordingly, as with the configuration diagrammed in FIG. 21, if the engine operation is stopped (signal S1 is OFF), the powering up of the communication terminal 56 will be on-and-off controlled (signal S2 ON and OFF) with the prescribed duty ratio D. If the engine is running (signal S1 is ON), the sleep function described earlier is forcibly cancelled, and, while the engine is running, the communication terminal 56 is always in a powered-up state (signal S2 is ON). If communications are in progress (S3 is ON), moreover, even if the engine operation is stopped, the communication terminal 56 remains in the powered-up state (S2 is ON) until the communications end.

Similarly, the duty ratio D can be varied in response to the terminal voltage of the battery 63 or to the engine running time.

The embodiment aspect described in the foregoing can be modified in various ways, as is now described with reference to FIGS. 13, 23, 24, and 25.

The duty ratio D may be varied according to positional information for the mobile work machine 31.

FIGS. 23(a) to 23(d) diagram an embodiment aspect wherein the duty ratio D is varied according to the relative travel distance to a set range for the mobile work machine 31.

Figure 23A:
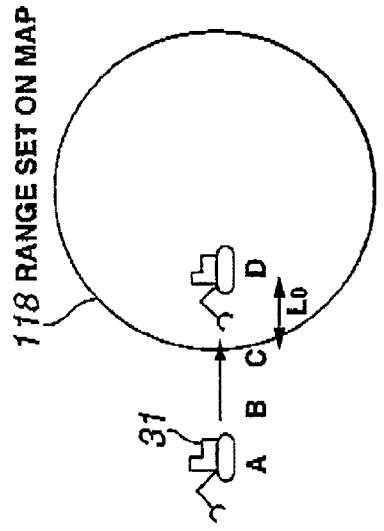
FIGS. 23(a) to 23(d) are diagrams for describing how the duty ratio of a power saving action changes.

In FIG. 23(a) is depicted how the power-up period T is shortened and the duty ratio D is made larger as the mobile work machine 31 departs from a set range 117 on a map.

In general, almost all ordinary motor vehicles move under their own power. In contrast thereto, there are few situations where a mobile work machine 31 such as a construction machine travels a long distance under its own power. In almost all cases, such vehicles are moved after their engines are stopped and they have been loaded onto a tractor-trailer or the like. In such cases, furthermore, the mobile work machine 31 is not limited to being loaded onto and transported by a tractor-trailer 35 that is being managed from the terminal 11, but there are also times when the mobile work machine 31 will be loaded on an unmanaged tractor-trailer and taken overseas or the like. There is also the possibility of the mobile work machine 31 being inadvertently transported by the tractor-trailer 35 and taken without permission to a work site for which there is no administrative permit.

Accordingly, when the engine operation of the mobile work machine 31 is stopped, it is necessary, while suppressing electric power consumption associated with communications, in response to requests from the terminal 11, to display the travel position of that mobile work machine 31 on the terminal 11, and manage and monitor the track over which the mobile work machine 31 travels.

That being so, the prescribed range 117 wherein the mobile work machine 31 should be located under normal conditions is set on a map on the display screen on the terminal 11. This set range 117 corresponds, for example, to an area under the control of a manager at the terminal 11 end or a work site for which an administrative permit has been given or the like.

The powering up of the communication terminal 56 in the mobile work machine 31 is turned on and off intermittently with the prescribed duty ratio D (=(τ/T)×100%), as diagrammed in FIGS. 7(a) to 7(c) and described earlier. Also, as diagrammed in FIG. 7(c), with the timing wherewith the power saving operation is turned off (power switch drive signal S2 is turned ON) and the communication terminal 56 is powered up, in response to requests from the terminal 11, signals indicating the current position (which may also include such mobile body information as the service meter value, fuel quantity, battery voltage, and vehicle body error code) are transmitted from the communication terminal 56 to the communication satellite 9. Hence the progressive travel position of the mobile work machine 31 is displayed on the terminal 11 that is the display recipient terminal.

The position of the mobile work machine 31 is detected by the GPS sensor 57 as diagrammed in FIG. 2. In this case, if the power consumption of the GPS measurement equipment (GPS antenna 59, GPS sensor 57, and communication controller 54) is low, that GPS measurement equipment can be electrically connected directly to the battery 63 and operated continuously. If the power consumption of that GPS measurement equipment is large, however, provision may be made so that, as with the communication terminal 56, the sleep function is turned on and the power saving operation is turned on and off, so that the GPS measurement equipment is only operated and the position measured when the power saving operation is turned on (when the communication terminal 56 is powered up).

In the mobile work machine 31, the position detected by the GPS sensor 57 and the position of the boundary of the set range 117 are compared, and processing is performed to vary the power-up period T according to the results of that comparison.

Figure 23B:
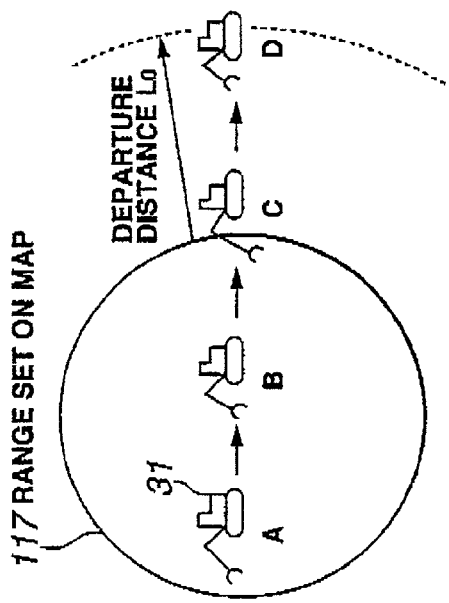
Figure 23C:
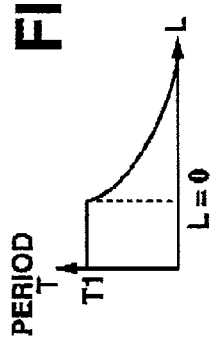
Figure 23D:
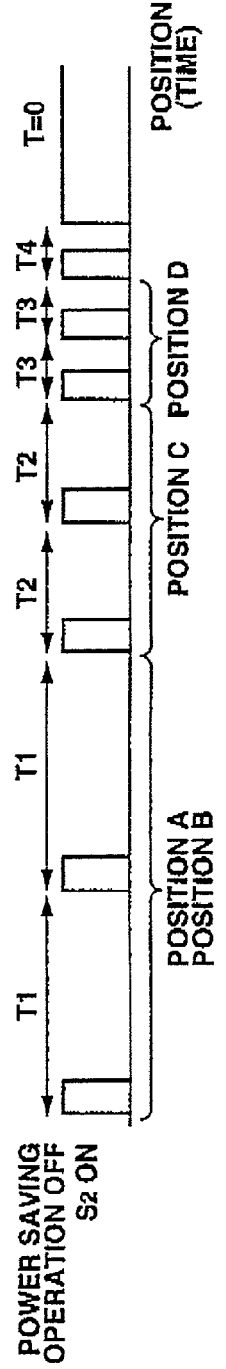

In FIG. 23(d) is diagrammed how the power-up period T varies according to the relative position (passage of time) to the set range 117 of the mobile work machine 31.

As diagrammed in FIG. 23(a), when the mobile work machine 31 is located at position A or B inside the normal set range 117, the power-up period T is at the maximum period T1.

At the point in time when the mobile work machine 31 reaches the boundary position C of the normal set range 117, however, it is judged that an anomalous situation has arisen wherein the normal range is departed from (travel outside permissible range), and, with the need to obtain detailed information on the travel track, the power-up period T becomes the period T2 which is shorter than the maximum period T1 (cf. FIG. 23(d)).

At the point in time when the mobile work machine 31 reaches position D which is further removed from the boundary position of the normal set range 117 by a prescribed distance L0, with the need to obtain even more detailed information on the travel track, the power-up period T becomes the period T3 which is shorter even than the period T2 (cf. FIG. 23(d)). Thereafter, as the distance of separation from the normal set range 117 becomes greater, the power-up period T can be made successively shorter, to T4 (<T3) ..., until it finally becomes the period 0 (duty ratio D=1).

As plotted in the graph in FIG. 23(c), the power-up period T may be made continuously shorter as the separation distance L relative to the boundary position of the normal set range 117 becomes larger.

As the power-up period T of the communication terminal 56 becomes shorter, the responses to requests from the terminal 11 become faster. In cases where the mobile work machine 31 makes automatic transmissions, as will be described subsequently, the interval wherewith the mobile body information that is positional information is transmitted becomes shorter.

Accordingly, as the mobile work machine 31 becomes progressively separated from the normal set range 117, an increasingly detailed travel track (a travel track wherein the time interval between each travel position displayed is short) will be displayed on the display screen on the terminal 11 that is the display recipient terminal. For that reason, when the anomalous situation arises of travel outside a permissible area, measures in response thereto can be taken promptly and appropriately. In addition, because the duty ratio D wherewith the powering up of the communication terminal 56 is turned on and off is made larger as the separation of the mobile work machine 31 from the normal 117 increases, while suppressing power consumption associated with communications, anomalous situations can be appropriately monitored for.

In FIG. 23(b) is diagrammed how the power-up period T is shortened and the duty ratio D is made larger as the mobile work machine 31 makes an incursion into a set range 118 on the map.

As in FIG. 23(a), a prescribed range 118 is set on the map on the display screen on the terminal 11 into which, under normal conditions, the mobile work machine 31 is not expected to be taken. This set range 118 would be a non-normal area, such as an overseas harbor, an area hazardous to work in, or a protected nature area or the like that is unlawful to work in.

In the mobile work machine 31, in like manner as was described in conjunction with FIG. 23(a), the position detected by the GPS sensor 57 and the position of the boundary of the set range 118 are compared, and processing is performed to vary the power-up period T according to the results of that comparison.

In FIG. 23(d) is diagrammed how the power-up period T varies according to the relative position (passage of time) from the set range 118 of the mobile work machine 31.

As diagrammed in FIG. 23(b), when the mobile work machine 31 is located at position A or B outside the non-normal set range 118, the power-up period T is at the maximum period T1.

At the point in time when the mobile work machine 31 reaches the boundary position C of the non-normal set range 118, however, it is judged that an anomalous situation has arisen (incursion into hazardous area), and, with the need to obtain detailed information on the travel track, the power-up period T becomes the period T2 which is shorter than the maximum period T1 (cf. FIG. 23(d)).

At the point in time when the mobile work machine 31 reaches position D which is further inside the boundary position of the non-normal set range 118 by a prescribed distance L0, with the need to obtain even more detailed information on the travel track, the power-up period T becomes the period T3 which is shorter even than the period T2 (cf. FIG. 23(d)). Thereafter, as the distance of the incursion into the non-normal set range 118 becomes greater, the power-up period T can be made successively shorter, to T4 (<T3) . . . , until it finally becomes the period 0 (duty ratio D=1).

As plotted in the graph in FIG. 23(c), the power-up period T may be made continuously shorter as the distance L relative to the boundary position of the non-normal set range 118 becomes larger.

Thus, as the mobile work machine 31 makes progressive incursion into the non-normal set range 118, an increasingly detailed travel track (a travel track wherein the time interval between each travel position displayed is short) will be displayed on the display screen on the terminal 11 that is the display recipient terminal. For that reason, when the anomalous situation arises involving a hazardous area incursion, measures in response thereto can be taken promptly and appropriately. In addition, because the duty ratio D wherewith the powering up of the communication terminal 56 is turned on and off is made larger as the incursion of the mobile work machine 31 inside the non-normal 118 progresses, while suppressing power consumption associated with communications, anomalies can be appropriately monitored for.

Furthermore, this embodiment aspect is not limited to monitoring for the anomalous situations supposed in FIGS. 23(a) and 23(b), but may be applied also in cases where the route of the mobile work machine 31 is monitored until that mobile work machine 31 is decommissioned and disposed of.

In the embodiment aspect represented in FIGS. 23(a) and 23(b), provision is made for determining the power-up period T solely from the distance L relative to the boundary line of the set range 117 or 118. However, provision may also be made to determine the power-up period T so as also to give consideration to such factors as the bearing, information on the surrounding geography, the type of the mobile body, or the period of time the mobile body is used, in addition to the distance L.

Figure 24A:
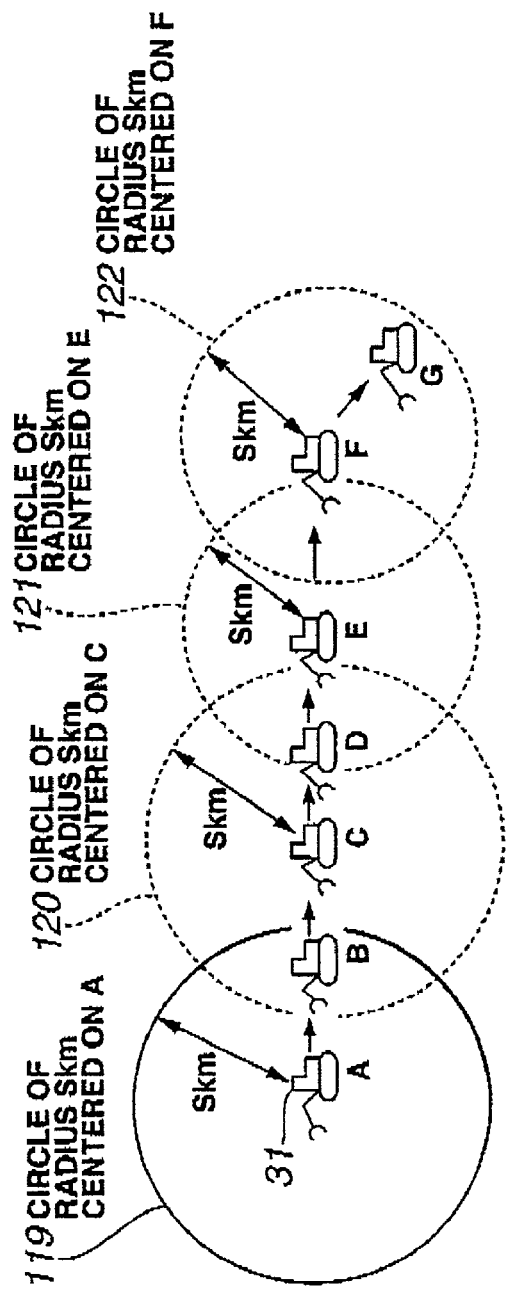
FIGS. 24(a) and 24(b) are diagrams for describing how the duty ratio of a power saving action changes.
Figure 24B:
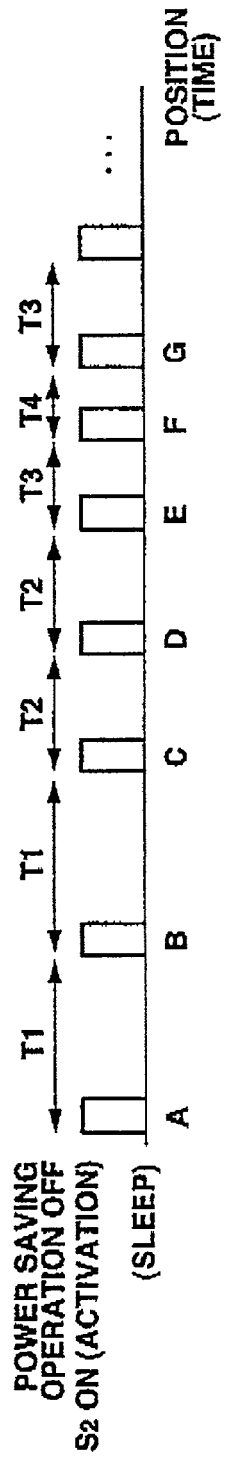

Provision may also be made so that, as diagrammed in FIGS. 24(a) and 24(b), the duty ratio D is varied according to the amount of positional change in the mobile work machine 31.

The powering up of the communication terminal 56 in the mobile work machine 31 is turned on and off intermittently with the prescribed duty ratio D $(=(\tau/T) \times 100\%)$, as diagrammed in FIGS. 7(a) to 7(c) and described earlier. Also, as diagrammed in FIG. 7(c), with the timing wherewith the power saving operation is turned off (power switch drive signal S2 is turned ON) and the communication terminal 56 is powered up, in response to requests from the terminal 11, signals indicating the current position (which may also include such mobile body information as the service meter value, fuel quantity, battery voltage, and vehicle body error code) are transmitted from the communication terminal 56 to the communication satellite 9. Hence the progressive travel position of the mobile work machine 31 is displayed on the terminal 11 that is the display recipient terminal.

The position of the mobile work machine 31 is detected by the GPS sensor 57 as diagrammed in FIG. 2. In this case, if the power consumption of the GPS measurement equipment (GPS antenna 59, GPS sensor 57, and communication controller 54) is low, that GPS measurement equipment can be electrically connected directly to the battery 63 and operated continuously. If the power consumption of that GPS measurement equipment is large, however, provision may be made so that, as with the communication terminal 56, the sleep function is turned on and the power saving operation is turned on and off, so that the GPS measurement equipment is only operated and the position measured when the power saving operation is turned on (when the communication terminal 56 is powered up).

In the mobile work machine 31, the current position detected by the GPS sensor 57 at this last power up and the boundary positions of circles 119, 120, . . . of radius S, centered on the position detected at the previous power up are compared, and processing is performed to vary the power-up period T according to the results of those comparisons.

In FIG. 24(b) is diagrammed how the power-up period T varies according to whether or not the mobile work machine 31 has departed to the outside of the circles 119, 120, . . . .

As diagrammed in FIG. 24(a), first, the position A of the mobile work machine 31 is detected by the GPS sensor 57, and the circle 119 having radius S (km) centered on that position A is set on the map. The initial setting for the power-up period T is the maximum period T1. Therefore, after the period T1, the communication terminal 56 will be powered up. Let it be assumed that the position detected by the GPS sensor 57 at that time was the position B which is inside the circle 119. In that case, the power-up period T will be left unchanged at the maximum period T1. After another period T1, the communication terminal 56 will be powered up. Let it be assumed that the position detected by the GPS sensor 57 at that time was the position C, which is outside the circle 119. When that is the case, the circle 120 having radius S (km) and centered on that position C is set on the map, and the power-up period T is changed to the period T2 which is shorter than the maximum period T1.

Therefore, after the period T2, the communication terminal 56 will be powered up. Let it be assumed that the position detected by the GPS sensor 57 at that time was the position D which is inside the circle 120. In that case, the power-up period T is left unchanged at the period T2. After another period T2 the communication terminal 56 will be powered up. Let it be assumed that the position detected by the GPS sensor 57 at that time was the position E which is outside the circle 120. When that is the case, a circle 121 having radius S (km) and centered on that position E is set on the map, and the power-up period T is changed to the period T3 which is shorter even than the period T2. After the period T3, the communication terminal 56 will be powered up. Let it be assumed that the position detected by the GPS sensor 57 at that time was position F which is outside the circle 121. When that is the case, a circle 122 of radius S (km) and centered on that position F is set on the map, and the power-up period T is changed to the period T4 which is even shorter than the period T3.

Hence the communication terminal 56 will be powered up after the period T4. Let it be assumed that the position detected by the GPS sensor 57 at that time was the position G which is inside the circle 122. In that case, the power-up period T will be returned to the period T3 which is longer than the period T4 (cf. FIG. 24(b)).

In the embodiment aspect represented in FIG. 24(a), areas are set as circles 119, 120, . . . , having the radius S, but square areas of side S may be set instead.

In the case of square areas, when comparing the current position detected by the GPS sensor 57 at this last power up against the boundary position of an area centered on the position detected at the last power up, an advantage is gained in that, without doing any complex computational processing, whether or not it is outside an area can be determined simply by subtracting latitudes and longitudes on the map.

It is also possible to embody the areas 119, 120, . . . diagrammed in FIG. 23(a) in shapes other than circles or squares. For example, the areas may be made ellipses or rectangles that are long in either the latitudinal or longitudinal dimension. Or these may be made ellipses or rectangles which are long in the direction of advance of the mobile work machine 31. In that case, it is possible to determine more accurately and more quickly whether or not the mobile work machine 31 has departed from an area.

Also, the size of the areas 119, 120, . . . , or, more specifically, the radius S (km) if the area is a circle, may be varied according to the amount of travel.

Thus, in the case diagrammed in FIGS. 24(a) and 24(b), the power-up period T will become shorter as the speed of travel of the mobile work machine 31 becomes greater, in an equivalent manner, and, on the display screen on the terminal 11 that is the display recipient terminal, a more detailed travel track (a travel track wherein the time interval between each travel position displayed is short) will be displayed. For that reason, when the work at one work site is completed, and the mobile work machine 31 is traveling to the next work site, that situation can be appropriately ascertained at the terminal 11. For that reason, process management and transport management work efficiency is dramatically improved. Moreover, because the duty ratio D wherewith the powering up of the communication terminal 56 is turned on and off is made larger as the speed of travel of the mobile work machine 31 becomes higher, both appropriate monitoring during travel and suppression of the electric power consumption associated with communications can be realized simultaneously.

In the embodiment aspect represented in FIGS. 24(a) and 24(b), provision is made so that the power-up period T is changed according to whether or not a successively set area 119, 120, . . . was exceeded. However, provision may also be made so that, as indicated in the graph in FIG. 25, the travel speed V of the mobile work machine 31 is computed at every power-up period T, and the power-up period T is varied according to the size of that computed speed V.

Figure 25:
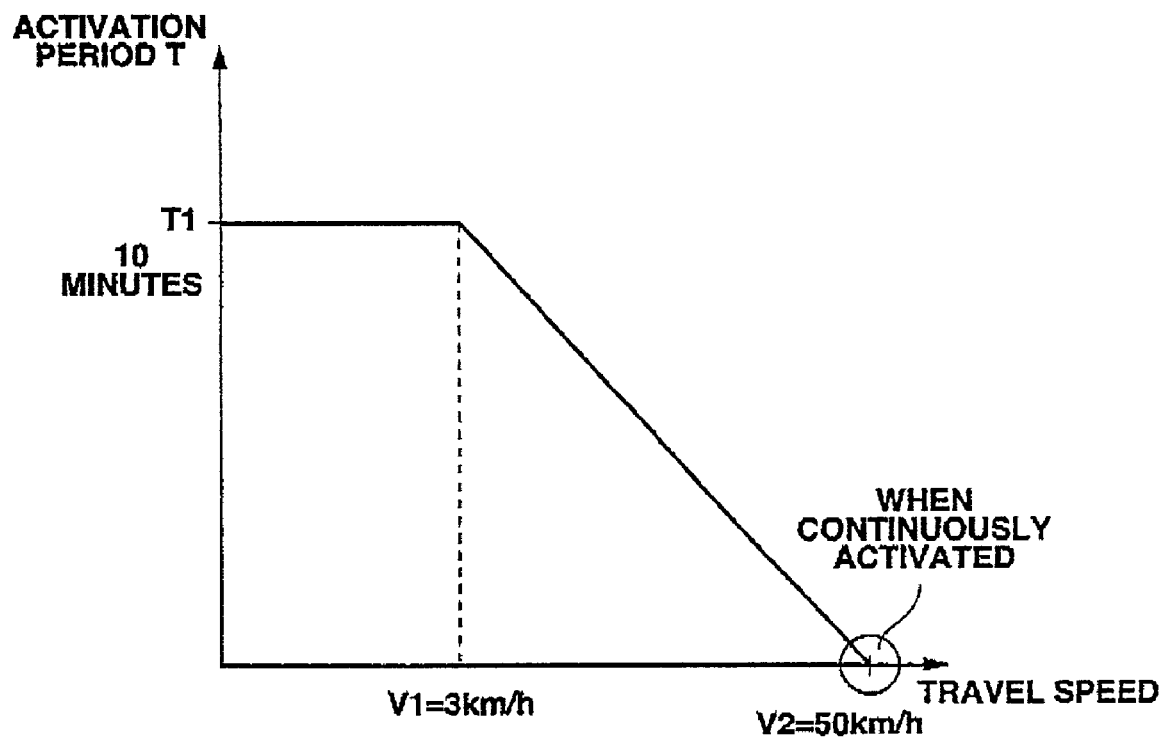
FIG. 25 is a graph representing how the power-up period of a communication terminal changes.

In the embodiment aspect represented in FIG. 25, as in the embodiment aspect represented in FIGS. 24(a) and 24(b), the position of the mobile work machine 31 is detected by the GPS sensor 57 every time the communication terminal 56 is powered up.

The travel speed V is computed by the following formula.

V=(position detected at this power up−position detected at previous power up)/current power-up period T The relationship between the travel speed V and the power-up period T is plotted in the graph in FIG. 25. If the travel speed V is sufficiently low, that is, no greater than a speed V1 (=3 km/h), the power-up period T is set to the maximum period T (=10 minutes). As the travel speed V increases from V1 up to the cruising speed V2 (=50 km/h) of the tractor-trailer, the power-up period T becomes shorter. Then, when the travel speed V reaches the cruising speed V2, the power-up period T becomes 0 (duty ratio D becomes 1), that is, the communication terminal 56 goes into a continuously powered-up state.

A power-up period T corresponding to the travel speed V found by the computation formula given above is determined from the graph given in FIG. 25, and set.

Thus the power-up period T will become shorter as the travel speed V of the mobile work machine 31 becomes higher, and a more detailed travel track (a travel track wherein the time interval between each travel position displayed is short) will be displayed on the display screen on the terminal 11 that is the display recipient terminal. For that reason, when a job at one work site is completed, and the mobile work machine 31 is traveling to the next work site, that situation can be appropriately ascertained at the terminal 11. Also, because at the cruising speed V2 of the transport vehicle (tractor-trailer) 35 the communication terminal 56 will be in a continuously powered-up state and the travel position of the 31 will be continually displayed, the circumstances wherein the tractor-trailer 35, which is prohibited by law from traveling on expressways, for example, is traveling with the mobile work machine 31 loaded thereon can be continually monitored on the display screen on the terminal 11. For that reason, process management and transport management work efficiency is dramatically improved. Moreover, because the duty ratio D wherewith the powering up of the communication terminal 56 is turned on and off is made larger as the speed of travel of the mobile work machine 31 becomes higher, both appropriate monitoring during travel and suppression of the electric power consumption associated with communications can be realized simultaneously.

In the embodiment aspect described in the foregoing, provision is made so that the powering up of the communication terminal 56 is done intermittently at a prescribed period T, but provision may also be made so that the powering up of the communication terminal 56 is done intermittently at certain times.

Embodiment is possible, for example, so that the communication terminal 56 is powered up at a certain time when communications between the communication satellite 9 and the mobile work machine 31 can be conducted well. That certain time corresponds to the position (altitude) of the communication satellite 9.

In FIG. 13(*a*) is diagrammed the positional relationship between the communication satellite 9 and the mobile work machine 31. The communication path (radio communications line 5) between the communication satellite 9 and the mobile work machine 31 is interrupted by obstacles 123 to communications such as mountains and buildings.

When the altitude of the communication satellite 9 is high (when the maximum elevation angle is large), communication interference by the obstacles 123 is reduced and the communication status become good. Thereupon, the communication terminal 56 is powered up and communications with the communication satellite 9 are conducted at a time when the altitude of the communication satellite 9 is high.

In order to power up the communication terminal 56, however, it is necessary to store information on the orbital position of the communication satellite 9 in memory on the mobile work machine 31 end.

The orbital positional information for the communication satellite 9 differs from day to day. For that reason, if the orbital positional information for all days is stored in memory in the mobile work machine 31, that will lead to such problems as insufficient memory capacity or the memory being monopolized.

Thereupon, in this embodiment aspect, as diagrammed in FIG. 13(*a*), orbital positional information 124 of a specific information volume is transmitted via the radio communications line 5 to the mobile work machine 31 from the communication satellite 9.

A clock is comprised internally in the communication terminal 56 of the mobile work machine 31. Thereupon, by matching the orbital positional information 124 received against the time calculated by the clock, decisions are made as to whether or not to power up the communication terminal 56.

In FIG. 13(*b*) is given the orbital positional information for the communication satellite 9 for a certain day.

In FIG. 13(*b*), "AOS" indicates the time and azimuth angle at which the communication satellite 9 will appear on the horizon, "MEL" indicates the time and azimuth angle at which the maximum elevation angle of the communication satellite occurs, and "LOS" indicates the time and azimuth angle at which the communication satellite 9 disappears below the horizon. The path of the communication satellite 9 relative to the surrounding elements is diagrammed in FIG. 13(*c*).

In the communication terminal 56 of the mobile work machine 31, processing is executed based on orbital position information 124 as shown in FIG. 13(*b*), to power up that communication terminal 56 at times when a maximum elevation angle equal to or greater than a prescribed threshold value (45 degrees, for example) is obtained, that is, at the times 4:33 and 16:28 when the maximum elevation angles of 66° and 54° are obtained. In other words, when the specific times 4:33 and 16:28 are arrived at, the main power supply circuit of the communication terminal 56 is driven, and a signal indicating mobile body information is transmitted to the communication satellite 9 via the radio communications line 5.

Also, in terms of the orbital positional information 124, new data are transmitted via the radio communications line 5 to the mobile work machine 31 from the communication satellite 9 at those specific times, every day, for example. Thus the content of the orbital positional information 124 stored in the memory of the mobile work machine 31 is updated.

Based on the embodiment aspect represented in FIGS. 13(*a*) to 13(*c*) and described in the foregoing, provision is made so that the communication terminal 56 is powered up every time a specific time is arrived at where communications between the communication satellite 9 and the mobile work machine 31 can be conducted well. Therefore, while achieving power savings, communications are conducted without fail between the communication satellite 9 and the mobile work machine 31. Also, provision is made for receiving the orbital positional information 124 by communications from the outside, so such problems as insufficient memory capacity or memory monopolization at the mobile work machine 31 end do not occur.

In the embodiment aspect described in the foregoing, moreover, provision is made so that the powering up of the communication terminal 56 is done intermittently with a prescribed period T, but embodiment is also possible wherewith that power-up period T is altered at will from the terminal 11 on the manager's end, for example. In that case, as described earlier, electronic mail wherein alteration data for changing the power-up period T are coded is sent from the terminal 11 to the mobile work machine 31 with that mobile work machine 31 as the mail address. The alteration data coded in the electronic mail are read out in the communication terminal 56 in the mobile work machine 31 which is the transmission recipient, and the power-up period T is altered according to the content of that alteration data.

For example, when the service meter of the mobile work machine 31 exceeds a prescribed value (i.e. when it has become superannuated), the power-up period T is shortened so that conditions are monitored closely at short intervals, and, when loaned to some specific user (i.e. when there is no need for monitoring) or taken out of service for an extended period (i.e. when the operation thereof is clearly known to be stopped), the power-up period T is lengthened in order to make the monitoring interval longer and save wasteful power consumption and communication charges. It is also possible, for a plurality of mobile bodies that are operated and driven as a group, to alter the power-up periods T all at one time to the same value.

Thus, based on this embodiment aspect, the power-up period T can be altered by remote control while monitoring the situation of the mobile body and the surrounding circumstances from the terminal 11 end. Thus there is no longer any need to dispatch a worker to the site of the mobile bodies 31, 32, . . . , respectively, to alter the power-up period T, and the workload is sharply reduced.

Based on this embodiment aspect, as described in the foregoing, even for mobile bodies 31 to 35 such as construction machines wherein the engine is not operated for long periods of time, communications are made possible with a plurality of terminals 11, 12, . . . , while the engine is off, it is possible to respond to requests from the terminals 11, 12, . . . , and wasteful electric power consumption is suppressed.

This embodiment aspect which intermittently turns on the power supply for communications is not limited to the communication system diagrammed in FIG. 1, but can be applied to any communication system. Such application is possible in any communication system that comprises a minimum of two communication stations and conducts communications between those two communication stations.

It should be noted that, in the embodiment aspect described in the foregoing, cases are presumed where mobile body information is displayed on a display recipient terminal (terminal 12, for example) only when a request for mobile body information has been made from a request originator terminal (terminal 11, for example) to a request recipient mobile body (the mobile work machine 31, for example).

In the embodiment aspect that is discussed below, provision is made so that, even in situations where there is no request from a terminal, if an internal parameter in a mobile body becomes a certain value, certain mobile body information is spontaneously transmitted and that certain mobile body information is displayed at the terminal end.

Based on this embodiment aspect, it is possible to learn of an anomalous situation (such as a malfunction or the like) that has developed in a mobile body which cannot be continually managed and monitored from the terminal end, and to appropriately ascertain whether the mobile body is in an operating condition or out-of-service condition.

As diagrammed in FIG. 2, let it now be assumed that an internal parameter of the mobile work machine 31 such as the engine start condition, for example, has been detected by a prescribed sensor (a sensor which detects the voltage value of an alternator, for example) in the sensor group 62. The detection signal from that sensor, as described earlier, is coded in a frame signal by the electronic control controller 53 and sent to the signal line 52, and thereby input via the communication controller 54 to the communication terminal 56. If the communication terminal 56 is capable of monitoring the on and off condition of the engine, known art other than this method may be used.

Figure 26:
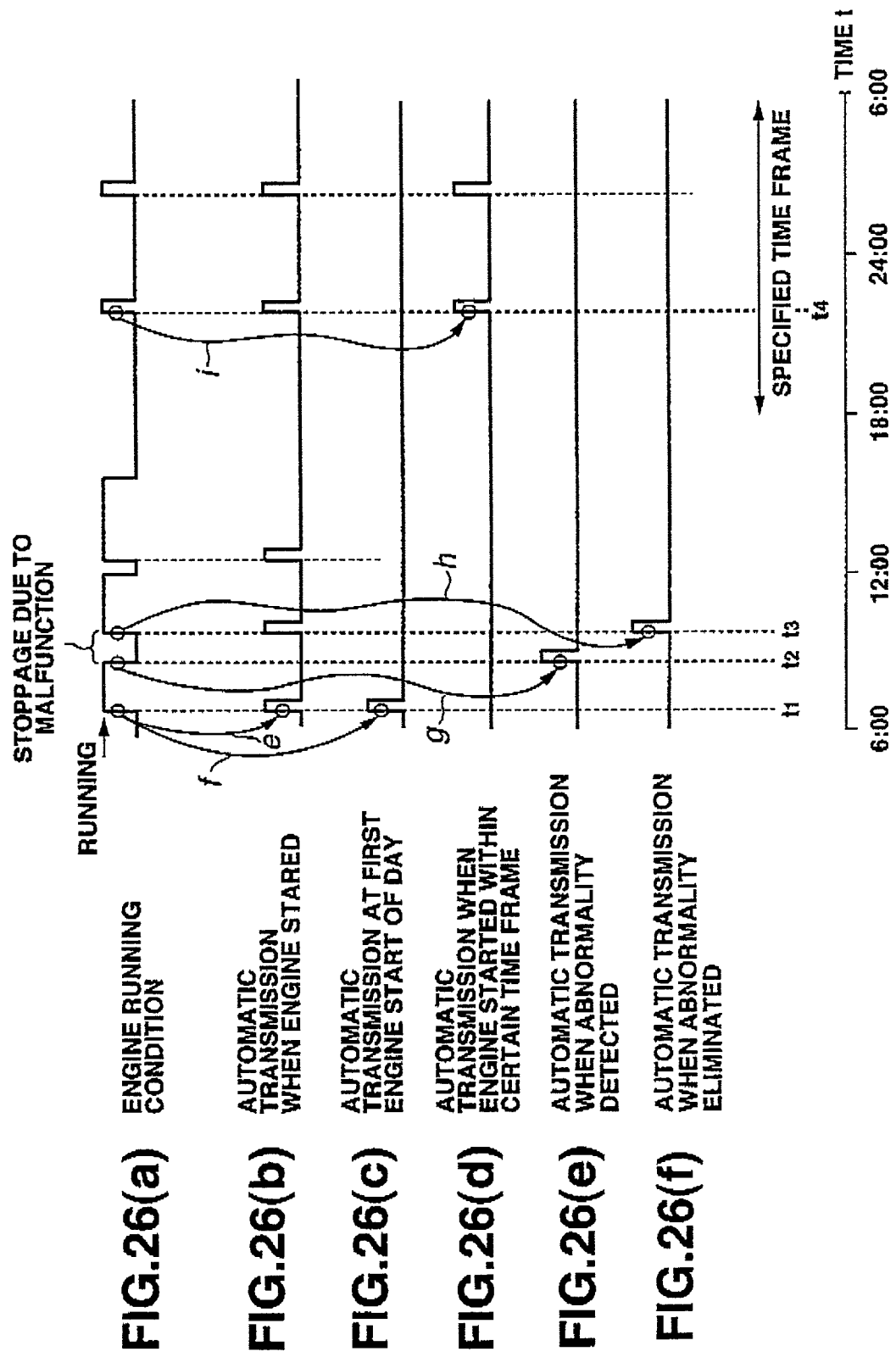
FIGS. 26(a) to 26(f) are timing charts for describing how automatic transmissions are made from a mobile body.

In FIG. 26(*a*), is diagrammed a signal which indicates the engine start condition input to the communication terminal 56 of the mobile work machine 31. In FIG. 26(*a*) is represented the engine start condition for the mobile work machine 31 at each time t in one day (from time 6:00 until time 6:00). A logic "1" level corresponds to the condition where the engine is running (started), while a logic "0" level corresponds to the condition where the engine operation is stopped.

An automatic transmission from the mobile work machine 31 can be made so that it is timed to every engine start, as diagrammed in FIG. 26(*b*), for example.

More specifically, when the engine is started at the time t1, as diagrammed in FIG. 26(*a*), and a signal indicating that the engine has started is input to the communication terminal 56, specific mobile body information, such as the current position of the mobile work machine 31, for example, is incorporated into electronic mail, and transmitted as electronic mail to the communication satellite 9, as indicated by the arrow e, triggered by that signal. The address to which that electronic mail is sent is made the server terminal 21. When the communication terminal 56 is sleeping due to the power saving operation described earlier, the electronic mail is transmitted after the engine is started and a forced powering up has been effected.

Accordingly, if it is assumed that the server terminal 21 is a terminal at the manager's end, the successive positions of the mobile work machine 31 at every time the engine is started will be displayed on the display screen on the terminal 21 at the manager's end. Accordingly, the manager can ascertain the history of positions of the mobile work machine 31 at every time the engine is started from the display screen without himself or herself performing a request input operation, can learn of an anomalous situation (such as a malfunction or the like) that has arisen in a mobile work machine 31 which cannot be continually managed and monitored, and is able to appropriately ascertain whether the mobile work machine 31 is in an operating condition or an out-of-service condition.

Provision may also be made so that electronic mail is sent from the mobile work machine 31 with other terminals 11, 12, . . . and the like as recipient mail addresses.

Provision may also be made so that the automatic transmission from the mobile work machine 31 is made timed to the first engine start of the day, as diagrammed in FIG. 26(*c*).

More specifically, when the engine is started at the time t1 as diagrammed in FIG. 26(*a*), a start signal indicating that the engine has been started is input to the communication terminal 56. Here, a clock is provided internally in the communication terminal 56, and a determination is made as to whether or not that start signal is the first signal input that day (from time 6:00 to time 6:00). When it has been found that the input start signal is the first start signal input that day, the current position of the mobile work machine 31 is incorporated into electronic mail, and transmitted as electronic mail to the communication satellite 9, as indicated by the arrow f, triggered by that start signal. Accordingly, the history of the positions of the mobile work machine 31 will be displayed on the terminal at the manager's end, similarly as described above. Based on this embodiment aspect, compared to the case represented in FIG. 26(*b*), the interval of the automatic transmission will at least become once a day, wherefore communication expenses can be suppressed.

Provision is made, furthermore, so that an automatic transmission is made only when the engine is first started in the day, but that period may be set as desired, and provision may be made so that, for example, an automatic transmission is made only when the engine is first started in the week.

Provision may be made, alternatively, so that the automatic transmission from the mobile work machine 31 is made timed to an engine start within a certain time frame (between the times of 18:00 and 6:00, for example), as diagrammed in FIG. 26(*d*).

Specifically, when the engine is started at the time t4 in the time frame of 18:00 to 6:00, as diagrammed in FIG. 26(*a*), a signal indicating that the engine has been started is input to the communication terminal 56, the current position of the mobile work machine 31 is incorporated into electronic mail, and transmitted as electronic mail to the communication satellite 9, as indicated by the arrow i, triggered by that signal. Accordingly, the history of the positions of the mobile work machine 31 during that specific time frame will be displayed on the terminal at the manager's end, similarly as described above. Here, the specific time frame (off hours)

of from 18:00 to 6:00 is the time frame wherein mobile work machines such as construction machines ordinarily are not operating. It is even less likely that prolonged travel would be occurring during this time frame. If the engine is started and the mobile work machine 31 moves during this specific time frame, that means there is a danger that something extraordinary has happened. The history of the positions of the mobile work machine 31 during that specific time frame is displayed on the terminal at the manager's end, wherefore, by monitoring that display screen, it can be judged that something extraordinary has happened with the mobile work machine 31.

Alternatively, provision may be made so that an automatic transmission from the mobile work machine 31 is made timed to when the engine is stopped due to an anomaly, as diagrammed in FIG. 26(*e*).

Here, an anomaly, such as "engine r.p.m. high," "engine exhaust temperature high," "cooling water temperature high," "battery voltage low," or "fuel quantity low," for example, which has occurred in the mobile work machine 31, is detected by a prescribed sensor in the sensor group 62, as diagrammed in FIG. 2. The detection signal from that sensor, as described earlier, is coded in a frame signal as an error code (such as "anomaly item: fuel quantity low") by the electronic control controller 53 and sent to the signal line 52, and thereby input via the communication controller 54 to the communication terminal 56. If the communication terminal 56 is capable of monitoring vehicle body anomalies, known art other than this method may be used.

When the engine operation is stopped at the time t2, as diagrammed in FIG. 26(*a*), a stop signal indicating that the engine has been stopped is input to the communication terminal 56. Here, in the communication terminal 56, the error code noted earlier is input. Then a determination is made as to whether or not the stop signal and the error code were input simultaneously. When the stop signal and the error code where input simultaneously, it is judged that the engine stopped due to an anomaly (malfunction), the current position of the mobile work machine 31 is incorporated into electronic mail, and transmitted as electronic mail to the communication satellite 9, as indicated by the arrow g, triggered by that stop signal. Accordingly, the position of the mobile work machine 31 will be displayed on the terminal at the manager's end, similarly as described earlier. Based on this embodiment aspect, the position of the mobile work machine 31 is only displayed at the terminal when an anomaly is detected and the engine has been stopped, wherefore the position of the mobile work machine 31 at the time the anomaly occurred can be accurately ascertained. Accordingly, anomalies can be dealt with quickly, and damage to the mobile work machine 31 held down to a minimum.

Alternatively, provision may be made so that, instead of an automatic transmission being made merely at the point in time when an anomaly occurred, specific anomaly items (critical anomaly items) are predetermined from among the anomaly items (error codes), and an automatic transmission made only when such a critical anomaly has occurred.

Or provision may be made so that an automatic transmission from the mobile work machine 31 is made timed to an engine start when an anomaly has been eliminated, as diagrammed in FIG. 26(*f*).

More specifically, when the engine is started at the time t3, as diagrammed in FIG. 26(*a*), a start signal indicating that the engine has been started is input to the communication terminal 56. Here, in the communication terminal 56, the error code noted earlier is input. When a service person or the like performs prescribed measures to correct the anomaly and the anomaly (malfunction) is eliminated, the error code ceases being input to the communication terminal 56. At the communication terminal 56, a determination is made as to whether or not the engine was started at the point in time when the error code ceased being input. If the engine was started at the point in time when the error code ceased being input, it is judged that the engine was started after the anomaly (malfunction) was eliminated, the current position of the mobile work machine 31 is incorporated into electronic mail, and transmitted as electronic mail to the communication satellite 9, as indicated by the arrow h, triggered by that start signal. Accordingly, the position of the mobile work machine 31 will be displayed on the terminal at the manager's end, similarly as described earlier. Based on this embodiment aspect, the position of the mobile work machine 31 is displayed at the terminal end only when the engine is started after an anomaly has been eliminated, wherefore the position of the mobile work machine 31 at the point in time when the anomaly was appropriately resolved can be accurately ascertained.

Provision may also be made so that certain mobile body information, such as the running map (record of from what hour and minute until what hour and minute the engine was running) up until the time of 23:00 that day, for example, is automatically transmitted from the mobile work machine 31 at a specific time (such as 23:00, for example). By so doing, a daily running map will be displayed on the display screen at the terminal end, as diagrammed in FIG. 30.

Provision may also be made so that certain mobile body information is automatically transmitted from the mobile work machine 31 at a specific time every several days (such as at 23:00 every third day, for example).

Provision may also be made so that certain mobile body information is automatically transmitted from the mobile work machine 31 at a specific time on a certain day of the week (such as at 23:00 every Saturday, for example).

Certain mobile body information is transmitted at a certain time, as described in the foregoing, wherefore, from the display screen at the terminal, certain mobile body information for the mobile work machine 31 can be regularly acquired.

Certain mobile body information (such as the "service meter," "vehicle body alarm 1" (error code 1), "vehicle body alarm 2" (error code 2), "battery voltage," "engine temperature," "engine r.p.m.," "pump pressure," and "oil level," for example) may be automatically transmitted when the cumulative running time for the mobile work machine 31 reaches certain cumulative running time values, such as at the points in time when the absolute value of the service meter reaches 100 hours, 300 hours, and 500 hours, for example.

Thus certain mobile body information is transmitted when a certain cumulative running time value is reached, wherefore, on the display screen at the terminal, preparatory information can be acquired for performing periodic inspections required by regulation. Also, automatic transmissions are made according to running time changes (load), wherefore unnecessary communications while the vehicle is out of service can be avoided and communication costs suppressed.

Alternatively, certain mobile body information (such as the "service meter," "vehicle body alarm 1" (error code 1), "vehicle body alarm 2" (error code 2), "battery voltage," "engine temperature," "engine r.p.m.," "pump pressure," and "oil level," for example) may be automatically transmitted every time the cumulative value of the running time for the mobile work machine 31 increases by a certain amount, such as every time the service meter increase value passes 100 hours (or 500 hours) since the time of the last automatic transmission, for example. The service meter increase value can also be set in conjunction with the times the service car 34 makes a patrol round.

In this manner, certain mobile body information will be transmitted every time the cumulative running time value increases by a certain amount, wherefore, on the display screen at the terminal, preparatory information can be acquired for performing periodic inspections required by regulation. When the display is made on a terminal at the manager's end, moreover, the service car 34 can easily be instructed to make a patrol round. When the display is made on a terminal at a service person's end, the mobile work machine requiring servicing can be easily specified and servicing performed promptly by the service car 34. Also, automatic transmissions are made according to running time changes (load), wherefore unnecessary communications while the vehicle is out of service can be avoided and communication costs suppressed.

The embodiment aspect described in the foregoing can be modified in various ways, as is now described with reference to FIGS. 9, 10, 11, 12, and 14.

Provision may be made so that the automatic transmission is performed at a point in time when the position of the mobile work machine 31 changes.

The position of the mobile work machine 31 is detected by the GPS sensor 57, as indicated in FIG. 2. The detection results from the GPS sensor 57 are input to the communication controller 54. In the communication controller 54, when it is judged that the position of the mobile work machine 31 has changed, information on the position after the change is sent as transmission data to the communication terminal 56. Then electronic mail wherein that positional information has been coded is automatically transmitted from the communication terminal 56 via the satellite communication antenna 58.

Thus positional information is transmitted every time the position of the mobile work machine 31 changes, wherefore, on the display screen at the terminal, the travel history of the mobile work machine 31 can be acquired.

Provision may also be made so that an automatic transmission is made at the point in time when the mobile work machine 31 departs from a set range 129 as diagrammed in FIG. 10.

The position of the mobile work machine 31 is detected by the GPS sensor 57, as indicated in FIG. 2. The detection results from the GPS sensor 57 are input to the communication controller 54. In the communication controller 54, positional information on the work site is stored in memory. The set range 129 of that work site is a circle of radius S (km). That being so, the detected position of the mobile work machine 31 and the boundary position of the set range 129 are compared, and a determination is made as to whether or not the mobile work machine 31 has departed from the set range 129. At the point in time when the mobile work machine 31 reaches the boundary position J of the set range 129, the positional information on the mobile work machine 31 at that time is sent as transmission data to the communication terminal 56. Then electronic mail wherein that positional information has been coded is automatically transmitted from the communication terminal 56 via the satellite communication antenna 58.

Thus the positional information is transmitted at the point in time when the mobile work machine 31 departs from the set range 129 (point in time when a set position was exceeded), wherefore, on the display screen at the terminal, it is easy to monitor whether or not the mobile work machine 31 is operating inside the work site.

The set range 129 is not limited to the fixed range of the work site, moreover, and that range may be one that is centered on a position occupied by the mobile work machine 31 in the past. That is, the set range may be updated with the passage of time.

The shape of the set range 129 is not limited to a circular shape, but may be any shape, such as an ellipse, square, rectangle, or ellipse or rectangle the long dimension whereof is in the direction of the advance of the mobile work machine 31.

The set range 129 diagrammed in FIG. 10 may also be made a range corresponding to the normal range 117 diagrammed in FIG. 23(*a*).

Provision may also be made so that an automatic transmission is made at the point in time when the amount of change in the travel position of the mobile work machine 31 has exceeded a set value as diagrammed in FIG. 10.

The position of the mobile work machine 31 is detected by the GPS sensor 57, as indicated in FIG. 2. The detection results from the GPS sensor 57 are input to the communication controller 54 with a certain sampling period. In the communication controller 54, the travel speed V of the mobile work machine 31 is computed based on the differential between the position detected the previous time and the position detected this time, and on the sampling time period. Thereupon the travel speed V of the mobile work machine 31 and a set value Internet V2 (cf. FIG. 25) are compared, and a determination as to whether or not the speed V of the mobile work machine 31 has exceeded the set value V2. At the point in time when the speed V of the mobile work machine 31 exceeds the set speed V2, the positional information on the mobile work machine 31 at that time is sent as transmission data to the communication terminal 56. Then electronic mail wherein that positional information has been coded is automatically transmitted from the communication terminal 56 via the satellite communication antenna 58.

Thus positional information is transmitted at the point in time when the speed V of the mobile work machine 31 exceeds the set speed V2, wherefore, on the display screen at the terminal, the manner in which the mobile work machine 31 is traveling can be easily monitored. A mobile work machine 31 such as a construction machine travels at extremely low speed. For that reason, if the set speed V2 is set at a high speed that the mobile work machine 31 normally cannot travel under its own power, such as the speed at which the tractor-trailer 35 cruises on an expressway, when the speed V of the mobile work machine 31 exceeds that set value V2, it can be judged that it is being transported by the tractor-trailer 35. Also, when being transported by tractor-trailer during a time when or under circumstances wherein transport is ordinarily not done, it may be recognized that an anomalous situation has developed, and appropriate measures can be taken promptly.

Figure 9:
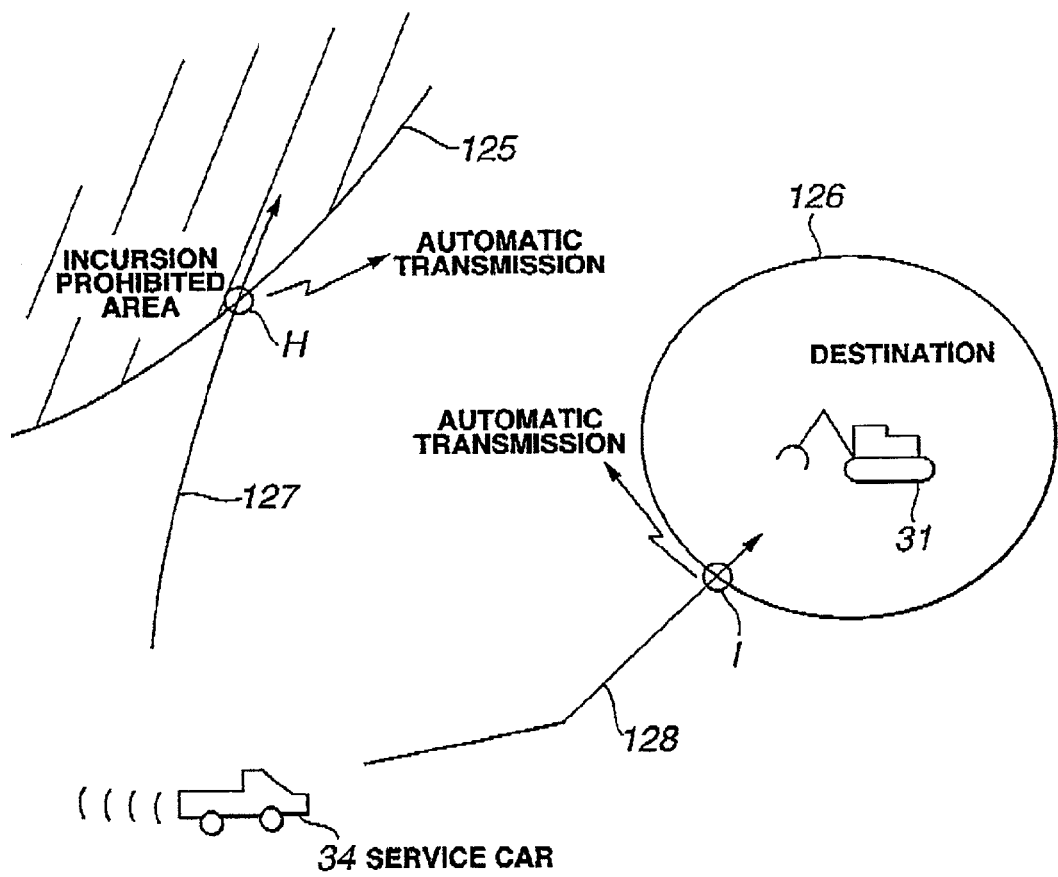
FIG. 9 is a diagram for describing conditions wherein an automatic transmission is made from a mobile body.
Figure 14:
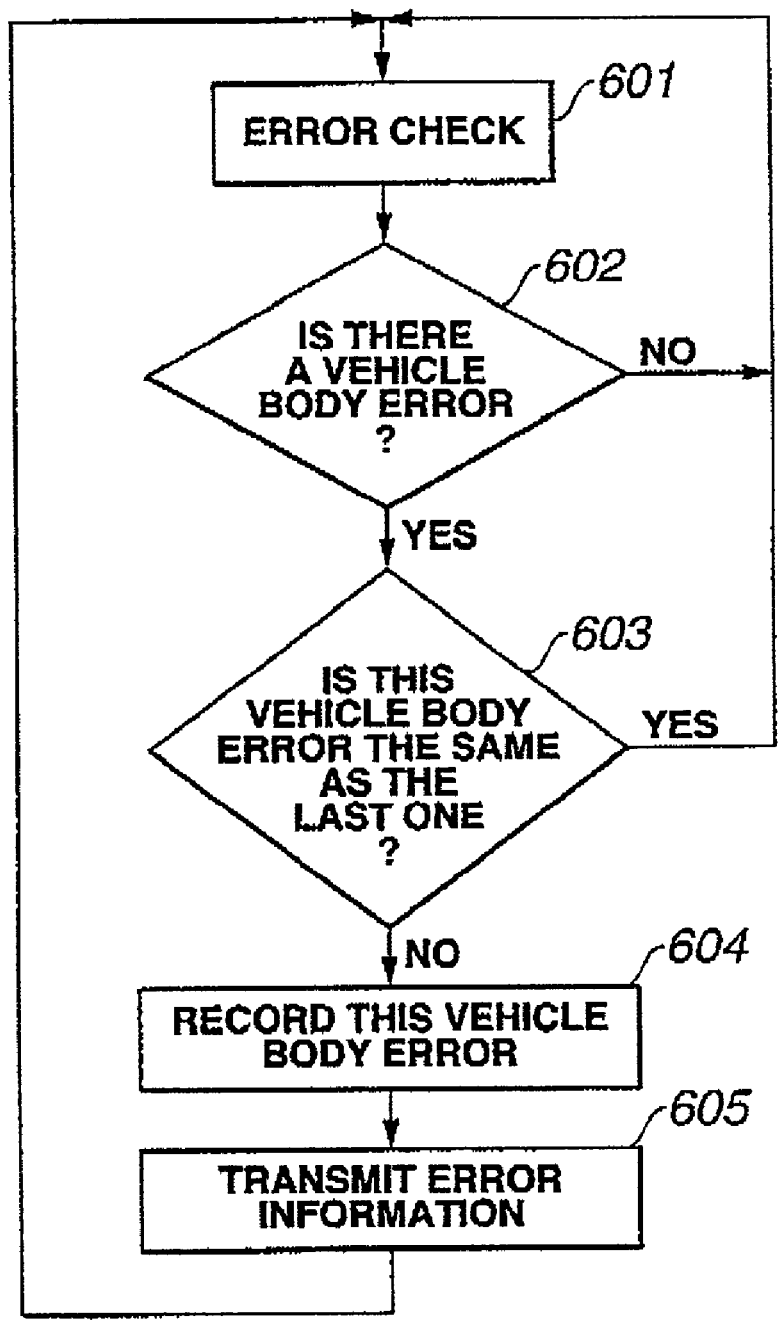
FIG. 14 is a flowchart of processing procedures for cases where automatic transmissions are made from a mobile body.

Provision may also be made so that an automatic transmission is made when the service car 34 makes an incursion into a specific set range 125 or 126, as diagrammed in FIG. 9.

The position of the service car 34 is detected by the GPS sensor 57, as indicated in FIG. 2. The detection results from the GPS sensor 57 are input to the communication controller 54. In the communication controller 54, positional information on the destination 126 where the mobile work machine 31 that is the service subject is located and on the incursion prohibited area 125 are stored in memory. The set range 126 for that destination is a circle of prescribed radius centered on the position of the mobile work machine 31. By incursion prohibited area 125 is meant a road that is restricted due to heavy rain or an area where the ground is unstable.

Thereupon, the detected position of the service car 34 and the boundary position of the set range 125 or 126 are compared, and a judgment is made as to whether or not the service car 34 has entered the set range 125 or 126. At the point in time when the service car 34 reaches the boundary position H or I of the set range 125 or 126, traveling along the route 127 or 128, positional information on the service car 34 at that time is sent to the communication terminal 56 as transmission data. Then electronic mail wherein that positional information has been coded is automatically transmitted from the communication terminal 56 via the satellite communication antenna 58.

Thus positional information is transmitted at the point in time when the service car 34 entered the set range 125 or 126 (at the point in time when a set position was exceeded), wherefore, on the display screen at the terminal, monitoring can be done easily to determine whether or not the service car 34 has reached a destination, or whether or not it has made an incursion into an incursion prohibited area. In other words, the manager can recognize from the display screen on the terminal that the service car 34 has arrived at the destination 126 and is to begin service work, and can also recognize a dangerous situation when the service car 34 has made an incursion into the incursion prohibited area 125. Thus from the terminal at the manager's end, as described earlier, appropriate work instruction data (the message "return upon completion" or "avoid incursion prohibited area") can be sent to the service car 34 (cf. FIG. 4).

The shape of the set range 126 for the destination is not limited to a circular shape, but may be made any shape, such as an ellipse, square, or rectangle.

The set ranges 125 and 126 diagrammed in FIG. 9 may be ranges that correspond with the non-normal range 118 diagrammed in FIG. 23(*b*).

Provision may also be made so that an automatic transmission is made at the point in time when, as diagrammed in FIG. 11, the volume of data to be transmitted coincides with a set value or exceeds a set value.

In a communication system wherein a measured rate charging system is adopted, as diagrammed in FIG. 11(*a*), the communication charges paid each time will be a fixed amount per month until a prescribed data volume Do is reached. When the data volume D exceeds the set value Do, it becomes necessary to pay additional charges only for the excess data volume.

Thereupon, the certain mobile body information that is to be automatically transmitted from the mobile work machine 31 is collected and accumulated in the communication controller 54. In the communication controller 54, the accumulated data volume D and the set value (80% of Do) are compared. Then, at the point in time when the accumulated data volume D coincides with the set value (80% of Do), as diagrammed in FIG. 11(*b*), the accumulated mobile body information is sent to the communication terminal 56 as transmission data. Then electronic mail wherein that mobile body information has been coded is automatically transmitted from the communication terminal 56 via the satellite communication antenna 58.

Thus, at the point in time when the data volume D to be automatically transmitted coincides (or, alternatively, exceeds) the set value, the mobile body information is transmitted, wherefore the maximum volume of mobile body information can be displayed on the display screen at the terminal within the fixed amount.

Provision may also be made so that an automatic transmission is made at the point in time when the fuel quantity coincides with a set value or falls below a set value, as diagrammed in FIG. 12(*a*).

fuel quantity is detected by the sensor group 62 in the mobile work machine 31, and sent successively to the communication controller 54. In the communication controller 54, the detected fuel quantity and the set value are compared. Then, at the point in time when the detected fuel quantity coincides with the set value, as diagrammed in FIG. 12(*a*), mobile body information ("position" and "fuel quantity") is sent to the communication terminal 56 as transmission data. Then electronic mail wherein that mobile body information has been coded is automatically transmitted from the communication terminal 56 via the satellite communication antenna 58.

Thus mobile body information is transmitted at the point in time when the fuel quantity coincides with the set value (or, alternatively, falls below the set value), wherefore, from the display screen at the terminal, it can be recognized when it is time to replenish the fuel. Hence, in like manner as with FIGS. 3 and 4, appropriate work instruction data (message "replenish fuel") can be sent to the service car 34 that is making fuel supply rounds from the terminal at the manager's end.

Provision may also be made so that an automatic transmission is made at the point in time when the voltage of the battery 63 coincides with a set value or falls below a set value, as diagrammed in FIG. 12(*b*).

The battery 63 voltage value is detected by the sensor group 62 in the mobile work machine 31 and successively transmitted to the communication controller 54. In the communication controller 54, the detected battery voltage and the set value are compared. Then, at the point in time when the detected battery voltage coincides with the set value, as diagrammed in FIG. 12(*b*), mobile body information ("position" and "battery voltage") is sent to the communication terminal 56 as transmission data.

Then electronic mail wherein that mobile body information has been coded is automatically transmitted from the communication terminal 56 via the satellite communication antenna 58.

Thus mobile body information is transmitted at the point in time when the voltage of the battery 63 coincides with the set value (or, alternatively, falls below the set value), wherefore, from the display screen at the terminal, it can be recognized when it is time to perform maintenance such as charging or replacing the battery 63, or performing an inspection. Hence, in like manner as with FIGS. 3 and 4, appropriate work instruction data (message "inspect battery") can be sent to the service car 34 from the terminal at the manager's end. It is also possible, by recognizing on the display screen at a terminal that the battery 63 is in a nearly discharged condition, thereafter to transmit a request to turn the sleep function on, and make a setting so that communications with the mobile work machine 31 will only be done intermittently, and thus suppress further discharge.

Embodiment is also possible such that automatic transmissions are not made when the mobile body information automatically transmitted the previous time and mobile body information to be automatically transmitted this time have identical content.

An anomaly, such as "engine r.p.m. high," "engine exhaust temperature high," "cooling water temperature high," "battery voltage low," or "fuel quantity low," for example, which has occurred in the mobile work machine 31, is detected by a prescribed sensor in the sensor group 62, as diagrammed in FIG. 2. The detection signal from that sensor, as described earlier, is coded in a frame signal as an error code (such as "anomaly item: fuel quantity low") by the electronic control controller 53 and sent to the signal line 52, and thereby successively input via the communication controller 54.

In the communication controller 54, the error code automatically transmitted the previous time and the error code currently being input are compared. The error code currently being input is then sent to the communication terminal 56 as transmission data only when the content of the error code automatically transmitted the previous time and the error code currently being input are different. Then electronic mail wherein that mobile body information has been coded is automatically transmitted from the communication terminal 56 via the satellite communication antenna 58.

Thus provision is made so that an automatic transmission is made only when the content of the error code automatically transmitted the previous time and the error code to be automatically transmitted this time are different, whereupon, when the error code automatically transmitted the previous time and the error code to be automatically transmitted this time have the same content, no automatic transmission is made. Therefore, the waste of transmitting the same information more than once can be avoided. The same applies to cases of automatically transmitting mobile body information other than error codes.

In the embodiment aspect described in the foregoing, certain mobile body information is spontaneously transmitted if an internal parameter in a mobile body becomes a certain value, but an embodiment is also possible wherein the content of the "parameter" (data in memory such as the data volume D, or sensor detected data such as the battery voltage), the "certain value," and the "certain mobile body information" in these cases can be altered at will from the terminal (server terminal 21 or terminal 11) at the manager's end, for example. In that case, as described earlier, from the terminal, electronic mail wherein are coded altering data for altering the parameters noted above or the like is transmitted to that mobile work machine 31 with the mobile work machine 31 as the mail address. In the communication terminal 56 of the transmission recipient mobile work machine 31, the altering data coded in the electronic mail are read out, and the parameters or the like are altered according to the content of those altering data.

The content of the "parameter," "certain value," and "certain mobile body information" are altered so that, for example, the monitoring interval becomes shorter when the service meter of the mobile work machine 31 exceeds a prescribed value (when superannuated), or so that the monitoring interval becomes longer and wasteful electric power consumption and communication charges are reduced when the mobile work machine 31 is loaned to some specific user (when there is no need for monitoring) or taken out of service for an extended period (i.e. when the operation thereof is clearly known to be stopped). It is also possible to alter the content all at once to the same content for a plurality of mobile bodies that are operating or traveling as a group. The "certain mobile body information," for example, can be reduced to only the critical monitoring items.

Thus, based on this embodiment aspect, the times that automatic transmissions are made, and the content thereof, can be altered by remote control while monitoring the conditions of the mobile body and the surrounding circumstances at the terminal end. Thus there is no need for a worker to pay a visit to the sites where the mobile bodies 31, 32, . . . are, respectively, to perform an altering operation, so the work load is sharply reduced.

If the mobile body information to be transmitted by automatic transmission is the position of the mobile body, furthermore, it is only necessary to transmit the latitude and longitude on the map as the positional information, or, alternatively, a relative position, relative to a certain reference, may be transmitted as the positional information.

Instead of automatically transmitting the voltage value of the battery 63 as mobile body information, moreover, the amount of change in the voltage of the battery 63 may be automatically transmitted.

Alternatively, running load information, work volume, or amount of fuel consumed may be automatically transmitted as mobile body information.

Based on this embodiment aspect, as described in the foregoing, on the display screen at a terminal, without someone at that terminal having to effect a request input operation, certain mobile body information can be ascertained when a certain parameter reaches a certain value. Accordingly, anomalous situations (such as malfunctions and the like) that have developed in a mobile body that cannot be managed or monitored continually can be recognized, and whether the mobile body is in an operating condition or out-of-service condition can be appropriately ascertained.

This automatically transmitting embodiment aspect is not limited to the communication system diagrammed in FIG. 1, but can be applied to any communication system. Such application is possible in any communication system that comprises a minimum of two communication stations and conducts communications between those two communication stations.

It should be noted that the information that is to be displayed on the terminals 11 and 12 is very voluminous. That being so, an embodiment aspect is described wherein critical information only is set beforehand out of the voluminous information, and that critical information only is consolidated and displayed on certain display screens. When that is done, at the manager's end, anomalous situations can be promptly identified and dealt with.

In the following embodiment aspect, the mobile work machine 31 is representatively described. It is also supposed that the terminal 11 is the terminal used by the manager who is managing that mobile work machine 31, and it is assumed that the server of the terminal 11 is the server terminal 21.

Incorporated inside the vehicle body 50 of the mobile work machine 31, although not diagrammed in FIG. 2, is a start lock circuit. This start lock circuit is configured of a relay or the like and is interposed between the engine ignition switch 64 (cf. FIG. 21) and the fuel injection equipment.

When a start lock setting command is output from the communication controller 54, the relay in the start lock circuit is energized and a start lock set condition is effected. That is, even if the engine ignition switch 64 is turned on, fuel will no longer be injected, and it will not be possible to start the engine. When, on the other hand, a start lock release command is output from the communication controller 54, the relay in the start lock circuit is deenergized, and a start lock released condition is effected. That is, by turning the engine ignition switch 64 on, fuel is injected and the engine is started.

The vehicle 31 travels when it moves under its own power and also when it is loaded on a tractor-trailer or other transport vehicle and moved. What is in view here is the case where it is loaded on a tractor-trailer and moved. The processing described below can also be similarly applied to cases where the vehicle 31 is traveling under its own power.

In the server terminal 21, a homepage display screen called "notification screen," diagrammed in FIG. 34, is produced. This "notification screen" is set as the top page of the home page. On this "notification screen," only critical information such as the following is consolidated and displayed.

a) Information that the vehicle 31 is outside a set range b) Information that the engine of the vehicle 31 has been started outside of regular hours c) Information that the battery voltage in the vehicle 31 is low d) Information that the start lock has either been set or released e) Information that communications have ceased between the vehicle 31 and the server terminal 21 f) Information that a request made to the vehicle 31 has not been carried out (information such, for example, as that, despite the fact that a start lock setting command has been issued, the start lock has not been set in the vehicle 31).

When, specifically, an automatic transmission has been made from the vehicle 31 and that automatically transmitted mobile body information has been received at the server terminal 21, a judgment is made at the server terminal 21 as to whether or not to display that mobile body information on the "notification screen" of the homepage.

Now, when the engine is started at the vehicle 31 end outside of regular hours (i.e. 17:00 to 8:00), information to the effect that "the vehicle 31 engine has been started" is automatically transmitted by electronic mail to the server terminal 21. This mobile body information is the specific information noted above in b), wherefore a judgment is made to display it on the "notification screen" and the display content of the "notification screen" is updated.

For that reason, when the WWW browser is opened on the terminal 11 managing the vehicle 31, homepage data are read out from the server terminal 21 by the WWW browser and displayed on the display screen of the display device of the terminal 11.

FIG. 34 represents the top page of the homepage displayed on the display device of the terminal 11, that is, the start-up screen.

As diagrammed in FIG. 34, the content that "there has been a vehicle engine start outside of regular hours" is displayed together with "time of occurrence" and content specifying the "manufacturer," "model name," "model number," "machine number," and "ID" of the vehicle 31. From this display screen, the manager is able to learn that "in vehicle 31, there has been a vehicle engine start outside of regular hours," and to take prompt and appropriate measures to handle an anomalous situation such as mischief.

The manager can put the vehicle 31 in a start lock set condition. This is done by calling up the display screen "engine restart disable setting screen" on the terminal 11 and clicking on the button indicating "disable engine restart." When that is done, electronic mail informing that the vehicle is to be put in a start lock set condition is transmitted from the terminal 11 to the vehicle 31.

At the vehicle 31 end, when data informing that the start lock set condition is to be effected is received via the satellite communication antenna 58 by the communication terminal 56, those data are fetched into the communication controller 54. When that is done, a start lock set command is output to the start lock circuit from the communication controller 54. As a consequence, the relay in the start lock circuit is energized and the start lock set condition is effected. That is, even if the engine ignition switch 64 is turned on, fuel can no longer be injected and the engine of the mobile work machine 31 can no longer be restarted.

At the vehicle 31 end, a determination is made as to whether or not the start lock has been set. When it is determined at the vehicle 31 end that the start lock has been set, information to the effect that "start lock set by remote at vehicle 31" is automatically transmitted to the server terminal 21 by electronic mail. This mobile body information is the specific information noted above in d), wherefore at the server terminal 21 the judgment is made that that information should be displayed on the "notification screen" and the display content of the "notification screen" is updated.

As a consequence, on the display screen on the terminal 11, the content that "lock was set by remote" is displayed together with the "time of occurrence" and content specifying the "manufacturer," "model name," "model number," "machine number," and "ID" of the vehicle 31, as diagrammed in FIG. 34. From that display screen, the manager can confirm that the "start lock was effected by remote" at the vehicle 31.

At the server terminal 21, the fact that electronic mail informing that the start lock set condition is to be effected was transmitted to the vehicle 31 is stored in memory. Thereupon, if information to the effect that "start lock was set by remote" has not been sent back by electronic mail from the vehicle 31 after a prescribed amount of time has elapsed since the former electronic mail was transmitted to the vehicle 31 end, at the server terminal 21, a judgment is made that "the start lock has not been set at the vehicle 31 even though a start lock setting command was issued." In other words, the judgment is made that "the request made to the vehicle 31 has not been carried out." There are two possible causes for this. One is that, on the vehicle 31 end, the start lock circuit of the vehicle 31 has failed to operate or the like. The other is that the communication status between the mobile work machine 31 and the server terminal 21 are poor. This mobile body information or communication condition information corresponds to the specific information noted earlier in f), wherefore a judgment is made at the server terminal 21 that that information should be displayed on the "notification screen", and the display content of the "notification screen" is updated.

As a consequence, on the display screen on the terminal 11, as diagrammed in FIG. 34, content informing "no confirmation of locking received from vehicle" is displayed together with "time of occurrence" and content specifying the "manufacturer," "model name," "model number," "machine number," and "ID" of the vehicle 31. From this display screen, the manager is able to learn that "no confirmation of locking has been obtained" from the vehicle 31. And he or she can then take prompt and appropriate measures to deal with that anomalous situation.

The manager is able to effect a start lock released condition in the vehicle 31 by remote control. This is done by calling up the "engine restart enable screen" on the display screen on the terminal 11 and clicking on the button indicating "enable engine restart." When that is done, electronic mail informing that the vehicle 31 is to be put in the start lock released condition is transmitted from the terminal 11 to the vehicle 31.

On the vehicle 31 end, when data to the effect that the start lock release condition is to be effected is received via the satellite communication antenna 58 by the communication terminal 56, those data are fetched into the communication controller 54. When that is done, a start lock release command is output to the start lock circuit from the communication controller 54. As a consequence, the relay in the start lock circuit is deenergized, and the start lock released condition is effected. That is, by turning the engine ignition switch 64 on, fuel is injected and it becomes possible for the engine of the vehicle 31 to be restarted.

At the vehicle 31 end, a determination is made as to whether or not the start lock has been released. When it is judged at the vehicle 31 end that the start lock has been released, the information that "the start lock was released by remote at the vehicle 31" is automatically transmitted by electronic mail to the server terminal 21. That mobile body information is the specific information noted earlier in d), wherefore a judgment is made at the server terminal 21 that that information should be displayed on the "notification screen", and the display content of the "notification screen" is updated.

As a consequence, on the display screen on the terminal 11, content informing "the lock was released by remote" is displayed together with "time of occurrence" and content specifying the "manufacturer," "model name," "model number," "machine number," and "ID" of the vehicle 31. From this display screen, the manager is able to learn that "the start lock was released by remote" at the vehicle 31.

At the server terminal 21, the fact that electronic mail to the effect that the start lock released condition is to be effected was transmitted to the mobile work machine 31 is stored in memory. Thereupon, if information to the effect that "start lock was released by remote" has not been sent back by electronic mail from the vehicle 31 after a prescribed amount of time has elapsed since the former electronic mail was transmitted to the vehicle 31 end, at the server terminal 21, a judgment is made that "the start lock has not been released at the vehicle 31 even though a start lock release command was issued." In other words, the judgment is made that "the request made to the vehicle 31 has not been carried out." There are two possible causes for this. One is that, on the vehicle 31 end, the start lock circuit of the vehicle 31 has failed to operate or the like. The other is that the communication status between the mobile work machine 31 and the server terminal 21 are poor. This mobile body information or communication condition information corresponds to the specific information noted earlier in f), wherefore a judgment is made at the server terminal 21 that that information should be displayed on the "notification screen", and the display content of the "notification screen" is updated.

As a consequence, on the display screen on the terminal 11, content informing "no confirmation of unlocking received from vehicle" is displayed together with "time of occurrence" and content specifying the "manufacturer," "model name," "model number," "machine number," and "ID" of the vehicle 31. From this display screen, the manager is able to learn that "no confirmation of unlocking has been obtained" from the vehicle 31. And he or she can then take prompt and appropriate measures to deal with that anomalous situation.

In the event that the starter mechanism operated even though the mobile work machine 31 had been put in a start lock condition, an automatic transmission to that effect may also be made from the vehicle 31. That is, information to the effect that "the vehicle started even though the start lock was set by remote" may be displayed on the "notification screen" diagrammed in FIG. 34.

Let it now be assumed that an automatic transmission is made from the vehicle 31 every day at 23:00. As diagrammed in FIG. 30, the content of the daily running map will be renewed and every day at 23:00 the renewed running map will automatically be transmitted from the vehicle 31. As a consequence, if there is no transmission from the vehicle 31 for a certain continuous period of time, such as for 36 hours or longer, for example, that will mean that an anomaly has occurred in terms of the communication status. That "36 hour period" is a time period obtained by adding to one day (24 hours) the normal running hours for the next day (12 hours, from 8:00 a.m. to 8:00 p.m.).

At the server terminal 21, the time that electronic mail was previously transmitted from the mobile work machine 31 to the server terminal 21 is stored in memory. Thereupon, when a no-transmission condition continues for a prescribed period of time (36 hours), continuously, since the previous electronic mail was transmitted from the vehicle 31 end, a judgment is made at the server terminal 21 that "no communication has been possible with the vehicle 31 for 36 hours." In other words, it is judged that communications have ceased between the mobile work machine 31 and the server terminal 21. As to the cause of this, both a malfunction or breakdown or the like of the communication equipment in the vehicle 31, that is, a cause on the vehicle 31 end, and poor communication status between the mobile work machine 31 and the server terminal 21 are conceivable. This mobile body information or communication condition information corresponds to the specific information noted earlier in e), wherefore a judgment is made at the server terminal 21 that that information should be displayed on the "notification screen", and the display content of the "notification screen" is updated.

As a consequence, on the display screen on the terminal 11, as diagrammed in FIG. 34, content informing "no communication possible with vehicle for 36 hours or more" is displayed together with "time of occurrence" and content specifying the "manufacturer," "model name," "model number," "machine number," and "ID" of the vehicle 31. From this display screen, the manager is able to learn that "communications have stopped" with the vehicle 31. And he or she can then take prompt and appropriate measures to deal with that anomalous situation.

In this embodiment aspect, the fact that communications have ceased with the vehicle 31 is determined from the fact that, even after a prescribed time period has elapsed since the last automatic transmission, the next automatic transmission has not been made. However, the fact that communications with the vehicle 31 have ceased may also be judged from the fact that, even though a prescribed time period has elapsed since the last time an input operation requesting information was made to the vehicle 31 from the terminals 11, 12, . . . , no return transmission has been made from the vehicle 31.

As described earlier, the voltage of the battery 63 in the vehicle 31 is detected by the sensor group 62 and is input to the communication controller 54. In the communication controller 54, a determination is made as to whether or not the voltage of the battery 63 has been below a certain level (23 V, for example) continuously (for 1 minute or longer, for example). A decline in the voltage of the battery 63 not only will make starting the vehicle 31 difficult, but also means that the communications functions carried on board will go down, and thus constitutes a critical anomalous situation. When the start lock circuit of the mobile work machine 31 is activated, electric power is consumed by the relay in the start lock circuit, wherefore the voltage of the battery 63 will tend to decline.

Thereupon, when it is determined at the vehicle 31 end that the voltage of the battery 63 has been below a prescribed level (23 V, for example) continuously (for 1 minute or longer, for example), information that "the voltage of the battery 63 in the vehicle 31 has declined" is automatically transmitted by electronic mail to the server terminal 21. This mobile body information corresponds to the specific information noted earlier in c), wherefore a judgment is made at the server terminal 21 that that information should be displayed on the "notification screen", and the display content of the "notification screen" is updated.

As a consequence, on the display screen on the terminal 11, content informing "the battery voltage is low" is displayed together with "time of occurrence" and content specifying the "manufacturer," "model name," "model number," "machine number," and "ID" of the vehicle 31. From this display screen, the manager is able to learn that "the voltage of the battery 63 is low" in the vehicle 31. And he or she can then take prompt and appropriate measures to deal with that anomalous situation.

As already described with reference to FIGS. 9 and 10, an automatic transmission is made at the point in time when the position of the vehicle 31 changes.

That is, as diagrammed in FIG. 10, an automatic transmission is made at the point in time when the vehicle 31 departs from the specific set range 129. This specific set range 129 is set, for example, as the control area for the vehicle 31 ("Greater Tokyo," for example) or as the range the vehicle is capable of traveling ("anywhere in Japan," for example). When the set range is departed from, a judgment can be made that an anomalous situation has developed.

Thereupon, when it is judged at the vehicle 31 end that the vehicle 31 has departed from the specific set range 129, the information "vehicle 31 is outside range" is automatically transmitted by electronic mail to the server terminal 21. This mobile body information corresponds to the specific information noted earlier in a), wherefore a judgment is made at the server terminal 21 that that information should be displayed on the "notification screen", and the display content of the "notification screen" is updated.

As a consequence, on the display screen on the terminal 11, content informing "vehicle is outside range" is displayed together with "time of occurrence" and content specifying the "manufacturer," "model name," "model number," "machine number," and "ID" of the vehicle 31. From this display screen, the manager is able to learn that the vehicle 31 is "located outside the range." And he or she can then take prompt and appropriate measures to deal with that anomalous situation.

When the vehicle 31 departs from the specific set range 129, at that point in time an automatic transmission is made, and the information "vehicle is outside of range" is displayed on the "notification screen." Provision may also be made so that, when the vehicle 31 enters the specific set range 129, an automatic transmission is made at that point in time, and the information "vehicle is within range" is displayed on the "notification screen." In that case, the specific 129 would be set as an area into which the vehicle 31 normally would not intrude.

The "notification screen" diagrammed in FIG. 34 is not only displayed on the terminal 11, but also similarly on the display screens of other terminals such as the terminal 12. Thus the "notification screen" diagrammed in FIG. 34 is also displayed on the terminal 12, and critical information that developed through the previous day can easily be recognized.

Embodiment is also possible such that the display of the "notification screen" diagrammed in FIG. 34 is only permitted on the display screen of the terminal 11 of the manager managing the vehicle 31, and the display of the "notification screen" is not allowed to be displayed on the display screens of the other terminals such as the terminal 12. This can be achieved by, for example, making the operation of inputting a certain ID number or a certain code number (a number corresponding to the terminal 11) a condition to the display of the "notification screen" diagrammed in FIG. 34.

In this embodiment aspect, the specific information that is to be displayed on the "notification screen" diagrammed in FIG. 34 is not limited to the information described earlier in a) to f).

For example, information that the period the vehicle 31 was rented to a customer has ended may be displayed on the "notification screen." In the vehicle 31, that the end of the rental period is being approached can be detected either by the service meter value or by a clock provided internally in the communication terminal 56.

Also, when the vehicle 31 has traveled a prescribed distance or further, an automatic transmission may be made from the vehicle 31, and the information "traveled prescribed distance or further" displayed on the "notification screen." That prescribed distance would be set, for example, to a distance which the vehicle 31 would not normally be expected to travel.

Also, when an error code has been input to the communication terminal 56 of the vehicle 31, an automatic transmission may be made from the vehicle 31, and information that an error has occurred displayed on the "notification screen." Embodiment is also possible such that the content of the error codes displayed on the "notification screen" is limited just to specific anomaly items (critical anomaly items).

The items displayed on the "notification screen" diagrammed in FIG. 34 may also be made different for each of the vehicles 31, 32, . . . . For example, for vehicle 31, only the a) display items might be displayed on the "notification screen," while for vehicle 32, only the b) display items might be so displayed.

In this embodiment aspect, moreover, the "notification screen" is displayed on a fixed terminal 11 at one location, but embodiment is also possible such that the contents of the "notification screen" are displayed on portable terminals.

The contents of the "notification screen" can be displayed on a portable telephone instrument wherein a WWW browser is loaded.

In that case, the packet communication network for the portable telephone is connected to the internet 2 by a gateway. Conversions between the packet communication network protocol and the TCP/IP protocol on the internet 2 are made in the gateway, and the contents of the home page on the internet 2 are displayed on the display screen of the portable telephone. Every time the "notification screen" is newly updated by the server terminal 21, the audio message "new information has arrived" is generated by the portable telephone. Thus the contents of the newly updated "notification screen" are displayed on the display screen of the portable telephone. Embodiment is also possible such that the display items of the "notification screen" that are to be displayed on the portable telephone are limited to certain display items among the a) to f) items. For example, it is possible to display only the information b) "vehicle 31 engine was started outside regular hours" on the display screen of the portable telephone. It thereby becomes possible for a manager, even when at a location removed from the terminal 11, to acquire information requiring urgent attention concerning the vehicle 31, in real time, from the display screen of his or her portable telephone.

It is a fact that, because construction machines are costly, they are usually made available by rental. In the rental of construction machines, a system called group rental is employed. This is a system wherein, because construction machines come in various different models (small hydraulic shovels, medium-sized hydraulic shovels, and large hydraulic shovels, for example), these construction machines that come in a diverse variety of models are jointly owned by a plurality of business entities. For that reason, in a case where a customer of one business entity requests the rental of a certain model of a construction machine which is not available there, that specific model can be released for use by another business entity, whereupon the business opportunity is not lost.

In order to be able to respond to the requests of customers for rental, each business entity needs to definitely manage the dispatching and return of construction machines. An embodiment aspect for managing such dispatching and return is described next.

Figure 35:
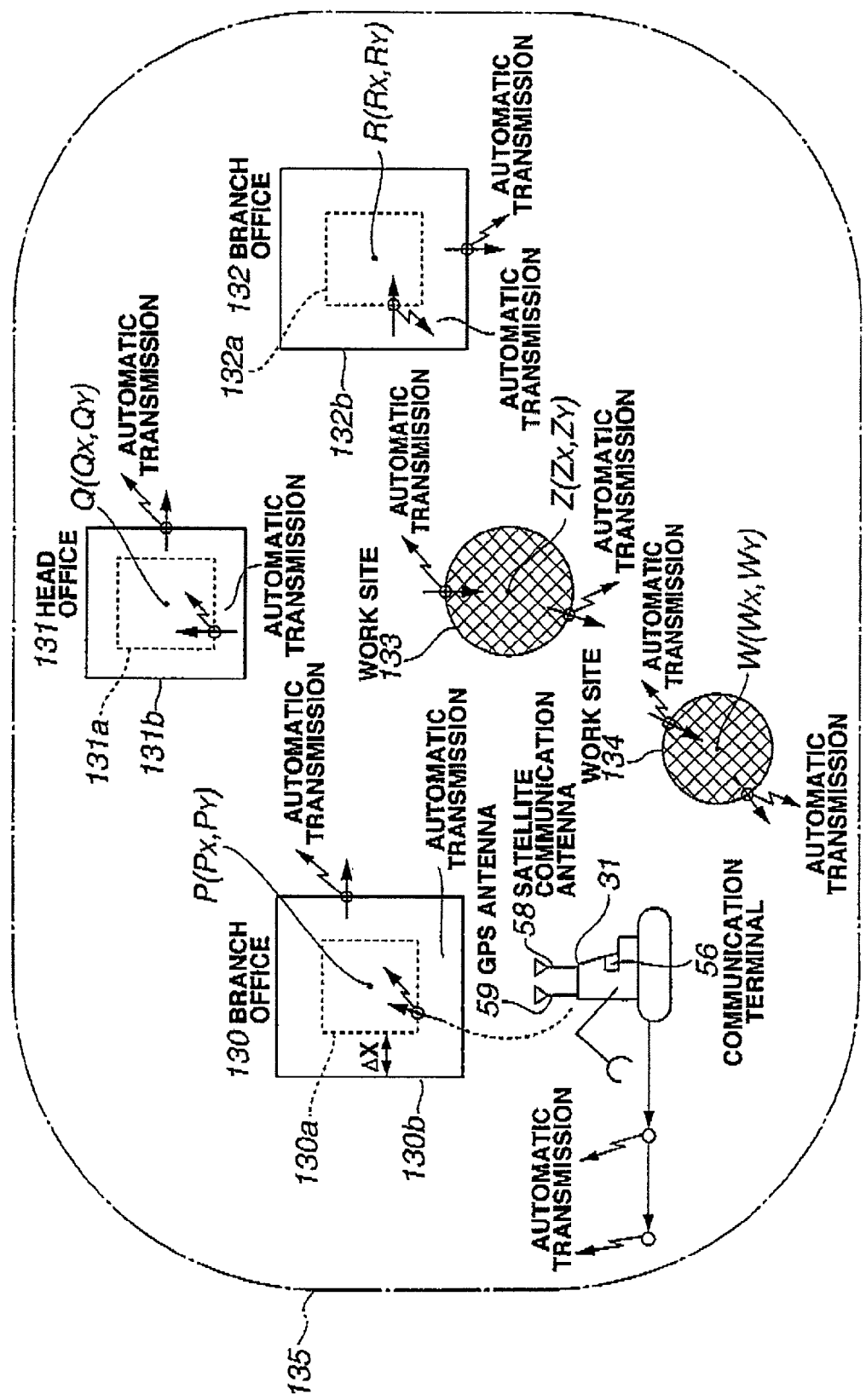
FIG. 35 is a diagram representing an example layout of a vehicle dispatch and return region.

In FIG. 35 is diagrammed an example configuration of this embodiment aspect. In FIG. 35 are represented business entities 130, 131, and 132 which are located in an area 135 such as "Greater Tokyo," for example. It is assumed here that business entity 130 is in "West Tokyo," that business entity 131 is in "North Tokyo," and that business entity 132 is in "South Tokyo." The symbols 133 and 134 designate work sites of customers. The vehicles 31 and 32 are managed by the business entities 130 to 132. In actual practice, the business entities, work sites, and vehicles (mobile work machines) would exist in greater numbers, but these numbers are kept small here to facilitate the description.

Of the business entities 130, 131, and 132, entity 131 is made the head office and entities 130 and 132 are made branch offices. The head office 131 manages the vehicles 31 and 32 in a comprehensive manner. The terminal 11 is deployed at the head office 131, while terminals equivalent to the terminal 11 are deployed at the branch offices 130 and 132.

The positions of each of the business entities 130, 131, and 132 are expressed in an X-Y coordinate system by P(Px, PY), Q(Qx, QY), and R(Rx, RY), respectively. The positions of the work sites 133 and 134 are expressed in the X-Y coordinate system by Z(Zx, ZY) and W(Wx, WY), respectively. These positions may also be expressed as latitudes and longitudes on the earth so as to match a GPS-oriented map.

For each of the business entities 130, 131, and 132, dispatch and return areas are established which are centered on the points P, Q, and R described above. For the branch office 130, for example, the return area 130a centered on the point P is established. The dispatch area 130b centered on the point P is also established. The dispatch area 130b is larger than the return area 130a, and a hysteresis ΔX is imparted between the boundary line of the dispatch area 130b and the boundary line of the return area 130a.

Similarly, the return area 131a and dispatch area 131b, centered on the point Q, are established for the head office 131, and the return area 132a and dispatch area 132b, centered on the point R, are established for the branch office 132. In determining the extent of the dispatch and return areas, consideration is given to GPS measuring equipment error and the size of the business entity and the like. The longitudinal extent and lateral extent of the dispatch and return areas would be established in sizes of several hundreds of meters, respectively, for example.

For each work site 133 and 134, moreover, work areas 133 and 134, centered on the points Z and W, described above, are established.

In the communication controller 54 of the vehicle 31, stored in memory, are positional information on the dispatch and return areas for the business entities 130, 131, and 132, and positional information on the work areas for the work sites 133 and 134. Similarly, the same positional information is stored in memory in the communication controller 54 of the vehicle 32.

In order to newly load the communication terminal 56 in the vehicles 31 and 32 and begin communications, communication request procedures must be followed, and a confirmation of the receipt of such request by the server terminal 21 managing the communications must be obtained. In this embodiment aspect, the procedures for making that communication request can be performed on the screen on the terminal 11.

More specifically, after loading the communication terminal 56 into the vehicles 31 and 32, an operation is performed to input a communication request from the display screen on the terminal 11. As a consequence, the communication connection between the server terminal 21 and the communication terminals 56 in the vehicles 31 and 32 is verified. Simultaneously therewith, the positional information on the business entities 130, 131, and 132 and the positional information on the work sites 133 and 134 are transmitted from the server terminal 21 to the vehicles 31 and 32. As a consequence, positional information on the dispatch and return areas for the business entities 130, 131, and 132 and positional information on the work areas for the work sites 133 and 134 are stored in memory in the communication controllers 54 in the vehicles 31 and 32. When the communication connections have been verified, the fact that the communication requests of the vehicles 31 and 32 have been received is displayed on the display screen on the terminal 11. As soon as the receipt of that request is confirmed at the terminal 11, communications become possible between the vehicles 31 and 32.

The activities involved when a vehicle 31 is dispatched are now described, treating the vehicle 31 representatively.

As already described with FIGS. 9 and 10, the position of the vehicle 31 is detected by the GPS sensor 57 via the GPS antenna 59. The detection results from the GPS sensor 57 are input to the communication controller 54. In the communication controller 54, the detected position of the vehicle 31 is compared against the positions of the dispatch and return areas of the business entities 130, 131, and 132, and a judgment is made as to whether or not the vehicle 31 has been dispatched from or returned to a dispatch or return area.

Suppose, for example, the case of the vehicle 31 being returned to the branch office 130.

The judgment as to whether or not the vehicle 31 has been returned to the branch office 130 is made according to whether or not it has entered inside the return area 130a of the branch office 130 from the outside and remained a prescribed period of time (2 or 3 minutes, for example) inside that return area 130a. The condition of having remained for a prescribed period of time or longer in the return area 130a is imposed in view of the possibility of merely passing the branch office 130. When, as a result thereof, it is judged that the return area 130a has been entered, at that point in time, an identification code ("vehicle 31") specifying the vehicle 31, an identification code ("West Tokyo branch office") specifying the branch office 130, and an identification code indicating "vehicle return" (these being called "vehicle return information") are sent as transmission data from the communication controller 54 to the communication terminal 56. Then, electronic mail wherein that vehicle return information has been coded is automatically transmitted from the communication terminal 56 via the satellite communication antenna 58 to the server terminal 21. It is assumed here that the server terminal 21 is installed at the location of the manufacturer which manufactured the vehicles 31 and 32.

In the server terminal 21, a homepage display screen called a "dispatch and return screen," diagrammed in FIG. 36, is produced.

More specifically, when an automatic transmission is effected from the vehicle 31, and the vehicle return information so automatically transmitted is received by the server terminal 21, then, at the server terminal 21, that vehicle return information is coded into the "dispatch and return screen" of the homepage, and the display contents of the "dispatch and return screen" are updated.

Thus, when the WWW browser is opened on the terminal 11 that manages the vehicle 31, the homepage data are read out from the server terminal 21 by the WWW browser and displayed on the display screen of the display device of the terminal 11.

In FIG. 36 is diagrammed a homepage screen that is displayed on the display device of the terminal 11. FIG. 36 is a "dispatch and return screen" that shows the history of the dispatching and return of the vehicle 31.

As diagrammed in FIG. 36, the content that the vehicle 31 has been "returned to the West Tokyo office" is displayed in real time together with the "time of return." From this display screen, the manager is able to learn that the vehicle 31 was "returned to the West Tokyo office," and can make definite requisitions for customers.

Following that, in like manner, it is judged that the vehicle 31 has been dispatched from the branch office 130 based on the determination that that vehicle 31 departed from inside the dispatch area 130b of the branch office 130 to the outside thereof and remained a prescribed period of time (2 or 3 minutes, for example) outside that dispatch area 130b. At the point in time when that judgment is made, information (called "vehicle dispatch information") that the vehicle 31 was dispatched from the "West Tokyo" branch office 130 is automatically transmitted by electronic mail to the server terminal 21. As a consequence, the content that the vehicle 31 was "dispatched from the West Tokyo office" is displayed in real time, together with the "time of dispatch," in the "dispatch and return screen" on the display device of the terminal 11, as represented in FIG. 36.

Here, as noted earlier, the hysteresis ΔX is imposed between the boundary line of the dispatch area 130b and the boundary line of the return area 130a. Therefore, hunting can be prevented when the vehicle 31 is traveling in the vicinity of the branch office 130.

Following that, in like manner, when it is judged that the vehicle 31 has entered the return area 132a of the branch office 132, at that point in time, vehicle return information that the vehicle 31 has been returned to the "South Tokyo" branch office 132 is automatically transmitted by electronic mail to the server terminal 21. As a consequence, the content that the vehicle 31 has been "returned to the South Tokyo branch" is displayed in real time, together with the "time of return," in the "dispatch and return screen" on the display device of the terminal 11, as represented in FIG. 36.

Then, when it is judged that the vehicle has left the dispatch area 132b of the branch office 132, at that point in time, the vehicle return information that the vehicle 31 has been dispatched from the "South Tokyo" branch office 132 is automatically transmitted by electronic mail to the server terminal 21. As a consequence, the content that the vehicle 31 was "dispatched from the South Tokyo branch" is displayed in real time, together with the "time of dispatch," in the "dispatch and return screen" on the display device of the terminal 11, as represented in FIG. 36.

In like manner, when the vehicle 31 has entered the return area 131a of the "North Tokyo" head office 131, or left the dispatch area 131b of the "North Tokyo" head office 131, the content that the vehicle 31 was "returned to the North Tokyo branch" or "dispatched from the North Tokyo branch" is displayed in the "dispatch and return screen" on the display device of the terminal 11.

In this manner, the latest history of the dispatches and returns of the vehicle 31 is displayed in real time as diagrammed in FIG. 36. A similar "dispatch and return screen" for the vehicle 32 other than the vehicle 31 is obtained also and the latest history of the dispatches and returns of the vehicle 31 is displayed in real time. As a consequence, the dispatching and return of the vehicles 31 and 32 can be managed definitely without error. As a result, business opportunities are not lost and business profits rise dramatically.

Furthermore, when it is judged that the vehicle 31 has entered the work area 133 of a renting customer, at that point in time, in-transport information that the vehicle 31 has been transported into the work site 133 is automatically transmitted by electronic mail to the server terminal 21. As a consequence, the content that the vehicle 31 has been "transported into the work site 133" is displayed in real time, together with the "in-transport time," on the display device of the terminal 11.

Then, when it has been judged that the vehicle 31 has left the work area 133, at that point in time, the out-transport information that the vehicle 31 has been transported out from the work site 133 is automatically transmitted by electronic mail to the server terminal 21. As a consequence, the content that the vehicle 31 was "transported out from the work site 133" is displayed in real time, together with the "out-transport time," on the display device of the terminal 11.

Similarly, when the vehicle 31 has entered the work site 134 or left the work site 134, in like manner, the content that the vehicle 31 has been "transported into the work site 134" or "transported out from the work site 134" is displayed on the display device of the terminal 11. In this manner the history of the transporting of the vehicle 31 in and out is updated.

Alternatively, the travel history of the vehicle 31 after being dispatched from the business entities 130 to 132 may be displayed on the terminal 11. This would be achieved by automatically transmitting positional information every time the vehicle 31 traveled 10 km, for example. Thus the travel history and current position of the vehicle 31 can be verified at the terminal 11.

By comparing the current position of the vehicle 31 and the positions Z and W of the work sites 133 and 134, whether or not the vehicle 31 is located at either of the work sites 133 and 134 can be determined on the screen of the terminal 11.

It is also possible to make provision so that, at the point in time when the vehicle 31 under control departs from a control area ("Greater Tokyo") 135, information that "the vehicle has moved outside of the control area" is automatically transmitted, and displayed on the "notification screen" of FIG. 34, described earlier. Thus the manager can learn that the vehicle 31 is "located outside the control area," and can take prompt and appropriate action to deal with the anomalous situation.

Embodiment is also possible such that the display of the "dispatch and return screen" diagrammed in FIG. 36 is only permitted on the display screen of the terminal 11 of the manager managing the vehicles 31 and 32, and the display of the "dispatch and return screen" is not allowed to be displayed on the display screens of terminals other than the terminal 11. This can be achieved by, for example, making the operation of inputting a certain ID number or a certain code number (a number corresponding to the terminal 11) a condition to the display of the "dispatch and return screen" diagrammed in FIG. 36.

Now, the transporting of the construction machines 31 and 32 to the rental recipients and the recovery of the construction machines 31 and 32 from the rental recipients is performed by loading those construction machines 31 and 32 on the tractor-trailer 35. Because the cost of transporting by the tractor-trailer 35 is high, there is a need to raise the efficiency of such transport by the tractor-trailer 35 and minimize the transport costs. Further, it is necessary to increase the rental opportunities and raise business profits by raising the efficiency of transporting by the tractor-trailer 35 and performing the transport to the rental recipient and recovery from the rental recipient quickly.

An embodiment aspect is described next, with reference to FIGS. 37(*a*) and 37(*b*), wherewith the efficiency of transporting the construction machines 31 and 32 can be enhanced.

Now, as described with FIG. 36, information on whether or not the vehicles 31 and 32 have been dispatched from or returned to the business entities 130 to 132 and information as to whether or not the vehicles 31 and 32 have been transported to or from the work sites 133 and 134 are managed at the terminal 11.

Let it now be assumed that the vehicle return and dispatch information and vehicle in- and out-transporting information that "the vehicle 31 has been returned to the branch office 130, and the vehicle 32 has been transported to the work site 134," as diagrammed in FIG. 37(*a*), have been acquired at the terminal 11. It is further assumed that, at this time, there has been a request to "transport the vehicle 31 to the work site 133, and transport the vehicle 32 out from the work site 134." Thereupon, based on the vehicle return and dispatch information and the vehicle in- and out-transporting information noted above, the work instruction data "transport the vehicle 31 at the branch office 130 to the work site 133, and, on the return trip, transport the vehicle 32 at the work site 134 out and bring it back to the branch office 130" can be sent by electronic mail from the terminal 11 to the tractor-trailer 35. In that case, in like manner as was already described with FIG. 4, on the display screen on the terminal 14 carried on board the tractor-trailer 35 is displayed "the current position of the tractor-trailer 35 itself, the current position of the vehicle 31 (position of the branch office 130), the position of the work site 133, the current position of the vehicle 32 (position of the work site 134), and the work instruction message." The operator of the tractor-trailer 35 is able to perform work efficiently by following the display screen on the terminal 14.

Specifically, the tractor-trailer 35 travels to the branch office 130, loads the vehicle 31, and dispatches it from the branch office 130. At that time, the vehicle dispatch information that the vehicle 31 has been dispatched from the branch office 130 is automatically transmitted from the vehicle 31 and the content of the "dispatch and return screen" diagrammed in FIG. 36 is updated. The tractor-trailer 35, with the vehicle 31 loaded thereon, traverses the route 136 and enters the work site 133. At that time, vehicle in-transporting information that the vehicle 31 has entered the work site 133 is automatically transmitted and the vehicle in-/out-transporting history is updated.

The tractor-trailer 35, running empty, traverses the route 137 and enters the work site 134. The tractor-trailer 35 loads the vehicle 32 and transports it out from the work site 134. At that time, vehicle out-transporting information that the vehicle 32 has been transported out from the work site 134 is automatically transmitted from the vehicle 32 and the vehicle in-/out-transporting history is updated.

The tractor-trailer 35, loaded with the vehicle 32, traverses the route 138 and enters the branch office 130. At that time, the vehicle return information that the vehicle 32 has been returned to the branch office 130 is automatically transmitted from the vehicle 32 and the in-/out-transporting history relating to the vehicle 32 is updated.

Thus, as described in the foregoing, the tractor-trailer 35, in a single outing, can perform transportation of the vehicle 31 and transportation and recovery of the vehicle 32. As a consequence, the time the tractor-trailer 35 is running empty can be reduced and transport efficiency is improved.

In FIG. 37(*b*), a different transport operation example is diagrammed.

Let it now be assumed that the vehicle return and dispatch information and vehicle in- and out-transporting information that "the vehicle 31 has been transported to the work site 133, and the vehicle 32 has been transported to the work site 134 (the vehicles 31 and 32 having been dispatched from the branch offices 130 and 132)" as diagrammed in FIG. 37(*b*), have been acquired at the terminal 11. It is further assumed that, at this time, there has been a request to "transport the vehicle 31 to the work site 134, and transport the vehicle 32 out from the work site 134." Thereupon, based on the vehicle return and dispatch information and the vehicle in- and out-transporting information noted above, the work instruction data "transport the vehicle 31 at the work site 133 out and transfer it to the work site 134, and transport the vehicle 32 at the work site 134 out and bring it back to the branch office 132" can be sent by electronic mail from the terminal 11 to the tractor-trailer 35. In that case, in like manner as was already described with FIG. 4, on the display screen on the terminal 14 carried on board the tractor-trailer 35 is displayed "the current position of the tractor-trailer 35 itself, the current position of the vehicle 31 (position of the work site 133), the current position of the vehicle 32 (position of the work site 134), the position of the branch office 132, and the work instruction message." The operator of the tractor-trailer 35 is able to perform work efficiently following the display screen on the terminal 14.

Specifically, the tractor-trailer 35 traverses the route 139 and travels to the work site 133, loads the vehicle 31, and transports it out from the work site 133. At that time, the vehicle out-transporting information that the vehicle 31 has been transported out from the work site 133 is automatically transmitted from the vehicle 31 and the in-/out-transporting history is updated. The tractor-trailer 35, with the vehicle 31 loaded thereon, traverses the route 140 and enters the work site 134. At that time, the vehicle in-transporting information that the vehicle 31 has entered the work site 134 is automatically transmitted from the vehicle 31 and the in-/out-transporting history is updated.

The tractor-trailer 35 loads the vehicle 32 and transports it out from the work site 134. At that time, the vehicle out-transporting information that the vehicle 32 has been transported out from the work site 134 is automatically transmitted from the vehicle 32 and the in-/out-transporting history is updated.

The tractor-trailer 35, loaded with the vehicle 32, traverses the route 141 and enters the branch office 132. At that time, the vehicle return information that the vehicle 32 has been returned to the branch office 132 is automatically transmitted from the vehicle 32 and the in-/out-transporting history relating to the vehicle 32 is updated.

Thus, as described in the foregoing, the tractor-trailer 35, in a single outing, can perform transfer of the vehicle 31 and transport and recovery of the vehicle 32. As a consequence, the time the tractor-trailer 35 is running empty can be reduced and transport efficiency is improved.

Figure 37A:
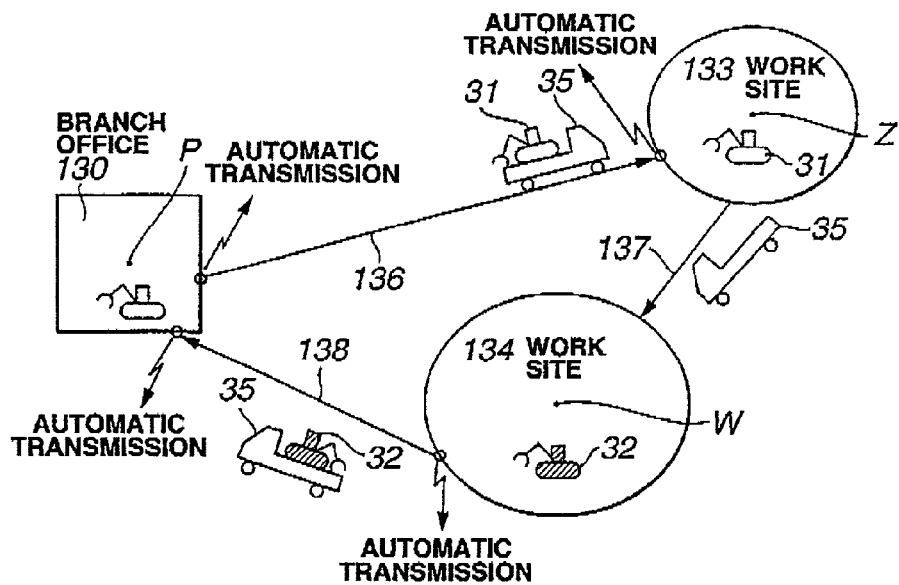
FIGS. 37(a) and 37(b) are diagrams exemplifying tractor-trailer transport routes.
Figure 37B:
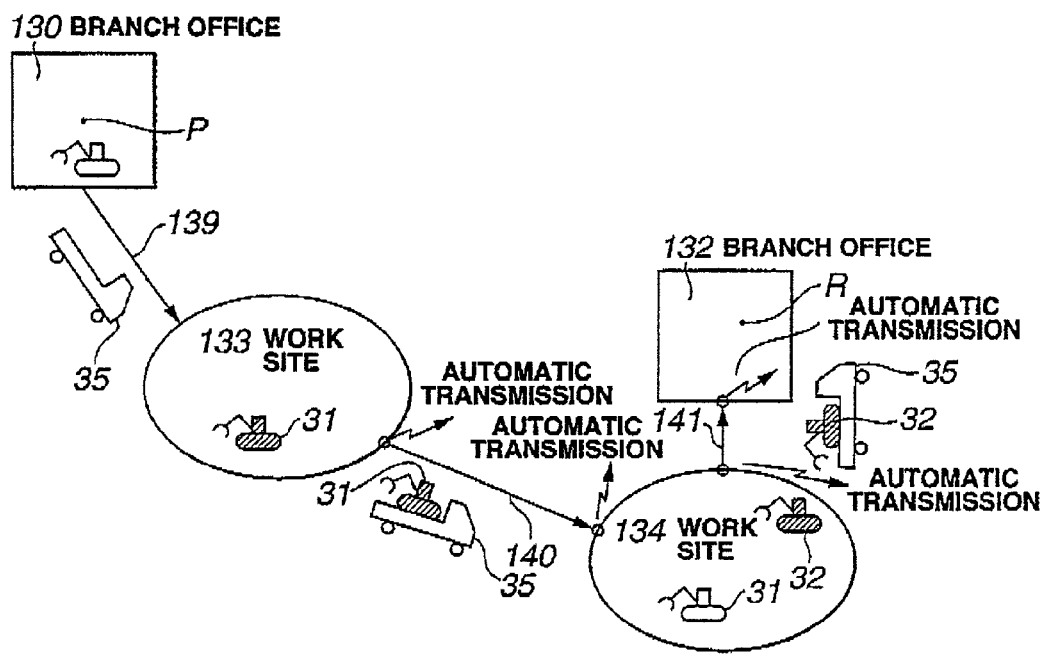

In FIGS. 37(a) and 37(b), moreover, the judgment as to whether or not the vehicles 31 and 32 are located in the work sites 133 and 134 is made by comparing the positions of the vehicles 31 and 32 against the work areas 133 and 134 which are of a fixed size. However, the judgment as to whether or not the vehicles 31 and 32 are located in the work sites 133 and 134 may also be made by comparing the current position of the vehicle 31 against the positions Z and W of the centers of the work sites 133 and 134.

In the embodiment aspect described in the foregoing, the vehicle 31 is put in a start lock set condition (hereinafter start locked) by remote control, and the vehicle 31 is put in a start lock released condition (hereinafter start unlocked) by remote control. Meanwhile, the construction machine 31 normally does not operate during a certain time frame (the off hours of 17:00 to 8:00). If it should happen that the engine of the construction machine 31 should be started during that time frame and start running, it would be supposed that mischief or other anomaly had occurred. Nevertheless, the job of effecting start lock and start unlock in the vehicle 31 by remote control from the terminal 11 every day for the same time frame is a bother.

That being so, an embodiment aspect is now described wherein the data for a previously specified time frame are transmitted from the terminal 11 to the vehicle 31, so that that vehicle 31 itself effects the start lock condition when that specific time frame starts and effects the start unlocked condition when that specific time frame has elapsed.

Figure 38:
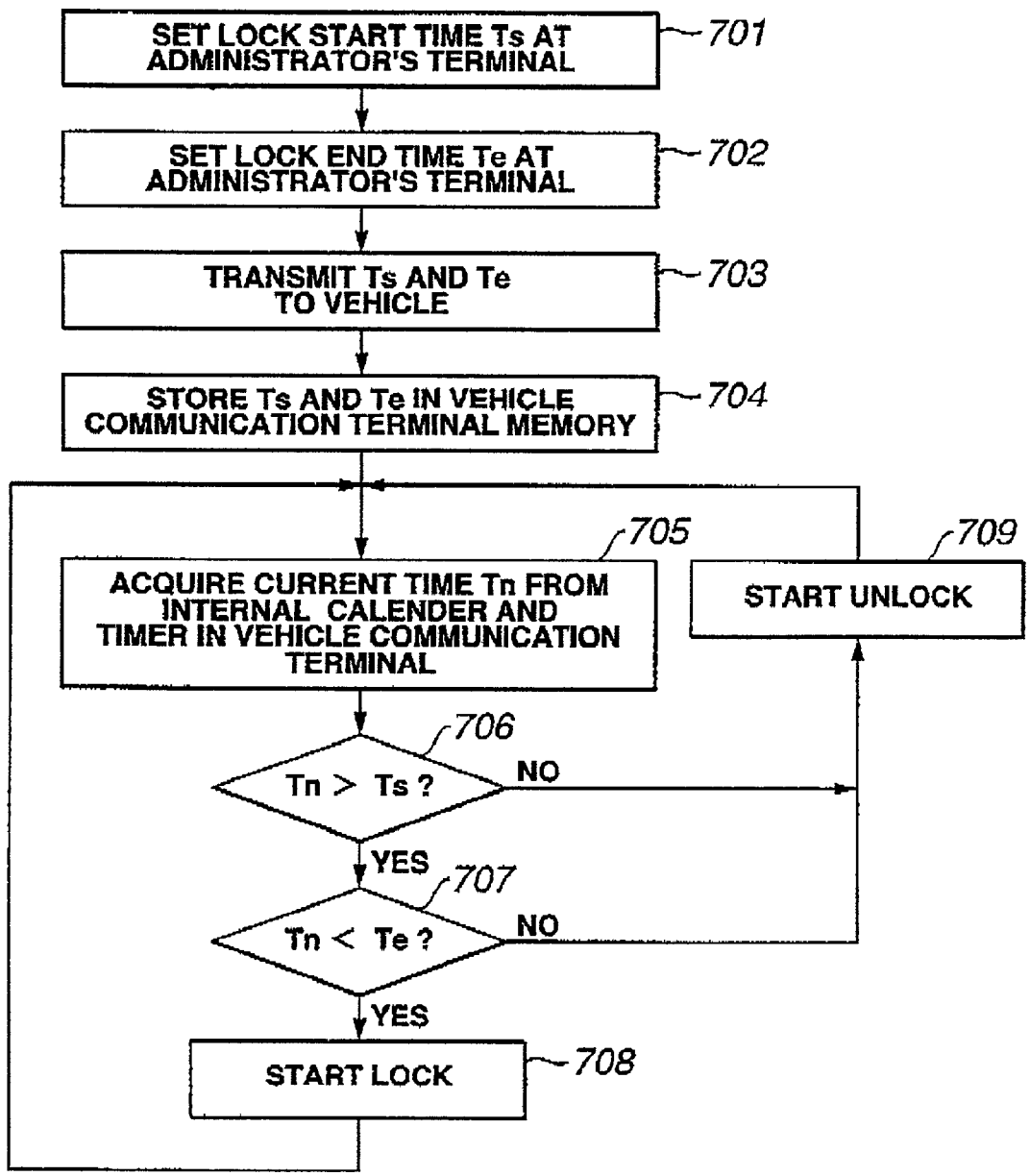
FIG. 38 is a flowchart of start lock processing procedures.

In FIG. 38 is given a flowchart for the processing procedures in this embodiment aspect.

First, when the display screen of the terminal 11 is made the "engine restart prohibition setting screen" and the "designate time frame" button is clicked on, a display is made asking that the "lock start time Ts" be designated. In response thereto, the content of the "lock start time Ts" is input as "17:00 P.M.," for example. Thus the lock start time Ts for the vehicle 31 is set to "17:00 P.M." (step 701).

Next, a display is made asking that the "lock end time Te" be designated. In response thereto, the content of the "lock end time Te" is input as "8:00 A.M.," for example. Thus the lock end time Te for the vehicle 31 is set to "8:00 A.M." (step 702).

As a result, the set data for the lock start time Ts and the lock end time Te are transmitted from the terminal 11 to the vehicle 31 by electronic mail (step 703).

At the vehicle 31, when the data Ts and Te are received by the communication terminal 56 via the satellite communication antenna 58, those data are stored in memory inside the communication terminal 56 (step 704). A calendar and a timer are provided internally in the communication terminal 56 of the vehicle 31. The current time Tn is acquired from that internal calendar and timer (step 705). Next, the current time Tn is compared against the lock start time Ts and against the lock end time Te (steps 706 and 707).

If the current time Tn is a time later than the lock start time Ts (17:00 P.M.) but earlier than the lock end time Te (8:00 A.M.) (decision YES in steps 706 and 707), a start lock setting command is output from the communication terminal 56 via the communication controller 54 to the start lock circuit. As a consequence, the relay in the start lock circuit is energized and the start locked condition is effected. That is, even if the engine ignition switch 64 is turned on, fuel will no longer be injected, and the engine of the vehicle 31 can no longer be restarted (step 708).

If the current time Tn is either a time that is earlier than the lock start time Ts (17:00 P.M.) or a time that is after the lock end time Te (8:00 A.M.) (decision NO in step 706, decision NO in step 707), a start lock release command is output from the communication terminal 56 via the communication controller 54 to the start lock circuit. As a consequence, the relay in the start lock circuit is deenergized and the start unlocked condition is effected. That is, when the engine ignition switch 64 is turned on, fuel will be injected and the engine of the vehicle 31 can be restarted (step 709).

Thus, as described in the foregoing, every day, when the specific time frame (17:00 to 8:00) starts, the vehicle 31 will automatically be put in a start locked condition, and when that specific time frame has elapsed, will automatically be put in a start unlocked condition.

In FIG. 38, furthermore, the vehicle 31 is start-locked every day, but the start lock may, if so desired, be effected only on certain days of the week. In such cases, those certain days of the week (Saturday and Sunday, for example) on which the start lock should be effected are set in steps 701 and 702.

A construction machine 31 will not operate during certain periods of time (during the New Year season, for example), wherefore there is a need to implement the start lock condition during such periods to prevent mischief and the like. With a construction machine 31 made available by rental, moreover, when the rental period has ended, there is a need to effect the start locked condition, after that period has terminated, to prevent use not authorized by contract.

Figure 39:
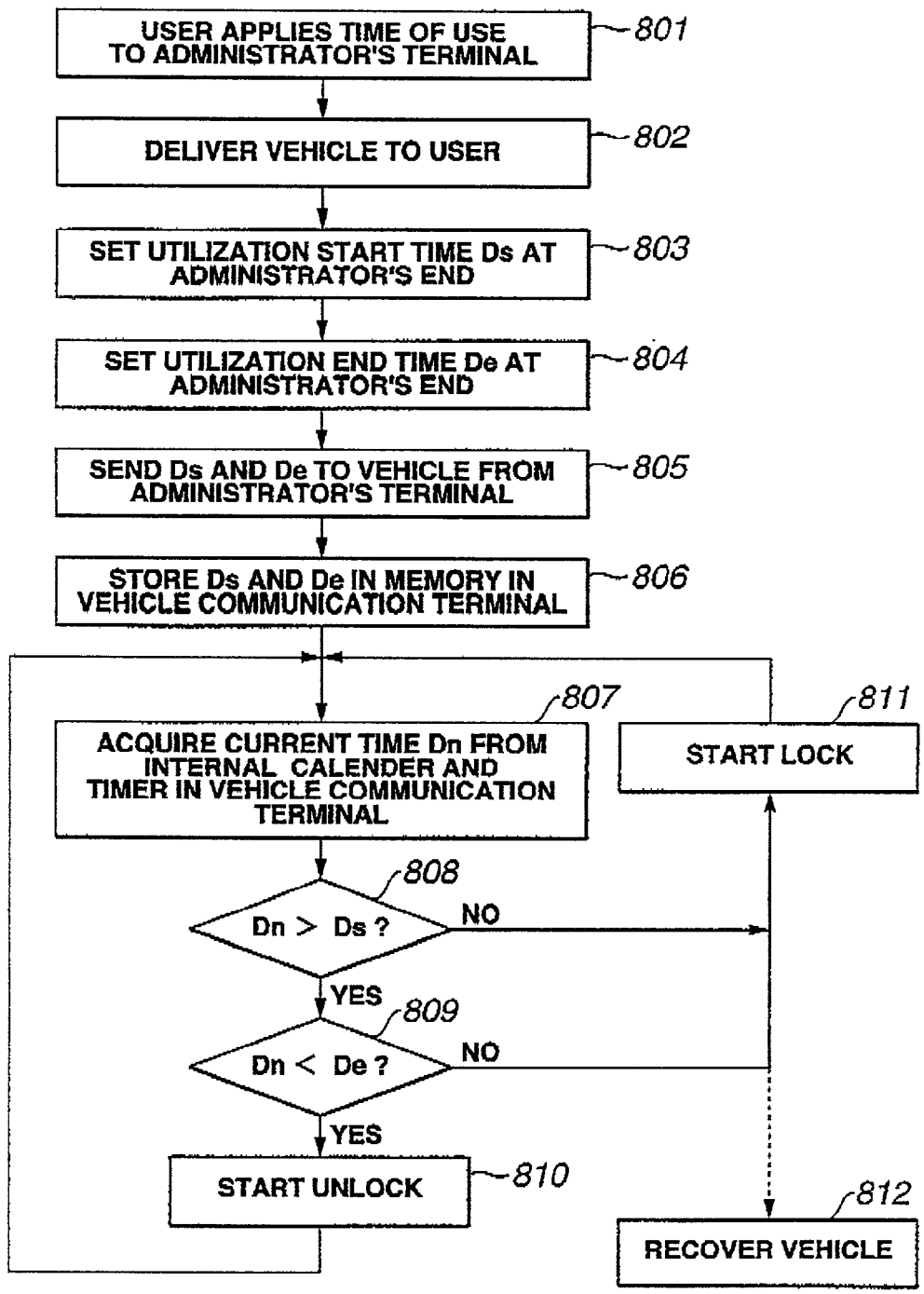
FIG. 39 is a flowchart of start lock processing procedures.

In FIG. 39 is given a flowchart of processing procedures for an embodiment aspect wherein the start lock is effected after the rental period has elapsed.

First, a customer (user) submits a request for a utilization period (say from 8:00 A.M. on March 3 until 8:00 P.M. on March 15, for example) to the terminal 11 managing the vehicle 31 (step 801). Next, the vehicle 31 is delivered to the user (step 802). The request submission and delivery procedures of steps 801 and 802 can be performed by communications made over the internet 2.

Next, when the display screen on the terminal 11 of the manager is made the "engine restart prohibition setting screen" and the button "designate period of use" is clicked on, a display is made asking that the "day and hour to begin use Ds" be designated. In response thereto, the content of the "day and hour to begin use Ds" is input as "March 3, 8:00 A.M.," for example. Thus the day and hour Ds use of the vehicle 31 will begin is set to "March 3, 8:00 A.M." (step 803).

Next, a display is made asking that the "day and hour use is to end De" be designated. In response thereto, the content of "day and hour use is to end De" is input as "March 15, 8:00 P.M.," for example. Thus the day and hour De use of the vehicle 31 will end is set to "March 15, 8:00 P.M." (step 804).

As a result, the set data for the day and hour Ds use is to start and the day and hour De use is to end are transmitted by electronic mail from the terminal 11 to the vehicle 31 (step 805).

At the vehicle 31, when the data Ds and De are received by the communication terminal 56 via the satellite communication antenna 58, those data are stored in memory inside the communication terminal 56 (step 806). A calendar and a timer are provided internally in the communication terminal 56 of the vehicle 31. The current day and hour Dn is acquired from that internal calendar and timer (step 807). Next, the current day and time Dn is compared against the use start day and hour Ds and against the use end day and hour De (steps 808 and 809).

If the current day and hour Dn is past the use start day and hour Ds (March 3, 8:00 A.M.) but prior to the time the use end day and hour De (March 15, 8:00 P.M.) elapses (decision YES in steps 808 and 809), a start lock release command is output from the communication terminal 56 via the communication controller 54 to the start lock circuit. As a consequence, the relay in the start lock circuit is deenergized and a start unlocked condition is effected. That is, if the engine ignition switch 64 is turned on, fuel will be injected and the engine of the vehicle 31 can be restarted (step 810). If the current day and hour Dn is either a time prior to the use start day and hour Ds (March 3, 8:00 A.M.) or a time prior to the use end day and hour De (March 15, 8:00 P.M.) (decision NO in step 808, decision NO in step 809), a start lock setting command is output from the communication terminal 56 via the communication controller 54 to the start lock circuit. As a consequence, the relay in the start lock circuit is energized and a start locked condition is effected. That is, even if the engine ignition switch 64 is turned on, fuel will no longer be injected and the engine of the vehicle 31 cannot be restarted (step 811). As a consequence, when the rental period (Ds to De) ends, use not authorized by contract is prohibited. It also becomes possible to recover the vehicle 31, the engine whereof cannot be started, at any time after the rental period (Ds to De) has elapsed (step 812).

In FIG. 39, furthermore, in order to effect a start lock during the period of the New Year season and to effect the start unlocked condition after that period has ended, it is only necessary to set the time of the start and end of the New Year season (Ds to De) in steps 803 and 804, make the content "stark locked" in step 810, and make the content "start unlocked" in step 811. Thus the start locked condition will be effected during the New Year period (Ds to De) (step 810) and the start unlocked condition will be effected at times other than that New Year period (Ds to De) (step 811).

In FIGS. 38 and 39, data are transmitted to one vehicle 31 from the terminal 11 to automatically start-lock that vehicle 31. However, data may be transmitted simultaneously to a plurality of vehicles (the vehicles 31 and 32, for example) from the terminal 11 and the plurality of vehicles automatically start-locked.

By combining the embodiment aspect represented in FIG. 39 and the embodiment aspect represented in FIGS. 37(*a*) and 37(*b*), use that is not allowed by contract, after the rental period has ended, can be prevented, and vehicle recovery after the rental period has ended can be done efficiently. That is, taking the example represented in FIG. 37(*a*), the customer, after the rental period for the vehicle 32 has ended, allows that vehicle 32 to sit unattended in the work site 134. Even though the vehicle 32 is sitting unattended in the work site 134, after the rental period (Ds to De) has ended, a start locked condition is in effect, wherefore the customer is unable to make use thereof which is unauthorized by contract. Also, when the time comes for the vehicle 31 to be transported into another work site 133, the tractor-trailer 35 performs the transporting of the vehicle 31 into the work site 133, and the transporting of the vehicle 32 left unattended in the work site 134 out therefrom and recovery thereof, simultaneously. Thus the recovery operation after the rental period for the vehicle 32 has ended can be performed efficiently.

In this embodiment aspect, a construction machine is mainly in view as the vehicle 31. With a construction machine, the revolving superstructure and working members become inoperable when the engine cannot be restarted. Accordingly, by effecting the start locked condition, the dangers resulting from inadvertently operating the working members or revolving superstructure can be avoided. In other words, this embodiment aspect can also be employed in safety measure applications to prevent mistaken operations in addition to the application of preventing unauthorized use after the rental period has elapsed. For example, if the control lever for a working member of the mobile work machine 31 were mistakenly manipulated by someone (a child of elementary school age, for example) by no means proficient in such operation, the working member would be inadvertently activated and a hazardous situation would ensue. Based on this embodiment aspect, by effecting the start locked condition, mistaken operations such as inadvertently activating a working member can be prevented.

Now, it is important for the owner or manager of a company that accepts contracts for performing civil engineering construction work, and which performs such civil engineering construction work by having operators operate construction machines, to manage the labor of those operators and to manage the work schedule. For that purpose, operators are required to prepare daily work reports. Conventionally, however, the job of preparing the daily work report, which involves reading and then inputting values on the service meter, has been an onerous one, placing a heavy burden on the operator. Also, because the input operation is a manual operation, inaccurate daily work reports are sometimes made because of input errors and the like.

The daily work report, moreover, constitutes utilization information useful not only to the construction company that is the user of the construction machines, but also to rental companies who rent construction machines, used machine sales businesses that sell used construction machines, and the manufacturers who make the construction machines. A rental company, for example, by ascertaining the history provided in the daily work reports, can determine which customers misuse the machines and which do not, and so make use of the daily work reports in customer management. A used machine seller who sells used construction machines, on the other hand, by ascertaining the history provided in the daily work reports, can calculate past utilization times and operating rates and the like for the construction machines, and so make use of the daily work reports in setting the prices of the used vehicles. And a manufacturer of construction machines, by ascertaining the history provided in the daily work reports, can calculate the durability of the construction machines, and so make use of the daily work reports in designing the next models and so forth.

For this reason, it is necessary to make provision so that daily work report information can be readily obtained in real time from the various terminals.

That being so, an embodiment aspect is described next wherewith the daily work reports can be accurately prepared without placing a burden on the operators, and daily work report information can readily be obtained in real time from a terminal.

The server terminal 21, which is a terminal provided at the manufacturer, produces the homepage display screen called "daily work report screen" diagrammed in FIG. 40.

At the vehicle 31, every day at 23:00, the running map, date, and running time (cf. FIG. 40) for up until the time of 23:00 on that day, are automatically transmitted. Here, by running map, is meant a table which represents time frames that an engine is running, after matching, at each point in time, the outputs of a service meter provided in the vehicle 31 (whether or not the engine has been running) against the outputs of a calendar and timer provided in the vehicle 31. In FIG. 40, the time frames filled in black correspond to the time frames wherein the engine of the vehicle 31 has been running. By running time, moreover, is meant the cumulative value of the service meter per day (the time the engine was running during one day).

More specifically, when an automatic transmission is made from the vehicle 31 end, and the mobile body information comprising the "running map," "date," and "running time" automatically transmitted thereby is received by the server terminal 21, and, at the server terminal 21, processing is performed to update the "daily work report screen" of the homepage by that mobile body information.

As a consequence, when the WWW browser is opened on the terminal 11, the homepage data are read out by the WWW browser from the server terminal 21, and the "daily work report screen" is displayed on the display screen of the terminal 11.

As a consequence, the "date," "running map," and "running time" run by the vehicle 31, as indicated in FIG. 40, are updated by the latest data and displayed. In the "daily work report screen" are also displayed the "name of the customer" (ABC Doboku (KK)) using the vehicle 31, the "name of the work site" (Iroha Rock Quarry) where the vehicle 31 is running, the "name of the operator" for each day, and "remarks" for maintenance items and the like. The procedures for inputting the "name of the customer," "name of the work site," "name of the operator," and "remarks" can be performed by communications done via the internet 2. When the "name of the customer," "name of the work site," "name of the operator," and "remarks" are input at a terminal at the customer's end, the input data are sent via the internet 2 to the server terminal 21, and the contents of the "daily work report screen" are updated according to those input data.

As described in the foregoing, the latest daily work report is displayed in real time on the display screen on the terminal 11, and can be readily accessed from that terminal 11 display screen. This means that the daily work report can be prepared correctly without imposing excessive load on operators. Thus the construction company can perform labor management and work schedule management accurately.

In a case where the terminal 11 is provided at a rental company, moreover, the history provided in the daily work reports can be ascertained from the display screen on the terminal 11, and customers who misuse the machines and those who do not can be distinguished. Thus the daily work reports can be used to good effect in customer management. It is possible, for example, to issue a warning to a customer who misuses a machine or to make a decision not to allow rentals thereto. By ascertaining the history provided in the daily work reports, moreover, customers can be discovered who hardly operate the vehicle 31 at all, making it possible to advise that customer to return the vehicle. Also, by ascertaining the history provided in the daily work reports, times when maintenance should be performed on the vehicle 31 can be predicted.

In a case where the terminal 11 is located with a used machine seller who sells used construction machines, moreover, the history provided in the daily work reports can be ascertained from the display screen on the terminal 11, and the past utilization times and operating rates and the like for a construction machine can be calculated. Thus the price of a used vehicle can be set appropriately.

In a case where the terminal 11 is provided at the manufacturer who made a construction machine, moreover, the history provided in the daily work reports can be ascertained from the display screen on the terminal 11, and the durability of that construction machine can be calculated. Thus the daily work reports can be used to good effect in designing the next models and the like.

Figure 41:
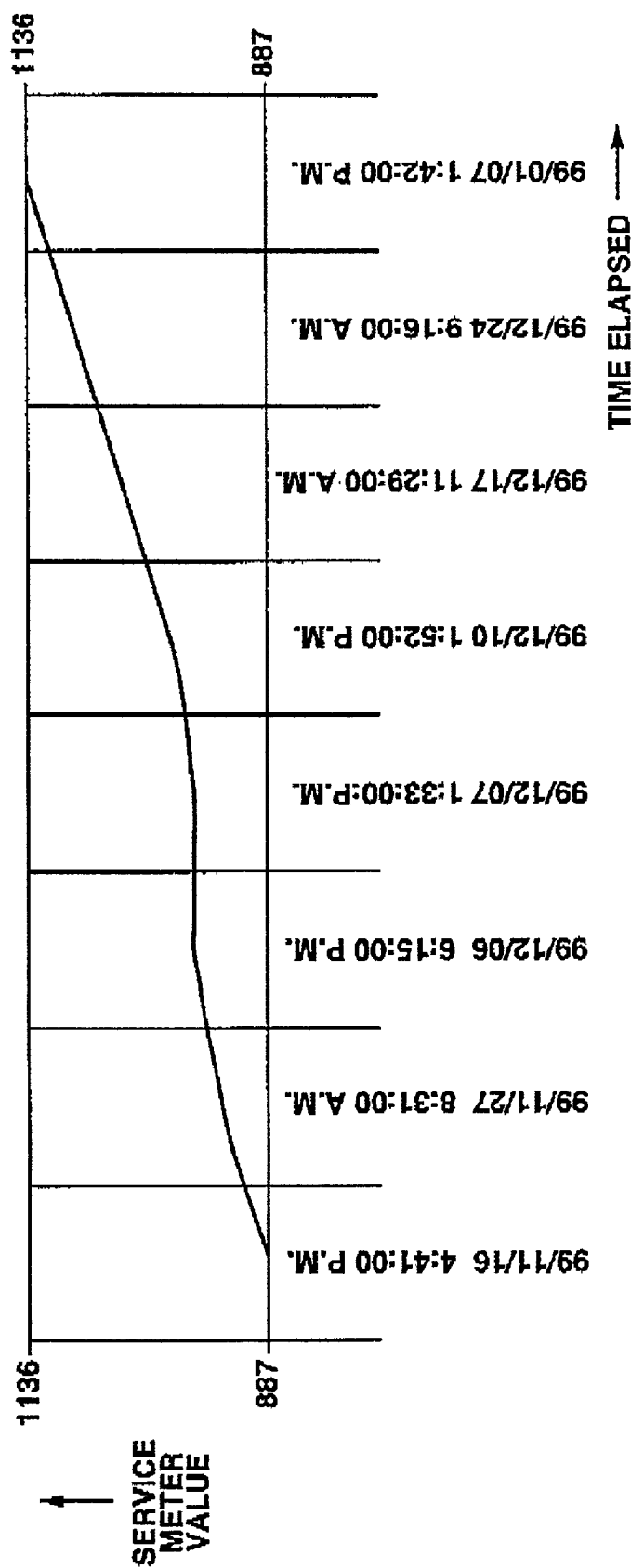
FIG. 41 is a diagram of a display example on a terminal display screen.

The service meter history may also be displayed in graph form on the display screen on the terminal 11, as diagrammed in FIG. 41. On the horizontal axis in the graph in FIG. 41 is plotted the day and time, while on the vertical axis is plotted the cumulative values of the engine running times calculated by the service meter. From the graph in FIG. 41, maintenance times for periodic inspections and the like can be predicted.

Embodiment is also possible so that the displays diagrammed in FIGS. 40 and 41 are only permitted on the display screen of the terminal 11 that manages the vehicle 31, so that those displays will not be made on the display screens of other terminals besides the terminal 11. This can be achieved by, for example, making the operation of inputting a certain ID number or a certain code number (a number corresponding to the terminal 11) a condition to the display of the screens diagrammed in FIGS. 40 and 41.

In the embodiment aspect described in the foregoing, every time one day elapses, the running map is generated, the daily work report is prepared, and the daily work report screen is updated. However, the unit for the running map is not limited to one day, and may be any time period desired. The running map may be generated in monthly units, for example, a "monthly work report" prepared, and a "monthly work report screen" updated. Embodiment is also possible wherewith a work report is prepared for each period of rental to a customer. That is, the running map may be generated in rental period units, a "work report" produced, and a "work report screen" updated.

In general, when the construction machine 31 is rented, it is rented for a rental fee set according to the length of the rental period. There will in fact be cases of two customers, however, where, even though the length of their rental periods is the same, one customer will operate the construction machine 31 for long hours, and another will hardly operate it at all. In such cases, it is unfair and unreasonable to charge the same rental fee to both of those customers.

That being so, the rental fee may be calculated automatically according to the length of engine running time.

That is, at the server terminal 21, the data "running time" automatically transmitted from the vehicle 31 are received, and arithmetic processing is done to obtain the sum of the running times to date. Meanwhile, the correlation between the running time sum and the rental fee amount has been established beforehand. Thereupon, the rental fee amount corresponding to the computed sum of the running times to date is calculated from that correlation. At the server terminal 21, processing is then performed to update the "daily work report screen" of the homepage by the latest rental fee amount.

As a consequence, when the WWW browser is opened on the terminal 11, homepage data are read out from the server terminal 21 by the WWW browser and the "daily work report screen" is displayed on the display screen on the display device of the terminal 11. Assume here that the rental period is from January 21 to January 30. In the "daily work report screen" diagrammed in FIG. 40 will be displayed the rental fee amount ¥xxxxxxx corresponding to the sum of the running times during the rental period (January 21 to January 30), that is, to the value obtained by totaling the daily "running times" during that rental period (i.e. 49 hours 6 minutes). Thus the customer can readily access information on the rental fee amounts corresponding to times the engine was running during the rental period, in real time, on the screen.

In the embodiment aspect described above, the rental fee amount is simply calculated according to the running time sum.

In actual practice, however, the demand for construction machines will vary greatly depending on the time period. Specifically, at times when construction work is done intensively, the demand for construction machines will increase. And, even in the course of a single day, the demand will be greater in daylight hours than at night. That being so, the rental fee amount may also be set according to the level of construction machine demand. Specifically, since the demand for construction machines increases during periods of intense construction work, the rental fee amount can be set on the high side in those periods, and, conversely, set on the low side during off-season periods. The rental fee amount can also be set on the high side during daylight hours, and on the low side during nighttime hours. Accordingly, the rental fee amount need not be set solely according to the sum of the running times, but can also be set after giving consideration to the running season, the running time frame, and the running time.

In this embodiment aspect, as described in the foregoing, moreover, communication means 1 inclusive of the internet 2 are assumed, but the communication means 1 in the present invention are not limited thereto, and it can be fashioned with communication means not inclusive of the internet 2. In short, so long as communications equivalent to those described in the embodiment aspects are effected, it is possible to substitute other communication means therefor. In this embodiment aspect, moreover, communication means 1 are supposed wherein both radio communications and hard line communications are combined, but, needless to say, those means may be made radio communications only or, alternatively, hard line communications only.

In this embodiment aspect, furthermore, a presentation format is assumed wherein mobile body information is displayed as image data on a terminal. However, insofar as the present invention is concerned, the mobile body information may be presented by outputting as audio to the terminal, or as print data to be printed out at the terminal. In short, the mobile body information presentation format at the terminal is discretionary.

In this embodiment aspect, moreover, cases are mainly in view where a plurality of mobile bodies inclusive of construction machines are managed and monitored. As far as the present invention is concerned, however, that poses no limitation, and the invention can be applied to the management and monitoring of ordinary automobile bodies or two-wheeled vehicles.

The invention claimed is:

1. An apparatus for communicating data about mobile vehicles, which comprises:

a plurality of mobile vehicles, a plurality of terminals with a display, and communication means for transmitting and receiving information between the plurality of mobile vehicles and the plurality of terminals;

the information including mobile vehicle data and terminal data; the mobile vehicle data including mobile vehicle identification data for identifying an individual mobile vehicle of the plurality of mobile vehicles, and mobile vehicle content identification data for identifying specific data in the mobile vehicle data; and the terminal data including terminal identification data for identifying an individual terminal of the plurality of terminals;

an input terminal of the plurality of terminals including input means for inputting a data request; the data request including the mobile vehicle identification data, the mobile vehicle content identification data, and the terminal identification data; and the display altering a display mode of the display based on communication progression between the plurality of terminals and the plurality of mobile vehicles and an elapse of time since a last data request was input from the plurality of terminals to the plurality of mobile vehicles;

wherein:

when the data request is input into the input terminal; the input terminal transmits the data request, via the communication means, to the individual mobile vehicle of the plurality of mobile vehicles that is identified by the mobile vehicle identification data in the data request; and the individual mobile vehicle receiving the data request acquires the mobile vehicle data corresponding to the mobile vehicle content identification data in the data request; and transmits the acquired mobile vehicle data, via the communication means, to an output terminal of the plurality of terminals identified by the terminal identification data in the data request.

2. The apparatus for communicating data about mobile vehicles according to claim 1, wherein when the data request of the input terminal includes an instruction work content for the individual mobile vehicle, and the instruction work content is presented by presentation means within the individual mobile vehicle; the presentation means presenting the instruction work content by at least one of a visual image, an audio signal, and a printout within the individual mobile vehicle.

3. An apparatus for communicating data about mobile vehicles, which comprises:

a plurality of mobile vehicles, a plurality of terminals, a server; and communication means for transmitting and receiving information between the plurality of mobile vehicles, the plurality of terminals, and the server; the information including mobile vehicle data, the mobile vehicle data including mobile vehicle identification data for identifying an individual mobile vehicle of the plurality of mobile vehicles and mobile vehicle content identification data for identifying specific data in the mobile vehicle data;

the server including memory means for storing the mobile vehicle data; and updating means for updating memory content of the memory means whenever new mobile vehicle data is received by the server;

an input terminal of the plurality of terminals transmitting, via the communication means, a data request including the mobile vehicle identification data and the mobile vehicle content identification data;

the individual mobile vehicle of the plurality of mobile vehicles corresponding to the mobile vehicle identification data in the data request receiving the data request, acquiring the mobile vehicle data corresponding to the mobile vehicle content identification data in the data request, and transmitting the acquired mobile vehicle data via the communication means to the server;

the server receiving the acquired mobile vehicle data via the communication means, storing the acquired mobile vehicle data in the memory means, and transmitting the acquired mobile vehicle data via the communication means to the input terminal;

the server updating memory content of the memory means by the updating means with the acquired mobile vehicle data whenever the acquired mobile vehicle data is newer than corresponding data in the memory content of the memory means;

a request terminal of the plurality of terminals transmitting to the server, via the communication means, a subsequent data request including the acquired mobile vehicle data;

the server receiving the subsequent data request, retrieving the acquired mobile vehicle data corresponding to the subsequent data request from the memory means, and transmitting the acquired mobile vehicle data to the request terminal, via the communication means.

4. The apparatus for communicating data about mobile vehicles according to claim 3, wherein when the data request of the input terminal includes an instruction work content for the individual mobile vehicle, and the instruction work content is presented by presentation means within the individual mobile vehicle; the presentation means presenting the instruction work content by at least one of a visual image, an audio signal, and a printout within the individual mobile vehicle.

5. An apparatus for communicating data about mobile vehicles, which comprises:
   a plurality of mobile vehicles, a plurality of terminals, and communication means for transmitting and receiving information between the plurality of mobile vehicles and the plurality of terminals;
   an input terminal of the plurality terminals inputting a data request including mobile vehicle information relating to an individual mobile vehicle of the plurality of mobile vehicles and receiving information in response to the data request;
   the input terminal including display means for displaying mobile vehicle identifiers for identifying the plurality of mobile vehicles; the display means including means for altering a display mode of the display means based on communication progression between the plurality of terminals and the plurality of mobile vehicles and an elapse of time since a last data request was input from the plurality of terminals to the plurality of mobile vehicles.

6. An apparatus for communicating data about mobile vehicles, which comprises:
   a plurality of mobile vehicles, a plurality of terminals, and communication means for transmitting and receiving information between the plurality of mobile vehicles and the plurality of terminals;
   a receiving terminal of the plurality terminals receiving one of unrequested information from a mobile vehicle of the plurality of mobile vehicles and requested information from a mobile vehicle in response to a data request by the input terminal;
   the plurality of terminals including display means, the display means displaying mobile vehicle identifiers for the plurality of mobile vehicles, and means for altering a display mode of the display means based on an elapsed time since a previous display of information for the plurality of mobile vehicles; and
   the display means including means for altering a display mode of the display means based on communication progression between the plurality of terminals and the plurality of mobile vehicles and an elapse of time since a last data request was input from the plurality of terminals to the plurality of mobile vehicles.

7. The apparatus for communicating data about mobile vehicles according to claim 6, wherein information is presented on main presentation screen or first presentation screen at startup of the receiving terminal.

8. An apparatus for communicating data about construction machines, which comprises:
   a plurality of mobile vehicles, a plurality of terminals, and communication means for transmitting and receiving information between the plurality of mobile vehicles and the plurality of terminals; construction machine information relating to an individual construction machine of the plurality of construction machines being transmitted, via the communication means, from the individual construction machine to a receiving terminal of the plurality of terminals; the receiving terminal including a display for displaying the construction machine information, the display altering a display mode of the display based on communication progression between the plurality of terminals and the plurality of mobile vehicles and an elapse of time since a last data request was input from the plurality of terminals to the plurality of mobile vehicles;
   a management area or a beyond-management area being established for each of the plurality of construction machines; and
   the construction machine information including information that a construction machine has either departed from the management area or entered the beyond-management area, and the construction machine information being displayed on the screen of the receiving terminal.

9. The apparatus for communicating data about construction machines according to claim 8, wherein the receiving terminal is a portable terminal.

10. The apparatus for communicating data about construction machines according to claim 8, wherein information is presented on main presentation screen or first presentation screen at startup of the receiving terminal.

11. An apparatus for communicating data about construction machines, which comprises:
   a plurality of mobile vehicles, a plurality of terminals with a display, and communication means for transmitting and receiving information between the plurality of mobile vehicles and the plurality of terminals; construction machine information relating to an individual construction machine of the plurality of construction machines being transmitted, via the communication means, from the individual construction machine to a receiving terminal of the plurality of terminals; the display altering a display mode of the display based on communication progression between the plurality of terminals and the plurality of mobile vehicles and an elapse of time since a last data request was input from the plurality of terminals to the plurality of mobile vehicles;

the construction machine information including information that an engine of one of the construction machines was started in a specific time frame, and the construction machine information being displayed on a screen of the individual construction machine.

12. The apparatus for communicating data about construction machines according to claim 11, wherein the receiving terminal is a portable terminal.

13. An apparatus for communicating data about mobile vehicles, which comprises:

a plurality of mobile vehicles, a plurality of terminals, and communication means for transmitting and receiving information between the plurality of mobile vehicles and the plurality of terminals, and information related to an individual mobile vehicle of the plurality of mobile vehicles being transmitted from the individual mobile vehicle to a receiving terminal of the plurality of terminals, via the communication means, and displayed on a display of the receiving terminal; the display altering a display mode of the display based on communication progression between the plurality of terminals and the plurality of mobile vehicles and an elapse of time since a last data request was input from the plurality of terminals to the plurality of mobile vehicles;

the plurality of mobile vehicles including an internal power supply; and the mobile vehicle information including information that voltage of the power supply has fallen to or below a prescribed level that is displayed on the screen of the receiving terminal.

14. The apparatus for communicating data about mobile vehicles according to claim 13, wherein the receiving terminal is a portable terminal.

15. An apparatus for communicating data about mobile vehicles, which comprises:

a plurality of mobile vehicles, a plurality of terminals, and communication means for transmitting and receiving information between the plurality of mobile vehicles and the plurality of terminals; and mobile vehicle information relating to an individual mobile vehicle of the plurality of mobile vehicles being transmitted from the individual mobile vehicle to a receiving terminal of the plurality of terminals, via the communication means; the receiving terminal including a screen for displaying the mobile vehicle information;

the plurality of mobile vehicles respectively including a starter for making the respective mobile vehicle operational by activation of the starter, start lock setting means for deactivating the starter and setting the respective mobile vehicle in an operation-suspended condition, and start lock release means for releasing the operation-suspended condition; and the screen of the receiving terminal displaying at least one of information that corresponding mobile vehicles of the plurality of mobile vehicles were set in the operation-suspended condition by the start lock setting means and information that the operation-suspended condition was released by the start lock release means.

16. The apparatus for communicating data about mobile vehicles according to claim 15, wherein the receiving terminal is a portable terminal.

17. An apparatus for communicating data about mobile vehicles, which comprises:

a plurality of mobile vehicles, a plurality of terminals, and communication means for transmitting and receiving information between the plurality of mobile vehicles and the plurality of terminals; and mobile vehicle information relating to an individual mobile vehicle of the plurality of mobile vehicles being transmitted from the individual mobile vehicle to a receiving terminal of the plurality of terminals, via the communication means; the receiving terminal including a screen for displaying the mobile vehicle information;

the plurality of mobile vehicles respectively including a starter for making the respective mobile vehicle operational by activation of the starter, start lock setting means for deactivating the starter and setting the respective mobile vehicle in an operation-suspended condition, and start lock release means for releasing the operation-suspended condition; and the screen of the receiving terminal displaying activated mobile vehicles, even though the activated mobile vehicles were set in an operation-suspended condition by the start lock setting means.

18. The apparatus for communicating data about mobile vehicles according to claim 17, wherein the receiving terminal is a portable terminal.

19. An apparatus for communicating data about construction machines, which comprises:

a plurality of mobile vehicles, a plurality of terminals, and communication means for transmitting and receiving information between the plurality of mobile vehicles and the plurality of terminals, and construction machine information relating to an individual construction machine of the plurality construction machines being transmitted, via the communication means, from the individual construction machine to a receiving terminal of the plurality of terminals, the receiving terminal including a display for displaying the construction machine information; the display altering a display mode of the display based on communication progression between the plurality of terminals and the plurality of mobile vehicles and an elapse of time since a last data request was input from the plurality of terminals to the plurality of mobile vehicles;

an upper limit of travel distance being determined for each of the plurality of construction machines; and the display of the receiving terminal displaying the construction machine information that one of the construction machines traveled beyond the upper limit.

20. The apparatus for communicating data about construction machines according to claim 19, wherein the receiving terminal is a portable terminal.

* * * * *